(12) United States Patent
Ikeda et al.

(10) Patent No.: US 10,661,183 B2
(45) Date of Patent: *May 26, 2020

(54) GAME OPERATING DEVICE

(71) Applicant: Nintendo Co., Ltd., Kyoto (JP)

(72) Inventors: Akio Ikeda, Kyoto (JP); Ryoji Kuroda, Kyoto (JP); Masahiro Urata, Kyoto (JP); Kuniaki Ito, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,431

(22) Filed: Dec. 6, 2018

(65) Prior Publication Data

US 2019/0111348 A1   Apr. 18, 2019

Related U.S. Application Data

(63) Continuation of application No. 15/494,793, filed on Apr. 24, 2017, now Pat. No. 10,238,978, which is a
(Continued)

(30) Foreign Application Priority Data

Aug. 22, 2005  (JP) ................................. 2005-239984

(51) Int. Cl.
*A63F 13/00* (2014.01)
*A63F 13/98* (2014.01)
(Continued)

(52) U.S. Cl.
CPC .............. *A63F 13/98* (2014.09); *A63F 13/06* (2013.01); *A63F 13/211* (2014.09);
(Continued)

(58) Field of Classification Search
None
See application file for complete search history.

(56) References Cited

U.S. PATENT DOCUMENTS 3,454,920 A   7/1969  Mehr
3,474,241 A   10/1969 Kuipers
(Continued)

FOREIGN PATENT DOCUMENTS

CN   1338961   3/2002
CN   1559644   1/2005
(Continued)

OTHER PUBLICATIONS

English Abstract for Japanese Patent No. JP10021000, published Jan. 23, 1998.
(Continued)

*Primary Examiner* — Paul A D'Agostino
(74) *Attorney, Agent, or Firm* — Nixon & Vanderhye, P.C.

(57) ABSTRACT

A game operating device (controller) includes a longitudinal housing, and a holding portion held by hand to be wrapped by its palm it is formed in the housing. A direction switch is provided on an upper surface at a position where it can be operated by thumb of the hand holding the holding portion, and a start switch and a select switch are provided backward thereof. An X button 46 and a Y button are further arranged in line on the upper surface of the housing. An imaging information arithmetic unit is provided at a front end of the housing in a longitudinal direction in such a manner that an imaging device thereof is exposed from a front-end surface. A concave portion is formed on a lower surface at a position corresponding to the direction switch. The concave portion includes a valley and two inclined surfaces. An A button capable of being operated by index finger of the hand holding the holding portion is provided on the backward inclined surface. By processing an image signal obtained by imaging an infrared ray from LED modules by the imaging (Continued)

device, it is possible to obtain an operation signal varying according to a position and/or attitude of the controller.

20 Claims, 24 Drawing Sheets

Related U.S. Application Data continuation of application No. 15/052,596, filed on Feb. 24, 2016, now Pat. No. 9,700,806, which is a continuation of application No. 14/631,259, filed on Feb. 25, 2015, now Pat. No. 9,498,728, which is a continuation of application No. 13/071,028, filed on Mar. 24, 2011, now Pat. No. 9,011,248, which is a continuation of application No. 11/446,188, filed on Jun. 5, 2006, now Pat. No. 7,931,535.

(51) Int. Cl.
*A63F 13/20* (2014.01)
*A63F 13/211* (2014.01)
*A63F 13/213* (2014.01)
*A63F 13/235* (2014.01)
*A63F 13/24* (2014.01)
*A63F 13/533* (2014.01)
*A63F 13/23* (2014.01)

(52) U.S. Cl.
CPC ............ *A63F 13/213* (2014.09); *A63F 13/23* (2014.09); *A63F 13/235* (2014.09); *A63F 13/24* (2014.09); *A63F 13/533* (2014.09); *A63F 2300/105* (2013.01); *A63F 2300/1006* (2013.01); *A63F 2300/1043* (2013.01); *A63F 2300/1087* (2013.01)

(56) References Cited

U.S. PATENT DOCUMENTS

| | | |
|---|---|---|
| D220,268 S | 3/1971 | Kliewer |
| 3,660,648 A | 5/1972 | Kuipers |
| 3,973,257 A | 8/1976 | Rowe |
| 4,009,619 A | 3/1977 | Snyman |
| 4,038,876 A | 8/1977 | Morris |
| 4,166,406 A | 9/1979 | Maughmer |
| 4,240,638 A | 12/1980 | Morrison et al. |
| 4,287,765 A | 9/1981 | Kreft |
| 4,303,978 A | 12/1981 | Shaw et al. |
| 4,318,245 A | 3/1982 | Stowell et al. |
| 4,321,678 A | 3/1982 | Krogmann |
| 4,337,948 A | 7/1982 | Breslow |
| 4,342,985 A | 8/1982 | Desjardins |
| 4,402,250 A | 9/1983 | Baasch |
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,862,165 A | 8/1989 | Gart |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,988,981 A | 1/1991 | Zimmerman et al. |
| 4,994,795 A | 2/1991 | MacKenzie |
| 5,009,501 A | 4/1991 | Fenner et al. |
| 5,045,843 A | 9/1991 | Hansen |
| D320,624 S | 10/1991 | Taylor |
| 5,059,958 A | 10/1991 | Jacobs et al. |
| 5,062,696 A | 11/1991 | Oshima et al. |
| 5,068,645 A | 11/1991 | Drumm |
| D322,242 S | 12/1991 | Cordell |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,192,082 A | 3/1993 | Inoue et al. |
| 5,202,844 A | 4/1993 | Kamio et al. |
| 5,207,426 A | 5/1993 | Inoue et al. |
| 5,229,764 A | 7/1993 | Matchett et al. |
| D338,242 S | 8/1993 | Cordell |
| D340,042 S | 10/1993 | Copper et al. |
| 5,259,626 A | 11/1993 | Ho |
| 5,262,777 A | 11/1993 | Low et al. |
| D342,256 S | 12/1993 | Payne |
| 5,280,744 A | 1/1994 | DeCarlo et al. |
| D345,164 S | 3/1994 | Grae |
| 5,296,871 A | 3/1994 | Paley |
| 5,307,325 A | 4/1994 | Scheiber |
| 5,317,394 A | 5/1994 | Hale et al. |
| 5,319,387 A | 6/1994 | Yoshikawa |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| H1383 H | 12/1994 | Kaplan et al. |
| 5,369,889 A | 12/1994 | Callaghan |
| 5,373,857 A | 12/1994 | Hirabayashi et al. |
| 5,392,613 A | 2/1995 | Bolton et al. |
| 5,396,265 A | 3/1995 | Ulrich et al. |
| 5,421,590 A | 6/1995 | Robbins |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,512,892 A | 4/1996 | Corballis et al. |
| 5,517,183 A | 5/1996 | Bozeman, Jr. |
| 5,523,800 A | 6/1996 | Dudek |
| 5,526,022 A | 6/1996 | Donahue et al. |
| 5,528,265 A | 6/1996 | Harrison |
| 5,531,443 A | 7/1996 | Cruz |
| 5,541,860 A | 7/1996 | Takei et al. |
| 5,546,471 A | 8/1996 | Merjanian |
| 5,551,701 A | 9/1996 | Bouton et al. |

(56) References Cited

U.S. PATENT DOCUMENTS

| | | |
|---|---|---|
| 5,554,980 A | 9/1996 | Hashimoto et al. |
| 5,554,033 A | 10/1996 | Bizzi |
| 5,561,543 A | 10/1996 | Ogawa |
| 5,563,628 A | 10/1996 | Stroop |
| 5,569,085 A | 10/1996 | Hashimoto et al. |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,616,078 A | 4/1997 | Oh |
| 5,621,459 A | 4/1997 | Ueda et al. |
| 5,624,117 A | 4/1997 | Ohkubo et al. |
| 5,627,565 A | 5/1997 | Morishita et al. |
| 5,629,733 A | 5/1997 | Youman et al. |
| D379,832 S | 6/1997 | Ashida |
| 5,640,152 A | 6/1997 | Copper |
| 5,641,288 A | 6/1997 | Zaenglein, Jr. |
| 5,645,077 A | 7/1997 | Foxlin et al. |
| 5,645,277 A | 7/1997 | Cheng |
| 5,643,087 A | 9/1997 | Marcus et al. |
| 5,666,138 A | 9/1997 | Culver |
| 5,667,220 A | 9/1997 | Cheng |
| 5,670,845 A | 9/1997 | Grant et al. |
| 5,670,988 A * | 9/1997 | Tickle ............... G06F 3/0338 345/157 |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,703,623 A | 12/1997 | Hall et al. |
| 5,724,106 A | 3/1998 | Autry et al. |
| 5,726,675 A | 3/1998 | Inoue |
| 5,734,371 A | 3/1998 | Kaplan |
| 5,734,373 A | 3/1998 | Rosenberg et al. |
| 5,734,807 A | 3/1998 | Sumi |
| D393,884 S | 4/1998 | Hayami |
| 5,736,970 A | 4/1998 | Bozeman, Jr. |
| 5,739,811 A | 4/1998 | Rosenberg et al. |
| 5,740,389 A | 4/1998 | Li et al. |
| 5,741,182 A | 4/1998 | Lipps et al. |
| 5,742,331 A | 4/1998 | Uomori et al. |
| 5,745,226 A | 4/1998 | Gigioli, Jr. |
| D394,264 S | 5/1998 | Sakamoto et al. |
| 5,746,602 A | 5/1998 | Kikinis |
| 5,751,273 A | 5/1998 | Cohen |
| 5,752,880 A | 5/1998 | Gabai et al. |
| 5,757,354 A | 5/1998 | Kawamura |
| 5,757,360 A | 5/1998 | Nitta et al. |
| D395,464 S | 6/1998 | Shiibashi et al. |
| 5,764,224 A | 6/1998 | Lilja et al. |
| 5,769,719 A | 6/1998 | Hsu |
| 5,771,038 A | 6/1998 | Wang |
| D396,468 S | 7/1998 | Schindler et al. |
| 5,785,317 A | 7/1998 | Sasaki |
| D397,162 S | 8/1998 | Yokoi et al. |
| 5,794,081 A | 8/1998 | Itoh et al. |
| 5,796,354 A | 8/1998 | Cartabiano et al. |
| 5,796,387 A | 8/1998 | Curran et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| D400,885 S | 11/1998 | Goto |
| 5,831,553 A | 11/1998 | Lenssen et al. |
| 5,835,077 A | 11/1998 | Dao |
| 5,835,156 A | 11/1998 | Blonstein et al. |
| 5,838,306 A | 11/1998 | O'Conner et al. |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard et al. |
| 5,854,622 A | 12/1998 | Brannon |
| D405,071 S | 2/1999 | Gambaro |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| D407,761 S | 4/1999 | Barr |
| 5,892,501 A | 4/1999 | Kim |
| 5,897,437 A | 4/1999 | Nishiumi et al. |
| 5,898,421 A | 4/1999 | Quinn |
| 5,900,867 A | 5/1999 | Schindler et al. |
| 5,902,968 A | 5/1999 | Sato et al. |
| D410,909 S | 6/1999 | Tickle |
| 5,912,612 A | 6/1999 | DeVolpi |
| 5,919,149 A | 7/1999 | Allum |
| 5,923,317 A | 7/1999 | Sayler et al. |
| 5,926,780 A | 7/1999 | Fox et al. |
| 5,929,444 A | 7/1999 | Leichner |
| 5,929,782 A | 7/1999 | Stark et al. |
| D412,940 S | 8/1999 | Kato |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Sciammarella et al. |
| 5,967,898 A | 10/1999 | Takasaka et al. |
| 5,973,757 A | 10/1999 | Aubuchon et al. |
| 5,976,018 A | 11/1999 | Druckman |
| 5,982,352 A | 11/1999 | Pryor |
| 5,982,356 A | 11/1999 | Akiyama |
| 5,984,785 A | 11/1999 | Takeda |
| 5,986,644 A | 11/1999 | Herder et al. |
| 5,991,085 A | 11/1999 | Rallison et al. |
| 5,991,431 A | 11/1999 | Borza et al. |
| 5,999,168 A | 12/1999 | Rosenberg et al. |
| 6,002,394 A | 12/1999 | Schein et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,013,007 A | 1/2000 | Root et al. |
| 6,016,144 A | 1/2000 | Blonstein et al. |
| 6,019,680 A | 2/2000 | Cheng |
| 6,020,876 A | 2/2000 | Rosenberg et al. |
| 6,037,882 A | 3/2000 | Levy |
| 6,042,478 A * | 3/2000 | Ng ..................... A63F 13/02 463/44 |
| 6,044,297 A | 3/2000 | Sheldon et al. |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach et al. |
| 6,059,576 A | 5/2000 | Brann |
| 6,069,594 A | 5/2000 | Barnes et al. |
| 6,072,467 A | 6/2000 | Walker |
| 6,072,470 A | 6/2000 | Ishigaki |
| 6,075,575 A | 6/2000 | Schein et al. |
| 6,081,819 A | 6/2000 | Ogino |
| 6,084,315 A | 7/2000 | Schmitt |
| 6,084,577 A | 7/2000 | Sato et al. |
| 6,087,950 A | 7/2000 | Capan |
| D429,718 S | 8/2000 | Rudolph |
| 6,110,039 A | 8/2000 | Oh |
| 6,115,028 A | 9/2000 | Balakrishnan |
| 6,137,457 A | 10/2000 | Tokuhashi et al. |
| D433,381 S | 11/2000 | Talesfore |
| D433,413 S | 11/2000 | Rozenberg et al. |
| 6,146,278 A | 11/2000 | Kobayashi |
| 6,148,100 A | 11/2000 | Anderson et al. |
| 6,153,843 A | 11/2000 | Date et al. |

(56) References Cited

U.S. PATENT DOCUMENTS

| | | |
|---|---|---|
| 6,155,926 A | 12/2000 | Miyamoto et al. |
| 6,160,405 A | 12/2000 | Needle et al. |
| 6,160,540 A | 12/2000 | Fishkin et al. |
| 6,162,191 A | 12/2000 | Foxlin |
| 6,164,808 A | 12/2000 | Shibata et al. |
| 6,171,190 B1 | 1/2001 | Thanasack et al. |
| 6,176,837 B1 | 1/2001 | Foxlin |
| 6,181,329 B1 | 1/2001 | Stork et al. |
| 6,183,365 B1 | 2/2001 | Tonomura et al. |
| 6,184,862 B1 | 2/2001 | Leiper |
| 6,184,863 B1 | 2/2001 | Sibert et al. |
| 6,186,896 B1 | 2/2001 | Takeda et al. |
| 6,191,774 B1 | 2/2001 | Schena et al. |
| 6,217,478 B1 | 2/2001 | Vohmann et al. |
| 6,225,987 B1 | 2/2001 | Matsuda |
| 6,198,295 B1 | 3/2001 | Hill |
| 6,198,470 B1 | 3/2001 | Agam et al. |
| 6,198,471 B1 | 3/2001 | Cook |
| 6,200,219 B1 | 3/2001 | Rudell et al. |
| 6,200,253 B1 | 3/2001 | Nishiumi et al. |
| 6,211,861 B1 | 4/2001 | Rosenberg et al. |
| 6,217,450 B1 | 4/2001 | Meredith |
| D442,998 S | 5/2001 | Ashida |
| 6,201,554 B1 | 5/2001 | Lands |
| 6,226,534 B1 | 5/2001 | Aizawa |
| 6,229,526 B1 | 5/2001 | Berstis |
| 6,238,289 B1 | 5/2001 | Sobota et al. |
| 6,238,291 B1 | 5/2001 | Fujimoto et al. |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Oshuga et al. |
| 6,245,014 B1 | 6/2001 | Brainard, II |
| 6,264,558 B1 | 6/2001 | Nishiumi et al. |
| 6,273,819 B1 | 8/2001 | Strauss et al. |
| 6,280,327 B1 | 8/2001 | Leifer et al. |
| 6,287,198 B1 | 9/2001 | McCauley |
| 6,290,565 B1 | 9/2001 | Galyean, III et al. |
| 6,297,751 B1 | 10/2001 | Fadavi-Ardekani |
| 6,301,534 B1 | 10/2001 | McDermott, Jr. et al. |
| 6,304,250 B1 | 10/2001 | Yang et al. |
| 6,312,335 B1 | 11/2001 | Tosaki et al. |
| 6,315,673 B1 | 11/2001 | Kopera et al. |
| 6,323,614 B1 | 11/2001 | Palazzolo et al. |
| 6,323,654 B1 | 11/2001 | Needle et al. |
| 6,235,718 B1 | 12/2001 | Nishiumi et al. |
| 6,331,841 B1 | 12/2001 | Tokuhashi et al. |
| 6,331,856 B1 | 12/2001 | Van Hook et al. |
| 6,337,954 B1 | 1/2002 | Soshi et al. |
| 6,346,046 B2 | 2/2002 | Miyamoto et al. |
| 6,347,998 B1 | 2/2002 | Yoshitomi et al. |
| 6,374,998 B1 | 2/2002 | Yoshitomi et al. |
| 6,361,507 B1 | 3/2002 | Foxlin |
| D456,410 S | 4/2002 | Ashida |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| D456,854 S | 5/2002 | Ashida |
| 6,338,079 B1 | 5/2002 | Takeda et al. |
| 6,392,613 B1 | 5/2002 | Goto |
| 6,394,904 B1 | 5/2002 | Stalker |
| D458,972 S | 6/2002 | Ashida |
| 6,400,480 B1 | 6/2002 | Thomas |
| 6,400,996 B1 | 6/2002 | Hoffberg et al. |
| 6,409,687 B1 | 6/2002 | Foxlin |
| D459,727 S | 7/2002 | Ashida |
| D460,787 S | 7/2002 | Nishikawa |
| 6,415,223 B1 | 7/2002 | Lin et al. |
| 6,417,841 B1 | 7/2002 | Doi et al. |
| 6,421,056 B1 | 7/2002 | Nishiumi et al. |
| 6,424,333 B1 | 7/2002 | Tremblay |
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |
| 6,456,276 B1 | 9/2002 | Park |
| D464,052 S | 10/2002 | Zicolello |
| D464,950 S | 10/2002 | Fraquelli |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |
| 6,484,080 B2 | 11/2002 | Breed |
| 6,489,946 B1 | 12/2002 | Takeda et al. |
| 6,492,981 B1 | 12/2002 | Stork et al. |
| 6,496,122 B2 | 12/2002 | Sampsell |
| 6,518,952 B1 | 2/2003 | Leiper |
| 6,530,838 B2 * | 3/2003 | Ha ................ A63F 13/06 463/36 |
| 6,532,152 B1 | 3/2003 | White et al. |
| 6,538,675 B2 | 3/2003 | Aratani et al. |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland et al. |
| 6,544,126 B2 | 4/2003 | Sawano et al. |
| 6,545,661 B1 | 4/2003 | Goschy et al. |
| 6,554,781 B1 | 4/2003 | Carter et al. |
| D474,763 S | 5/2003 | Tozaki et al. |
| 6,565,444 B2 | 5/2003 | Nagata et al. |
| 6,567,536 B2 | 5/2003 | McNitt et al. |
| 6,572,014 B1 | 6/2003 | Lambert |
| 6,572,108 B1 | 6/2003 | Bristow |
| 6,577,350 B1 | 6/2003 | Proehl et al. |
| 6,582,299 B1 | 6/2003 | Matsuyama et al. |
| 6,582,380 B2 | 6/2003 | Kazlausky et al. |
| 6,590,536 B1 | 6/2003 | Walton |
| 6,597,443 B2 | 6/2003 | Boman |
| 6,599,194 B1 | 6/2003 | Smith et al. |
| 6,585,596 B1 | 7/2003 | Leifer et al. |
| 6,591,677 B2 | 7/2003 | Rothuff |
| 6,597,342 B1 | 7/2003 | Haruta |
| 6,605,038 B1 | 8/2003 | Teller et al. |
| 6,608,563 B2 | 8/2003 | Weston et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,634,949 B1 | 10/2003 | Briggs et al. |
| 6,636,826 B1 | 10/2003 | Abe et al. |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi |
| 6,677,990 B1 | 1/2004 | Kawahara |
| 6,681,629 B2 | 1/2004 | Foxlin et al. |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,710,764 B1 | 3/2004 | Burgel et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,725,173 B2 | 4/2004 | An et al. |
| 6,727,887 B1 | 4/2004 | Levine et al. |
| D489,361 S | 5/2004 | Mori et al. |
| 6,736,009 B1 | 5/2004 | Schwabe |
| D491,924 S | 6/2004 | Kaminski et al. |
| D492,285 S | 6/2004 | Ombao et al. |
| 6,743,101 B2 | 6/2004 | Leifer et al. |
| 6,743,104 B1 | 6/2004 | Ota et al. |
| 6,747,632 B2 | 6/2004 | Howard |
| 6,747,690 B2 | 6/2004 | Mølgaard |
| 6,749,432 B2 | 6/2004 | French et al. |
| 6,752,719 B2 * | 6/2004 | Himoto ............ A63F 13/02 463/37 |
| 6,753,849 B1 | 6/2004 | Curran et al. |
| 6,753,888 B2 | 6/2004 | Kamiwada et al. |

(56) References Cited

U.S. PATENT DOCUMENTS

| | | |
|---|---|---|
| 6,757,068 B2 | 6/2004 | Foxlin |
| 6,757,446 B1 | 6/2004 | Li et al. |
| 6,761,637 B2 | 7/2004 | Weston et al. |
| 6,765,553 B1 | 7/2004 | Odamura |
| D495,336 S | 8/2004 | Andre et al. |
| 6,773,349 B2* | 8/2004 | Hussaini ............... A63F 13/06 463/38 |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1* | 11/2004 | Levenberg ............. A63F 13/02 463/47 |
| 6,812,881 B1 | 11/2004 | Mullaly et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 | 2/2005 | Tickle |
| 6,850,844 B1 | 2/2005 | Walters et al. |
| 6,852,032 B2 | 2/2005 | Ishino |
| 6,856,327 B2 | 2/2005 | Choi |
| D502,468 S | 3/2005 | Knight et al. |
| 6,868,738 B2 | 3/2005 | Moscrip et al. |
| 6,870,946 B1 | 3/2005 | Teng et al. |
| 6,872,139 B2 | 3/2005 | Sato et al. |
| 6,873,406 B1 | 3/2005 | Hines et al. |
| D503,750 S | 4/2005 | Kit et al. |
| D504,298 S | 4/2005 | Bian |
| D504,677 S | 5/2005 | Kaminski et al. |
| D505,424 S | 5/2005 | Ashida et al. |
| 6,897,845 B2 | 5/2005 | Ozawa |
| 6,897,854 B2 | 5/2005 | Cho et al. |
| 6,906,700 B1 | 6/2005 | Armstrong |
| 6,908,388 B2 | 6/2005 | Shimizu et al. |
| 6,922,632 B2 | 6/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,861 B2 | 8/2005 | Wang |
| 6,933,923 B2 | 8/2005 | Feinstein |
| 6,939,232 B2 | 9/2005 | Tanaka |
| 6,954,980 B2 | 10/2005 | Song |
| 6,955,606 B2 | 10/2005 | Taho et al. |
| 6,956,564 B1 | 10/2005 | Williams |
| 6,967,566 B2 | 11/2005 | Weston et al. |
| 6,967,644 B1 | 11/2005 | Kobayashi |
| 6,982,697 B2 | 1/2006 | Wilson et al. |
| 6,984,208 B2 | 1/2006 | Zheng |
| 6,990,639 B2 | 1/2006 | Wilson |
| 6,993,206 B2 | 1/2006 | Ishino |
| 6,993,451 B2 | 1/2006 | Chang et al. |
| 6,995,748 B2 | 2/2006 | Gordon et al. |
| 6,998,966 B2 | 2/2006 | Pederson et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| 7,066,781 B2 | 6/2006 | Weston |
| D524,298 S | 7/2006 | Hedderich et al. |
| 7,081,051 B2 | 7/2006 | Himoto et al. |
| 7,090,582 B2 | 8/2006 | Danieli et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| D531,228 S | 10/2006 | Ashida et al. |
| 7,115,032 B2 | 10/2006 | Cantu et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| 7,133,026 B2 | 11/2006 | Horie et al. |
| 7,136,674 B2 | 11/2006 | Yoshie et al. |
| 7,139,983 B2 | 11/2006 | Kelts |
| 7,140,962 B2 | 11/2006 | Okuda et al. |
| 7,142,191 B2 | 11/2006 | Idesawa et al. |
| 7,149,627 B2 | 12/2006 | Ockerse et al. |
| 7,154,475 B2 | 12/2006 | Crew |
| 7,155,604 B2 | 12/2006 | Kawai |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |
| 7,200,702 B2 | 4/2007 | Keely et al. |
| D543,246 S | 5/2007 | Ashida et al. |
| 7,220,220 B2 | 5/2007 | Stubbs et al. |
| 7,225,101 B2 | 5/2007 | Usuda et al. |
| 7,231,063 B2 | 6/2007 | Naimark et al. |
| 7,233,316 B2 | 6/2007 | Smith et al. |
| 7,236,156 B2 | 6/2007 | Liberty et al. |
| 7,168,047 B1 | 7/2007 | Huppi |
| 7,239,301 B2 | 7/2007 | Liberty et al. |
| 7,261,690 B2 | 8/2007 | Teller et al. |
| 7,262,760 B2 | 8/2007 | Liberty |
| D556,201 S | 11/2007 | Ashida et al. |
| 7,292,151 B2 | 11/2007 | Ferguson et al. |
| 7,298,613 B2 | 11/2007 | Yin et al. |
| 7,301,527 B2 | 11/2007 | Marvit |
| 7,301,648 B2 | 11/2007 | Foxlin |
| D556,760 S | 12/2007 | Ashida et al. |
| D559,847 S | 1/2008 | Ashida et al. |
| D561,178 S | 2/2008 | Azuma |
| 7,335,134 B1 | 2/2008 | LaVelle |
| D563,948 S | 3/2008 | d'Hore |
| D567,243 S | 4/2008 | Ashida et al. |
| RE40,324 E | 5/2008 | Crawford |
| 7,379,566 B2 | 5/2008 | Hildreth |
| 7,383,507 B2 | 6/2008 | Shibamiya et al. |
| 7,395,181 B2 | 7/2008 | Foxlin |
| 7,359,121 B2 | 8/2008 | French et al. |
| 7,414,611 B2 | 8/2008 | Liberty |
| 7,445,550 B2 | 11/2008 | Barney et al. |
| 7,488,231 B2 | 2/2009 | Weston |
| 7,488,254 B2 | 2/2009 | Himoto et al. |
| 7,500,917 B2 | 3/2009 | Barney et al. |
| 7,568,289 B2 | 8/2009 | Burlingham et al. |
| 7,582,016 B2 | 9/2009 | Suzuki |
| 7,614,958 B2 | 11/2009 | Weston et al. |
| 7,653,771 B2 | 1/2010 | Liberty |
| 7,663,509 B2 | 2/2010 | Shen |
| 7,704,119 B2 | 4/2010 | Evans |
| 7,733,637 B1 | 6/2010 | Lam |
| 7,746,629 B2 | 6/2010 | Assouad et al. |
| 7,758,424 B2 | 7/2010 | Riggs et al. |
| 7,774,155 B2 | 8/2010 | Sato et al. |
| 7,775,882 B2 | 8/2010 | Kawamura et al. |
| 7,796,116 B2 | 9/2010 | Salsman |
| 7,818,668 B2 | 10/2010 | Michelstein et al. |
| 7,833,097 B1* | 11/2010 | Maddox ............... A63F 13/23 455/556.1 |
| 7,852,322 B2 | 12/2010 | Park |
| 7,864,159 B2 | 1/2011 | Sweetser et al. |
| 7,933,118 B2 | 4/2011 | Chiu et al. |
| 7,942,745 B2 | 5/2011 | Ikeda et al. |
| 8,018,098 B2 | 9/2011 | Lu et al. |
| 8,089,458 B2 | 1/2012 | Barney et al. |
| 8,100,769 B2 | 1/2012 | Rabin |
| 8,100,770 B2 | 1/2012 | Yamazaki et al. |
| 8,180,295 B2 | 5/2012 | Mao |
| 8,188,977 B2 | 5/2012 | Kuwaki et al. |
| 8,192,285 B2 | 6/2012 | Cheng et al. |
| 9,005,025 B2* | 4/2015 | Joynes ................. A63F 13/06 463/37 |
| 9,700,806 B2* | 7/2017 | Ikeda ................... A63F 13/24 |
| 2001/0008847 A1 | 7/2001 | Miyamoto et al. |
| 2001/0010514 A1 | 8/2001 | Ishino |
| 2001/0014860 A1* | 8/2001 | Kivimaki ............. G10L 13/04 704/260 |
| 2001/0015123 A1 | 8/2001 | Nishitani et al. |

(56) References Cited

U.S. PATENT DOCUMENTS

| | | |
|---|---|---|
| 2001/0021668 A1 | 9/2001 | Takeda et al. |
| 2001/0024973 A1 | 9/2001 | Meredith |
| 2001/0031662 A1 | 10/2001 | Larian |
| 2001/0049302 A1 | 12/2001 | Hagiwara |
| 2002/0024500 A1 | 2/2002 | Howard |
| 2002/0024675 A1 | 2/2002 | Foxlin |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0098887 A1 | 7/2002 | Himoto et al. |
| 2002/0103026 A1 | 8/2002 | Himoto et al. |
| 2002/0107069 A1 | 8/2002 | Yukinobu |
| 2002/0126026 A1 | 9/2002 | Lee |
| 2002/0137567 A1 | 9/2002 | Cheng |
| 2002/0140745 A1 | 10/2002 | Ellenby et al. |
| 2002/0155890 A1 | 10/2002 | Ha et al. |
| 2002/0158843 A1 | 10/2002 | Levine et al. |
| 2002/0183961 A1 | 12/2002 | French et al. |
| 2003/0017872 A1 | 1/2003 | Oishi et al. |
| 2003/0038778 A1 | 2/2003 | Noguera et al. |
| 2003/0052860 A1 | 3/2003 | Park et al. |
| 2003/0057808 A1 | 3/2003 | Lee et al. |
| 2003/0063068 A1 | 4/2003 | Anton et al. |
| 2003/0069077 A1 | 4/2003 | Korienek |
| 2003/0107551 A1 | 6/2003 | Dunker |
| 2003/0144056 A1 | 7/2003 | Leifer et al. |
| 2003/0147008 A1 | 8/2003 | Liu |
| 2003/0193572 A1 | 10/2003 | Wilson et al. |
| 2003/0195041 A1 | 10/2003 | McCauley |
| 2003/0204361 A1 | 10/2003 | Townsend et al. |
| 2003/0216176 A1 | 11/2003 | Masuyama et al. |
| 2003/0220145 A1 | 11/2003 | Erickson et al. |
| 2003/0222851 A1 | 12/2003 | Lai et al. |
| 2003/0231189 A1 | 12/2003 | Williams |
| 2004/0028258 A1 | 2/2004 | Naimark et al. |
| 2004/0034289 A1 | 2/2004 | Teller et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0147317 A1 | 7/2004 | Ito et al. |
| 2004/0147318 A1 | 7/2004 | Shahoian et al. |
| 2004/0152515 A1 | 8/2004 | Wegmuller et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0222970 A1 | 11/2004 | Martinez et al. |
| 2004/0224638 A1 | 11/2004 | Fadell et al. |
| 2004/0227725 A1 | 11/2004 | Calarco et al. |
| 2004/0229693 A1 | 11/2004 | Lind et al. |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259644 A1 | 12/2004 | McCauley |
| 2004/0259651 A1 | 12/2004 | Storek |
| 2004/0266528 A1 | 12/2004 | Wang |
| 2004/0268393 A1 | 12/2004 | Hunleth et al. |
| 2005/0009605 A1 | 1/2005 | Rosenberg et al. |
| 2005/0017454 A1 | 1/2005 | Endo et al. |
| 2005/0020369 A1 | 1/2005 | Davis et al. |
| 2005/0032582 A1 | 2/2005 | Mahajan |
| 2005/0047621 A1 | 3/2005 | Cranfill |
| 2005/0054457 A1 | 3/2005 | Eyestone et al. |
| 2005/0070359 A1 | 3/2005 | Rodriquez et al. |
| 2005/0076161 A1 | 4/2005 | Albanna et al. |
| 2005/0078125 A1 | 4/2005 | Yamada et al. |
| 2005/0085298 A1 | 4/2005 | Woolston |
| 2005/0085299 A1 | 4/2005 | Murzanski et al. |
| 2005/0096111 A1 | 5/2005 | Beck |
| 2005/0104849 A1 | 5/2005 | Hoile |
| 2005/0125826 A1 | 6/2005 | Hunleth et al. |
| 2005/0130739 A1 | 6/2005 | Argentar |
| 2005/0134555 A1 | 6/2005 | Liao |
| 2005/0143173 A1 | 6/2005 | Barney et al. |
| 2005/0170889 A1 | 8/2005 | Lum et al. |
| 2005/0172734 A1 | 8/2005 | Alsio |
| 2005/0174324 A1 | 8/2005 | Liberty et al. |
| 2005/0176485 A1 | 8/2005 | Ueshima |
| 2005/0179644 A1 | 8/2005 | Alsio |
| 2005/0202870 A1 | 9/2005 | Kawamura |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0215322 A1 | 9/2005 | Himoto et al. |
| 2005/0217525 A1 | 10/2005 | McClure |
| 2005/0219221 A1 | 10/2005 | Ohkuri et al. |
| 2005/0233808 A1 | 10/2005 | Himoto et al. |
| 2005/0237303 A1 | 10/2005 | Yang |
| 2005/0239548 A1 | 10/2005 | Ueshima et al. |
| 2005/0243062 A1 | 10/2005 | Liberty |
| 2005/0243061 A1 | 11/2005 | Liberty et al. |
| 2005/0253806 A1 | 11/2005 | Liberty et al. |
| 2005/0255915 A1 | 11/2005 | Riggs et al. |
| 2005/0256675 A1 | 11/2005 | Kurata |
| 2005/0272471 A1 | 12/2005 | Sherman |
| 2006/0028446 A1 | 2/2006 | Liberty et al. |
| 2006/0030385 A1 | 2/2006 | Barnet et al. |
| 2006/0046849 A1 | 3/2006 | Kovacs |
| 2006/0048076 A1 | 3/2006 | Vronay et al. |
| 2006/0092133 A1 | 5/2006 | Touma et al. |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0146009 A1 | 7/2006 | Syrbe et al. |
| 2006/0148563 A1 | 7/2006 | Yang |
| 2006/0152487 A1 | 7/2006 | Grunnet-Jepsen et al. |
| 2006/0152488 A1 | 7/2006 | Salsman et al. |
| 2006/0152489 A1 | 7/2006 | Sweetser et al. |
| 2006/0154726 A1 | 7/2006 | Weston et al. |
| 2006/0178212 A1 | 8/2006 | Penzias |
| 2006/0205507 A1 | 9/2006 | Zalewski et al. |
| 2006/0231794 A1 | 10/2006 | Sakaguchi et al. |
| 2006/0247064 A1 | 11/2006 | Nguyen et al. |
| 2006/0250367 A1 | 11/2006 | Tabasso et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0264258 A1 | 11/2006 | Zalewski et al. |
| 2006/0264260 A1 | 11/2006 | Zalewski et al. |
| 2006/0282873 A1 | 12/2006 | Zalewski et al. |
| 2006/0284841 A1 | 12/2006 | Hong et al. |
| 2006/0287086 A1 | 12/2006 | Zalewski et al. |
| 2006/0287087 A1 | 12/2006 | Zalewski et al. |
| 2006/0291156 A1 | 12/2006 | Allen |
| 2007/0015588 A1 | 1/2007 | Matsumoto et al. |
| 2007/0021208 A1 | 1/2007 | Xiadong et al. |
| 2007/0049374 A1 | 3/2007 | Ikeda et al. |
| 2007/0050597 A1 | 3/2007 | Ikeda et al. |
| 2007/0052177 A1 | 3/2007 | Ikeda et al. |
| 2007/0060391 A1 | 3/2007 | Ikeda et al. |
| 2007/0066394 A1 | 3/2007 | Ikeda et al. |
| 2007/0066396 A1 | 3/2007 | Weston et al. |
| 2007/0072680 A1 | 3/2007 | Ikeda et al. |
| 2007/0091084 A1 | 4/2007 | Ueshima et al. |
| 2007/0093291 A1 | 4/2007 | Hulvey |
| 2007/0159362 A1 | 7/2007 | Shen |

(56) References Cited

U.S. PATENT DOCUMENTS

| | | |
|---|---|---|
| 2007/0159466 A1 | 7/2007 | Kawell et al. |
| 2007/0173705 A1 | 7/2007 | Teller et al. |
| 2007/0252815 A1 | 11/2007 | Kuo et al. |
| 2007/0265075 A1 | 11/2007 | Zalewski |
| 2007/0265076 A1 | 11/2007 | Lin et al. |
| 2007/0265088 A1 | 11/2007 | Nakada et al. |
| 2007/0268247 A1 | 11/2007 | Quatro |
| 2008/0014835 A1 | 1/2008 | Weston et al. |
| 2008/0015017 A1 | 1/2008 | Ashida et al. |
| 2008/0039202 A1 | 2/2008 | Sawano et al. |
| 2008/0121782 A1 | 5/2008 | Hotelling et al. |
| 2008/0174550 A1 | 7/2008 | Laurila |
| 2008/0273011 A1 | 11/2008 | Lin |
| 2008/0278445 A1 | 11/2008 | Sweetser et al. |
| 2008/0280660 A1 | 11/2008 | Ueshima et al. |
| 2009/0005166 A1 | 1/2009 | Sato |
| 2009/0036189 A1 | 2/2009 | Wang |
| 2009/0051653 A1 | 2/2009 | Barney et al. |
| 2009/0124165 A1 | 5/2009 | Weston |
| 2009/0156309 A1 | 6/2009 | Weston et al. |
| 2009/0209288 A1 | 8/2009 | Rofougaran |
| 2009/0280863 A1 | 11/2009 | Shin et al. |
| 2009/0291760 A1 | 11/2009 | Hepburn et al. |
| 2010/0069160 A1 | 3/2010 | Barrett et al. |
| 2010/0081505 A1 | 4/2010 | Alten et al. |
| 2010/0103141 A1 | 4/2010 | Challener et al. |
| 2010/0250815 A1 | 9/2010 | Street et al. |
| 2011/0076003 A1 | 3/2011 | Cho et al. |
| 2011/0098111 A1 | 4/2011 | Saito et al. |
| 2011/0118022 A1 | 5/2011 | Aronzon et al. |
| 2011/0126156 A1 | 5/2011 | Krishnaraj et al. |
| 2011/0143835 A1 | 6/2011 | Sizelove |
| 2011/0230178 A1 | 9/2011 | Jones et al. |
| 2011/0242138 A1 | 10/2011 | Tribble |
| 2011/0260969 A1 | 10/2011 | Workman |
| 2012/0039021 A1 | 2/2012 | Karwan |
| 2012/0108335 A1 | 5/2012 | Liotta et al. |
| 2012/0169597 A1 | 7/2012 | Liotta |
| 2012/0236485 A1 | 9/2012 | Staats et al. |
| 2012/0315989 A1 | 12/2012 | Young et al. |

FOREIGN PATENT DOCUMENTS

| | | |
|---|---|---|
| DE | 3930581 | 3/1991 |
| DE | 19701344 | 7/1997 |
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 1 524 334 | 3/1977 |
| EP | 0 835 676 | 4/1998 |
| EP | 0 848 226 | 6/1998 |
| EP | 0 852 961 | 7/1998 |
| EP | 1 062 994 | 12/2000 |
| EP | 1 279 425 | 1/2003 |
| EP | 1 293 237 | 3/2003 |
| EP | 993845 | 12/2005 |
| FR | 2847689 | 5/2004 |
| GB | 1524334 | 9/1978 |
| GB | 2 244 546 | 5/1990 |
| GB | 2244546 | 5/1990 |
| GB | 2284478 | 6/1995 |
| GB | 2307133 | 5/1997 |
| GB | 2316482 | 2/1998 |
| GB | 2319374 | 5/1998 |
| JP | 60-077231 | 5/1985 |
| JP | 03-074434 | 7/1991 |
| JP | 03-008103 | 8/1991 |
| JP | 03-059619 | 11/1991 |
| JP | 04-287888 | 10/1992 |
| JP | 05-056191 | 7/1993 |
| JP | 02-901476 | 12/1993 |
| JP | 06-050758 | 2/1994 |
| JP | 06-077387 | 4/1994 |
| JP | 03-262677 | 5/1994 |
| JP | 06-154422 | 6/1994 |
| JP | 03-000028 | 7/1994 |
| JP | 06-190144 | 7/1994 |
| JP | 06-198075 | 7/1994 |
| JP | 62-014527 | 8/1994 |
| JP | 03-194841 | 10/1994 |
| JP | 06-308879 | 11/1994 |
| JP | 03-228845 | 1/1995 |
| JP | 07-028591 | 1/1995 |
| JP | 07-044315 | 2/1995 |
| JP | 07-107573 | 4/1995 |
| JP | 07-022312 | 5/1995 |
| JP | 07-115690 | 5/1995 |
| JP | 03-517482 | 6/1995 |
| JP | 07-146123 | 6/1995 |
| JP | 07-200142 | 8/1995 |
| JP | 07-262797 | 10/1995 |
| JP | 07-295939 | 11/1995 |
| JP | 07-302148 | 11/1995 |
| JP | 07-318332 | 12/1995 |
| JP | 08-045392 | 2/1996 |
| JP | 08-071252 | 3/1996 |
| JP | 08-095704 | 4/1996 |
| JP | 08-106352 | 4/1996 |
| JP | 08-111144 | 4/1996 |
| JP | 08-114415 | 5/1996 |
| JP | 08-122070 | 5/1996 |
| JP | 08-152959 | 6/1996 |
| JP | 08-211993 | 8/1996 |
| JP | 08-221187 | 8/1996 |
| JP | 08-305355 | 11/1996 |
| JP | 08-335136 | 12/1996 |
| JP | 83-035136 | 12/1996 |
| JP | 09-230997 | 9/1997 |
| JP | 09-274534 | 10/1997 |
| JP | 09-319510 | 12/1997 |
| JP | 10-021000 | 1/1998 |
| JP | 10-033831 | 2/1998 |
| JP | 10-099542 | 4/1998 |
| JP | 10-154038 | 6/1998 |
| JP | 10-254614 | 9/1998 |
| JP | 10-268989 | 10/1998 |
| JP | 11-099284 | 4/1999 |
| JP | 11-114223 | 4/1999 |
| JP | 11-506857 | 6/1999 |
| JP | 2000-270237 | 9/2000 |
| JP | 2000-308756 | 11/2000 |
| JP | 2001-038052 | 2/2001 |
| JP | 30-078268 | 4/2001 |
| JP | 2001-104643 | 4/2001 |
| JP | 03-080103 | 6/2001 |
| JP | 2001-175412 | 6/2001 |
| JP | 2001-216072 | 8/2001 |
| JP | 2001-217926 | 8/2001 |
| JP | 2001-242958 | 9/2001 |
| JP | 2001-251324 | 9/2001 |
| JP | 2001-306245 | 11/2001 |
| JP | 2002-062981 | 2/2002 |
| JP | 2002-082751 | 3/2002 |
| JP | 2002-091692 | 3/2002 |
| JP | 2002-153673 | 5/2002 |
| JP | 2002-202843 | 7/2002 |
| JP | 2002-224444 | 8/2002 |
| JP | 2002-232549 | 8/2002 |
| JP | 2002-233665 | 8/2002 |
| JP | 2002-298145 | 10/2002 |
| JP | 2003-053038 | 2/2003 |
| JP | 34-22383 | 4/2003 |
| JP | 2003-236246 | 8/2003 |
| JP | 2003-325974 | 11/2003 |
| JP | 2004-062774 | 2/2004 |
| JP | 2004-313429 | 11/2004 |
| JP | 2004-313492 | 11/2004 |
| JP | 2005-040493 | 2/2005 |
| JP | 2005-063230 | 3/2005 |
| JP | 2003-140823 | 4/2006 |

(56) References Cited

FOREIGN PATENT DOCUMENTS

| | | |
|---|---|---|
| JP | 2006-113019 | 4/2006 |
| JP | 2002-136694 | 6/2006 |
| JP | 2006-136694 | 6/2006 |
| JP | 2006-216569 | 4/2007 |
| JP | 2007-083024 | 4/2007 |
| JP | 2007-203785 | 8/2007 |
| JP | 2007-283134 | 11/2007 |
| JP | 4255510 | 2/2009 |
| JP | 2012-139313 | 12/2010 |
| JP | D1407439 | 2/2011 |
| NL | 9300171 | 8/1994 |
| RU | 2125853 | 2/1999 |
| RU | 2126161 | 2/1999 |
| RU | 2141738 | 11/1999 |
| WO | 1994/002931 | 2/1994 |
| WO | 2004/039055 | 5/1994 |
| WO | 1996/005766 | 2/1996 |
| WO | 1997/009101 | 3/1997 |
| WO | 1997/012337 | 4/1997 |
| WO | 1997/017598 | 5/1997 |
| WO | 1997/028864 | 8/1997 |
| WO | 1997/032641 | 9/1997 |
| WO | 1998/011528 | 3/1998 |
| WO | 1999/058214 | 11/1999 |
| WO | 2000/033168 | 6/2000 |
| WO | 2000/035345 | 6/2000 |
| WO | 2000/047108 | 8/2000 |
| WO | 2000/063874 | 10/2000 |
| WO | 2001/087426 | 11/2001 |
| WO | 2001/091042 | 11/2001 |
| WO | 2002/017054 | 2/2002 |
| WO | 2002/034345 | 5/2002 |
| WO | 2003/015005 | 2/2003 |
| WO | WO 03/044625 | 5/2003 |
| WO | 2003/107260 | 6/2003 |
| WO | 2003/088147 | 10/2003 |
| WO | 2004/051391 | 6/2004 |

OTHER PUBLICATIONS

English Abstract for Japanese Patent No. JP11053994, published Feb. 26, 1999.
English Abstract for Japanese Patent No. JP11099284, published Apr. 13, 1999.
English Abstract for Japanese Patent No. JP2001038052, published Feb. 13, 2001.
English Abstract for Japanese Patent No. JP2002224444, published Aug. 13, 2002.
English Abstract for Japanese Patent No. JP2006136694, published Jun. 1, 2006.
English Abstract for Japanese Patent No. WO9732641, published Sep. 12, 1997.
"ASCII Grip One Handed Controller," One Switch-ASCII Grip One Handed Playstation Controller, http://www.oneswitch.org.uk/1/ascii/grip.htm , Jul. 11, 2008, pp. 1-2.
"ASCII Grip" One-Handed Controller The Ultimate One-Handed Controller Designed for the Playstation Game Console (ASCII Entertainment 1997).
"ASCII/Sammy Grip V2," One Switch-Accessible Gaming Shop-ASCII Grip V2, http://www.oneswitch.org.uk/1/AGS/AGS-onehand/ascii-grip-v2.html, Jul. 10, 2008, pp. 1-2.
"At-home fishing" 1 page, Dec. 1996-1999.
"*Coleco Vision: Super Action*™ *Controller Set.*" www.vintagecomputing.com/wp-content/images/retroscan/coleco_sac_1_large.jpg. (Sep. 2006).
"Controllers~Atari Space Age Joystick," *AtariAge: Have You Played Atari Today?*www.atariage.com/controller_page.html? SystemID=2600&ControllerID=12. (Sep. 2006).
"Controllers-Booster Grip," *AtariAge: Have You Played Atari Today?* www.atariage.com/controller_page.html?SystemID=2600 &ControllerID=18. (Sep. 2006).

"CYBER Rubber coat grip (for 3DS)" [online], searched on Dec. 13, 2013. CYBER Gadget Corporation, Internet <URL: http://www.home.cybergadget.co.jp/products/4544859012082/> and English translation thereof, 3 pages.
"Electronic Plastic: BANDAI—Power Fishing", "Power Fishing Company: BANDAI", 1984, 1 page, http:/www.handhelden.com/Bandai/PowerFishing.html.
"Ezplus Controller," Japanese Wikipedia, Last Modified May 10, 2015, Accessed Feb. 2, 2016. <https://ja.wikipedia.org/wiki/Ezplus%E3%82%B3%E3%83%B3%E3%83%88%E3%83%AD%E3%83%BC%E3%83%A9> Translation provided by Google Translate on Feb. 2, 2016.
"*Game Controller*" Wikipedia, Aug. 2010, 8 pages, http://en.wikipedia.org/w/index.php?title=Game_controller&oldid=21390758.
"Game Controller" Wikipedia, Jan. 5, 2005.
"Get Bass", Videogame by Sega, The International Arcade Museum and the KLOV, 1998, 4 pages.
"*Glove-based input interfaces*", Cyberglove/Cyberforce, Jun. 1991, 12 pages, http://www.angelfire.com/ca7/mellott124/glove1.htm.
"iControlPad", searched on Dec. 13, 2013, Wikipedia, Internet <URL: http://www.en.wikipedia.org/wiki/IControlPad>, 6 pages.
"Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005.
"LPC2104/2105/2106, Single-chip 32-bit microcontrollers; 128 kB ISP/IAP Flash with 64 kB/32 kB/16 kB RAM", Phillips, Dec. 22, 2004; 32 pages.
"MEMS enable smart golf clubs" Small Times—MEMS enable smart golf clubs, Jan. 6, 2005, 2 pages.
"Self-Contained, Free Standing "Fishing Rod" Fishing Games,"Miacomet and Interact Announce Agreement to Launch Line of Reel Feel™ Sport Controllers, Press Release, May 13, 1999, 4 pages.
"Superfamicom Grip controller by ASCII," http://superfami.com/sfc_grip.html, Jul. 10, 2008, pp. 1-2.
20 2006 020 818 (UM1) (Oct. 15, 2010) and original German text.
20 2006 020 819 (UM2) (Oct. 15, 2010) and original German text.
20 2006 020 820 (UM3) (Oct. 15, 2010) and original German text.
Acar, "Robust Micromachined Vibratory Gyroscopes" Dissertation (Dec. 2004).
Acar, et al., "Experimental evaluation and comparative analysis of commercial variable-capacitance MEMS accelerometers," Journal of Micromechanics and Microengineering, vol. 13 (1), pp. 634-645 (May 2003).
Achenbach, "Golf's New Measuring Stick," Golfweek, Jun. 11, 2005, 1 page.
ACT Labs: Miacomet Background, 1 page, May 1999, http://www.act-labs.com/realfeel_background/htm.
Agard, "Advances in Strapdown Inertial Systems," Lecture Series: Advisory Group for Aerospace Research and Development Neuilly-Sur-Seine (France) 1984.
AirPad Controller Manual (AirPad Corp. 2000).
Airpad Motion Reflext Controller for Sony Playstation—Physical Product (AirPad Corp.2000).
Albrecht, "An Adaptive Digital Filter to Predict Pilot Head Look Direction for Helmet-mounted Displays," MS Thesis University of Dayton (copy unavailable) (1989).
Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).
Algrain, et al., "Accelerometer Based Line-of-Sight Stabilization Approach for Pointing and Tracking System," Second IEEE Conference on Control Applications, vol. 1 , Issue 13-16 pp. 159-163 (Sep. 1993).
Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).
Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).

(56) References Cited

OTHER PUBLICATIONS

Allen, et al., "Tracking: Beyond 15 Minutes of Thought," SIGGRAPH 2001 Course 11 (Course Pack) from Computer Graphics (2001).
Alves, "Extended Kalman filtering applied to a full accelerometer strapdown inertial measurement unit," M.S. Thesis Massachusetts Institute of Technology. Dept. of Aeronautics and Astronautics, Santiago (1992).
Analog Devices "ADXL202E Low-Cost ±2 g Dual-Axis Accelerometer with Duty Cycle Output" (Data Sheet), Rev. A (2000).
Analog Devices "ADXL330 Small, Low Power, 3-Axis ±2 g iMEMS Accclerometer" (Data Sheet), Rev. PrA (2005).
Analog Devices "ADXL50 Monolithic Accelerometer with Signal Conditioning" Datasheet (1996).
Analog Devices "ADXL50 Single Axis Accelerometer" (Data Sheet), http:www.analog.com/en/obsolete/adxl50/products/product.html (Mar. 1996).
Analog Devices "ADXRS150 ±150°/s Single Chip Yaw Rate Gyro with Signal Conditioning" (Data Sheet), Rev. B (2004).
Analog Devices "ADXRS401 ±75°/s Single Chip Yaw Rate Gyro with Signal Conditioning" (Data Sheet), Rev. O (2004).
Analog Devices Data Sheet, "MicroConverter®, Multichannel 12-Bit ADC with Embedded Flash MCU, ADuC812" (2003) (http://www.analog.com/static/imported-files/data_sheets/ADUC812.pdf) 60 pages.
Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).
Apostolyuk, Vladislav, "Theory and design of micromechanical vibratory gyroscopes," MEMS/NEMS Handbook, Spring, 2006, vol. 1, pp. 173-195 (2006).
Arcanatech, "IMP User's Guide" (1994).
Arcanatech, IMP (Photos) (1994).
Ascension Technology, The Bird 6D Input Devices (specification) (1998).
ASCII, picture of one-handed controller, 2 pages (Feb. 6, 2006).
Ashida et al., entitled, "Game Controller," U.S. Appl. No. 11/790,780, filed Apr. 27, 2007, pending.
Ator, "Image-Velocity with Parallel-Slit Reticles," Journal of the Optical Society of America (Dec. 1963).
Azarbayejani, et al, "Real-Time 3-D Tracking of the Human Body," Proceedings of IMAGE'COM 96 (1996).
Azarbayejani, et al., "Visually Controlled Graphics," IEEE Transactions on Pattern Analysis and Machine Intelligence, vol. 15, No. 6, pp. 602-605 (Jun. 1993).
Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).
Azuma et al., "Making Augmented Reality Work Outdoors Requires Hybrid Tracking," Proceedings of the International Workshop on Augmented Reality, San Francisco, CA, Nov. 1, 1998, Bellevue, Washington, pp. 219-224 (1999).
Azuma, "Predictive Tracking for Augmented Reality," Ph.D. Dissertation, University of North Carolina at Chapel Hill (1995).
Azuma, et al., "A Frequency-Domain Analysis of Head-Motion Prediction," Proceedings of SIGGRAPH '94, pp. 401-408 (1995).
Azuma, et al., "A motion-stabilized outdoor augmented reality system," Proceedings of IEEE Virtual Reality '99, Houston, TX (Mar. 1999).
Bachmann et al., "Inertial and Magnetic Posture Tracking for Inserting Humans into Networked Virtual Enviromnents," Virtual Reality Software and Technology archive, Proceedings of the ACM Symposium on Virtual Reality Software and Technology, Baniff, Alberta, Canada, pp. 9-16 (2001).

Bachmann et al., "Orientation Tracking for Humans and Robots Using Inertial Sensors" (CIRA '99), Naval Postgraduate School, Monterey, CA (1999).
Bachmann, "Inertial and Magnetic Angle Tracking of Limb Segments for Inserting Humans into Synthetic Environments," Dissertation, Naval Postgraduate School, Monterey, CA (Dec. 2000).
Baker et al., "Active Multimodal Control of a Floppy Telescope Structure," Proc. SPIE, vol. 4825, 74 (Mar. 2003).
Balakrishnan, "The Rockin' Mouse: Integral 3D Manipulation on a Plane," (CHI '97), Univ. Toronto, (1997).
Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).
Baraff, "An Introduction to Physically Based Modeling," SIGGRAPH 97 Course Notes (1997).
Bass Fishing "Legends of the Lake", Radica 2 pages, 2002.
Baudisch, et al., "Soap: a pointing device that works in mid-air" Proc. UIST (2006).
BBN Report, "Virtual Environment Technology for Training (VETT)," The Virtual Environment and Teleoperator Research Consortium (VETREC) (Mar. 1992).
Behringer, "Improving Registration Precision Through Visual Horizon Silhouette Matching," Proceedings of the international workshop on Augmented reality : placing artificial objects in real scenes: placing artificial objects in real scenes, Bellevue, Washington; United States pp. 225-232 (1999).
Behringer, "Registration for Outdoor Augmented Reality Applications Using Computer Vision Techniques and Hybrid Sensors," Virtual Reality, 1999 Proceedings., IEEE Computer Society, pp. 244-261 (1999).
BEI Systron Donner Inertial Division, Gyrochip Theory of Operation (copy unavailable) (2001).
BEI, "BEI GyrochipTM Model QRS11 Data Sheet," BEI Systron Donner Inertial Division, BEI Technologies, Inc., (Sep. 1998).
Benbasat, "An Inertial Measurement Unit for User Interfaces," Massachusetts Institute of Technology Dissertation, (Sep. 2000).
Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI 2298, at 9-20, I. Wachsmuth and T. Sowa (eds.), Springer-Verlag Berlin Heibelberg (2001, 2002).
Beuter, A., Publications, University of Quebec at Montreal, http://www.er.uqam.ca/nobel/rl1040/publicat.htm (Aug. 2007).
BGM-109 Tomahawk, http://en.wikipedia.org/wiki/BGM-109_Tomahawk, Wikipedia, Jan. 2009.
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech." Inc. Article (Jun. 1992).
Bishop, "The Self-Tracker: A Smart Optical Sensor on Silicon," Ph.D. Dissertation, Univ. of North Carolina at Chapel Hill (1984).
Bishop, et al., "Grids Progress Meeting" (Slides), University of North Carolina at Chapel Hill, NC (1998).
Bishop, et al., Self-Tracker: Tracking for Hybrid Environments without Infrastructure (1996).
Bloomberg: Nintendo Announces Wireless GBA Link, Sep. 2003, 2 pages.
Bona, et al., "Optimum Reset of Ship's Inertial Navigation System," IEEE Transactions on Aerospace and Electronic Systems (1965).
Borenstein, et al., "Where am I? Sensors and Methods for Mobile Robot Positioning" (1996).
Boser, "3-Axis Accelerometer with Differential Sense Electronics," http://www.eecs.berkeley.edu/~boser/pdf/3axis.pdf (1997).
Boser, "Accelerometer Design Example: Analog Devices XL-05/5," http://www.eecs.berkeley.edu/~boser/pdf/xl05.pdf (1996).
Bowman et al., 3D User Interfaces: Theory and Practice, Addison-Wesley, Inc., (2005).
Bowman, et al., "An Introduction to 3-D User Interface Design," MIT Presence, vol. 10, No. 1, pp. 96-108 (2001).

(56) References Cited

OTHER PUBLICATIONS

Briefs (New & Improved) (Brief Article), PC Magazine, Oct. 26, 1993.
Britton et al., "Making Nested rotations Convenient for the User," ACM SIGGRAPH Computer Graphics, vol. 12, Issue 3, pp. 222-227 (Aug. 1978).
Britton, "A Methodology for the Ergonomic Design of Interactive Computer Graphic Systems, and its Application to Crystallography" (UNC Thesis) (1977).
Brownell, Richard: Review of Peripheral-GameCube-G3 Wireless Controller, GAF, Jul. 17, 2003, 2 pages.
Buchanan, Levi: "Happy Birthday, Rumble Pak," IGN.com, Apr. 3, 2008, 2 pages.
Business Wire, "Feature/Virtual reality glasses that interface to Sega channel," Time Warner, TCI: project announced concourrent with COMDEX (Nov. 1994).
Business Wire, "Free-space 'Tilt' Game Controller for Sony Playstation Uses Scenix Chip; SX Series IC Processes Spatial Data in Real Time for On-Screen" (Dec. 1999).
Business Wire, "InterSense Inc. Launches InertiaCube2—The World's Smallest Precision Orientation Sensor With Serial Interface" (Aug. 14, 2001).
Business Wire, "Logitech Magellan 3D Controller," Logitech (Apr. 1997).
Business Wire, "Mind Path Introduces Gyropoint RF Wireless Remote" (Jan. 2000).
Business Wire, "Pegasus' Wireless PenCell Writes on Thin Air with ART's Handwriting Recognition Solutions," Business Editors/High Tech Writers Telecom Israel 2000 Hall 29, Booth 19-20 (Nov. 2000).
Business Wire, "RPI ships low-cost pro HMD Plus 3D Mouse and VR PC graphics card system for CES" (Jan. 1995).
Buxton et al., "A Study in Two-Handed Input," ACM CHI '86 Proceedings (1986).
Buxton, Bill, "Human input/output devices," In M. Katz (ed.), Technology Forecast: 1995, Menlo Park, C.A.: Price Waterhouse World Firm Technology Center, 49-65 (1994).
Buxton, Bill, A Directory of Sources for Input Technologies, http://www.billbuxton.com/InputSources.html, Apr. 2001 (last update 2008).
Byte, "Imp Coexists With Your Mouse," What's New, ArcanaTec (Jan. 1994).
Canaday, R67-26 "The Lincoln Wand," IEEE Transactions on Electronic Computers, vol. EC-16, No. 2, p. 240 (Apr. 1967).
Caruso et al., "New Perspective on Magnetic Field Sensing," Sensors Magazine (Dec. 1998).
Caruso et al., "Vehicle Detection and Compass Applications using AMR Magnetic Sensors," Honeywell (May 1999).
Caruso, "Application of Magnetoresistive Sensors in Navigation Systems," Sensors and Actuators, SAE SP-1220, pp. 15-21 (Feb. 1997).
Caruso, "Applications of Magnetic Sensors for Low Cost Compass Systems," Honeywell, SSEC, http://www.ssec.honeywell.com/magnetic/datasheets/lowcost.pdf (May 1999).
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with large-scale display systems using infrared laser tracking devices," ACM International Conference Proceeding Series; vol. 142 (2003).
Cho, et al., "Magic Wand: A Hand-Drawn Gesture Input Device in 3-D Space with Inertial Sensors," Proceedings of the 9th Intl Workshop on Frontiers in Handwriting Recognition (IWFHR-9 2004), IEEE (2004).
CNET News.com, http://news.com.com/2300-1043_3-6070295-2.html?tag=ne.gall.pg, "Nintendo Wii Swings Into Action," May 25, 2006, 1pg.
Computer Mouse (Wikipedia) (Jul. 5, 2005).
Computergram, "RPI Entertainment Pods Improve Virtual Experience" (1995).
Cookbook, Numerical Recipes Electronic Edition, http://www.library.cornell.edu/nr/cbookcpdf.html (2000?).
Cooke, et al., "NPSNET: flight simulation dynamic modeling using quaternions," Presence, vol. 1, No. 4, pp. 404-420, MIT Press (1992/1994).
Crossan, A. et al.: A General Purpose Control-Based Trajectory Playback for Force-Feedback Systems, University of Glasgow, Dept. Computing Science, 4 pages (Feb. 2008).
CSIDC Winners—Tablet-PC Classroom System Wins Design Competition, IEEE Computer Society Press, vol. 36, Issue 8, pp. 15-18, IEEE Computer Society (Aug. 2003).
Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).
Foxlin, "Inertial Head-Tracking," MS Thesis, Massachusetts Institute of Technology, Dept. of Electrical Engineering and Computer Science (Sep. 1993).
Foxlin, "Motion Tracking Requirements and Technologies," Chapter 7, from Handbook of Virtual Environment Technology, Stanney Kay, Ed. (2002).
Foxlin, "Pedestrian Tracking with Shoe-Mounted Inertial Sensors," IEEE Computer Graphics and Applications, vol. 25, No. 6, pp. 38-46 (Nov. 2005).
Foxlin, et al., "Constellation: A Wide-Range Wireless Motion-Tracking System for Augmented Reality and Virtual Set Applications," ACM SIGGRAPH, pp. 372-378 (1998).
Foxlin, et al., "VIS-Tracker: A Wearable Vision-Inertial Self-Tracker," IEEE Computer Society (2003).
Frankie, "E3 2002: Roll O Rama", IGN: Roll-O-Rama Preview, . 3 pages. E3 Demo of Kirby Game ("Roll O Rama"), http://cube.ign.com/objects/482/482164.html, (May 23, 2002).
Freiburg Center for Data Analysis and Modeling—Publications, http://www.fdm.uni-freiburg.de/cms/puplications/publications/ (Aug. 2007).
Friedmann, et al., "Device Synchronization Using an Optimal Linear Filter," SI3D '92: Proceedings of the 1992 symposium on Interactive 3D graphics, pp. 57-62 (1992).
Friedmann, et al., "Synchronization in virtual realities," MIT Presence, vol. 1, No. 1, pp. 139-144 (1992).
Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html (2003).
FrontSide Field Test, "Get This!" Golf Magazine, Jun. 2005, p. 36.
Fuchs, "Inertial Head-Tracking," Massachusetts Institute of Technology, Sep. 1993.
Furniss, Maureen, "Motion Capture," MoCap MIT (Dec. 1999) 12 pages.
Gamecubicle, Jim—New Contributor, Nintendo WaveBird Control, http://www.gamecubicle.com/news-nintendo_gamecube_wavebird_controller.htm, May 14, 2002.
Green et al.: "ADI's iMEMS Angular Rate-Sensing Gyroscope" pp. 1-3 (2003).
Gelmis, J.: "Ready to Play, The Future Way", Jul. 23, 1996, Buffalo News.
Goschy, "Midway Velocity Controller" (Youtube Video http://www.youtube.com/watch?v=wjlhsrsxfnw) (Sep. 8, 2007).
Grewal et al., "Global Positioning Systems, Inertial Navigation and Integration," 2001.
Grimm et al., "Real-Time Hybrid Pose Estimation from Vision and Inertial Data," Proceedings, First Canadian Conference on Computer and Robot Vision, pp. 480-486 (2004).
Gyration Inc., "The Magic Inside GyroPoint" (copy unavailable).
Gyration Ultra Cordless Optical Mouse, Setting Up Ultra Mouse, Gyration Quick Start Card part No. DL00071-0001 Rev. A. Gyration, Inc. (Jun. 2003).
Gyration Ultra Cordless Optical Mouse, User Manual, 1-15, Gyration, Inc., Saratoga, CA (2003).
Gyration, "Gyration GP110 Ultra Cordless Optical Mouse Data Sheet," http://www.gyration.com/descriptions/document/GP110-SPEC-EN.pdf (2002).

(56) References Cited

OTHER PUBLICATIONS

Gyration, "Gyration GP110 Ultra Cordless Optical Mouse User Manual," http://www.gyration.com/descriptions/document/GP110-MANUAL-EN.pdf (2002).
Gyration, "Gyration MicroGyro 100 Developer Kit Data Sheet," http://web.archive.org/web/19980708122611/www.gyration.com/html/devkit.html (Jul. 1998).
Gyration, "Gyration Ultra Cordless Optical Mouse," photos (2002).
Gyration, Inc., GyroRemote and Mobile RF Keyboard User Manual, Saratoga, CA 24 pages, www.theater.stevejenkins.com/docs/Gyration_Keyboard_Manual (Mar. 9, 2011).
Gyration, Inc., GyroRemote GP24-001 Professional Series, copyrighted 2003, www.gyration.com.
Hamilton Institute, http://www.dcs.gla.ac.uk/.about.rod/, R. Murray-Smith (Aug. 2007).
Harada, et al., "Portable Absolute Orientation Estimation Device with Wireless Network under Accelerated Situation" Proceedings, 2004 IEEE International Conference on Robotics and Automation, vol. 2, Issue , Apr. 26-May 1, 2004 pp. 1412-1417 vol. 2 (Apr. 2004).
Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).
Hartley, Matt, "Why Is the Nintendo Wii so Successful?", Smarthouse—The Lifestyle Technology Guide Website (Sep. 12, 2007).
Haykin, et al., "Adaptive Tracking of Linear Time-Variant Systems by Extended RLS Algorithms, IEEE Transactions on Signal Processing," vol. 45, No. 5 (May 1997).
Heath, "Virtual Reality Resource Guide AI Expert," v9 n5 p32(14) (May 1994).
HiBall-3100—"Wide-Area, High-Precision Tracker and 3D Digitizer," www.3rdtech.com/HiBall.htm 4 pages.
Hinckley, "Haptic Issues for Virtual Manipulation," Thesis (Dec. 1996).
Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).
Hinckley et al.: "A Survey of Design Issues in Spatial Input," Proceedings of the ACM Symposium on User Interface Software and Technology (1994).
Hinckley et al.: Portal: "The Guide to Computing Literature—Stitching: pen gestures that span multiple displays," Proceedings of the working conference on Advanced Visual Interfaces, 2004.
Hinckley et al.: "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).
Hinckley et al.: Synchronomous gestures for multiple persons and computers, 2003.
Hinckley et al.: "The VideoMouse: A Camera-Based Multi-Degree-of-Freedom Input Device," CHI Letters vol. 1, 1, UIST '99, Asheville, NC, pp. 103-112 (1999).
Hogue, "Marvin: A Mobile Automatic Realtime Visual and INertial tracking system," Master's Thesis, York University (2003).
Hogue, et al., "An optical-inertial tracking system for fully-enclosed VR displays," Proceedings of the 1st Canadian Conference on Computer and Robot Vision, pp. 22-29 (May 2004).
Holden, Maureen K., et al.: Use of Virtual Environments in Motor Learning and Rehabilitation Department of Brain and Cognitive Sciences, Handbook of Virtual Environments: Design, Implementation, and Applications, Chap. 49, pp. 999-1026, Stanney (ed), Lawrence Erlbaum Associates 2002.
Hollands, Robin, "Sourceless Trackers," VR News (copy unavailable) (Apr. 1995).
Holloway, Richard Lee, "Registration Errors in Augmented Reality Systems," Ph.D. Dissertation, University of North Carolina at Chapel Hill (1995).
House, Matthew, Product Description: Hot Wheels Stunt Track Driver, Hot Wheels (Jan. 2000).
http://www.intersense.com/IS-1200_Systems.aspx.
http://www.youtube.com/watch?v=7xKLCvDGMgY&feature=channel_page (Jan. 2008).
Hudson Soft—Screen Shot of Brave Spirits (1998).
Hudson Soft, "Brochure of Toukon Road Brave Warrior, Brave Spirits" (1998).
Immersion CyberGlove product, Immersion Corporation, 1990, http://www.cyberglovesystem.com.
Immersion, Cyberforce.
Inman, "Cheap sensors could capture your every move," http://technology.newscientist.com/article/dn12963-cheap-sensors-could-capture-your-every-move.html (Nov. 2007).
Intersense, "InterSence Inc., The New Standard in Motion Tracking" www.isense.com Mar. 27, 2004.
Intersense, "InterSense InertiaCube2 Devices," (Specification) (image) (2001).
Intersense, "InterSense InertiaCube2 Manual for Serial Port Model" (2001).
Intersense, InterSense IS 900 Technical Overview—Motion Tracking System, 1999.
Intersense, "InterSense IS-1200 FlightTracker Prototype Demonstration" (Video) (Nov. 2004).
Intersense, "InterSense IS-1200 InertiaHawk Datasheet" (2009).
Intersense, "InterSense IS-1200 VisTracker Datasheet" (2007).
Intersense, "InterSense IS-1200 VisTracker Devices," (image) (2007).
Intersense, "InterSense IS-900 MicroTraxTM Datasheet" (2007).
Intersense, "InterSense IS-900 Systems Datasheet" (2007).
Intersense, "InterSense MicroTrax Demo Reel," http://www.youtube.com/watch?v=O2F4fu_CISo (2007).
Intersense, "InterSense Mobile Mixed Reality Demonstration" (Video), http://www.youtube.com/watch?v=daVdzGK0nUE&feature=channel_page (Oct. 2006).
Intersense, "InterSense Motion Gaming Tech Demo," http://www.youtube.com/watch?v=7-3y5tdju4E, InterSense (Mar. 2008) (Video).
Intersense, "InterSense Motion Trackers" www.isense.com Mar. 12, 1998.
Intersense, "IS-1200 VisTracker Augmented Maintenance Demonstration" (Video), http://www.intersense.com/IS-1200_Systems.aspx, http://www.youtube.com/watch?v=IMI78s91WQo&feature=channel_page (Jan. 2009).
Intersense, "IS-1200 VisTracker Industrial Cart Demonstration" (Video), InterSense.
Intersense, "*IS-900 Precision Motion Trackers*" www.isense.com Dec. 18, 2013.
Intersense, "IS-900 Precision Motion Trackers" www.isense.com Sep. 10, 2002.
Intersense, "IS-900 Product Technology Brief," http://www.intersense.com/uploadedFiles/Products/White_Papers/IS900_Tech_Overview_.
Intersense, "*Technical Overview IS-900 Motion Tracking System*" www.isense.com, Apr. 2004.
Intersense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).
Interview with Pat Goschy (youtube video http://www.youtube.com/watch?v=oKtZysYGDLE) (Jan. 14, 2008).
Izumori et al, High School Algebra: Geometry (1986).
Jacob, "Human-Computer Interaction—Input Devices" http://www.cs.tufts.edu/~jacob/papers/surveys.html, "Human-Computer Interaction: Input Devices," ACM Computing Surveys, vol. 28, No. 1, pp. 177-179 (Mar. 1996).
Jakubowsk, et al., "Increasing Effectiveness of Human Hand Tremor Separation Process by Using Higher-Order Statistics," Measurement Science Review, vol. 1 (2001).
Jakubowski, et al., "Higher Order Statistics and Neural Network for Tremor Recognition," IEEE Transactions on Biomedical Engineering, vol. 49, No. 2 (Feb. 2002).

(56) References Cited

OTHER PUBLICATIONS

Ji, H.: "Study on the Infrared Remote-Control Lamp-Gesture Device", Yingyong Jiguang/Applied Laser Technology, v. 17, n. 5, p. 225-227, Oct. 1997 Language: Chinese-Abstract only.
Jian, et al., "Adaptive Noise Cancellation," Rice University, http://www.ece.rice.edu/.about.klwang/elec434/elec434.htm, (Aug. 2007).
Jiang, "Capacitive position-sensing interface for micromachined inertial sensors," Dissertation at Univ. of Cal. Berkley (2003).
Ju, et al., "The Challenges of Designing a User Interface for Consumer Interactive Television Consumer Electronics Digest of Technical Papers.," IEEE 1994 International Conference on Volume, Issue , Jun. 21-23, 1994 pp. 114-115 (Jun. 1994).
Kalawsky, "The Science of Virtual Reality and Virtual Environments," 1993.
Keir, et al., "Gesture-recognition with Non-referenced Tracking," IEEE Symposium on 3D User Interfaces, pp. 151-158 (Mar. 25-26, 2006).
Kennedy, P.J., "Hand-Held Data Input Device," IBM Technical Disclosure Bulletin, vol. 26, No. 11, pp. 5826-5827 (Apr. 1984).
Kessler, et al., "The Simple Virtual Environment Library" (MIT Presence) (2000).
Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).
Klein et al., "Tightly Integrated Sensor Fusion for Robust Visual Tracking," British Machine Vision Computing, vol. 22, No. 10, pp. 769-776 (2004).
Kohler, "Triumph of the Wii: How Fun Won Out in the Console Wars," www.wired.com/print/gaming/hardware/news/2007/06/wii. (Jun. 2007).
Kohlhase, "NASA Report, The Voyager Neptune travel guide," Jet Propulsion Laboratory Publication 89-24, excerpt (Jun. 1989).
Krumm, et al.,"How a Smart Environment Can Use Perception," Ubicomp 2001 (Sep. 2001).
Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).
Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland (Sep. 10-13, 2000).
La Scala, et al., "Design of an Extended Kalman Filter Frequency Tracker," IEEE Transactions on Signal Processing, vol. 44, No. 3 (Mar. 1996).
Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).
Laughlin, et al., "Inertial Angular Rate Sensors: Theory and Applications," SENSORS Magazine (Oct. 1992).
Lee et al., "Tilta-Pointer: the Free-Space Pointing Device," Princeton COS 436 Project, http://www.milyehuang.com/cos436/project/specs.html (2004).
Lee, et al., "Innovative Estimation Method with Measurement Likelihood for all-Accelerometer Type Inertial Navigation System," IEEE Transactions on Aerospace and Electronic Systems, vol. 38, No. 1 (Jan. 2002).
Lee, et al., "Two-Dimensional Position Detection System with MEMS Accelerometer for Mouse Applications" Design Automation Conference, 2001. Proceedings, 2001 pp. 852-857 (Jun. 2001).
Leganchuk et al., "Manual and Cognitive Benefits of Two-Handed Input: An Experimental Study," ACM Transactions on Computer-Human Interaction, vol. 5, No. 4, pp. 326-359 (Dec. 1998).
Leonard, "Computer Pointer Controls 3D Images in Free Space," Electronic Design, pp. 160, 162, 165 , (Nov. 1991).
Liang, et al., "On Temporal-Spatial Realism in the Virtual Reality Environment," ACM 1991 Symposium on User Interface Software and Technology (Nov. 1991).
Link, "Field-Qualified Silicon Accelerometers From 1 Milli g to 200,000 g," SENSORS (Mar. 1993).
Liu, et al., "Enhanced Fisher Linear Discriminant Models for Face Recognition," Proc. 14.sup.th International Conference on Pattern Recognition, Queensland, Australia (Aug. 1998).
Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).
Logitech WingMan Cordless Rumblepad, Logitech, Press Release Sep. 2, 2001, 2 pages.
Logitech, Logitech 2D/6D Mouse Devices Specification (1991).
Logitech, "Logitech 2D/6D Mouse Technical Reference Manual" (1991).
Logitech, "Logitech Tracker—Virtual Reality Motion Tracker." http://www.vrealities.com/logitech.html (webpage).
Logitech, Inc., "3D Mouse & Head Tracker Technical Reference Manual" (1992).
Louderback, Jim, "Nintendo Wii," Reviews by PC Magazine, (Nov. 13, 2006).
Luinge, Inertial sensing of human movement, Thesis, University of Twente (2002).
Luinge, et al., "Estimation of orientation with gyroscopes and accelerometers," Proceedings of the First Joint BMES/EMBS Conference, 1999, vol. 2, p. 844 (Oct. 1999).
Luthi, P. et al., "Low Cost Inertial Navigation System," and translation (2000).
Mackenzie et al., "A two-ball mouse affords three degrees of freedom," Extended Abstracts of the CHI '97 Conference on Human Factors in Computing Systems, pp. 303-304, New York: ACM (1997).
Mackinlay, "Rapid Controlled Movement Through a Virtual 3D Workspace," ACM SIGGRAPH Computer Graphics archive, vol. 24 , No. 4, pp. 171-176 (Aug. 1990).
Maclean, "Designing with Haptic Feedback", Proceedings of IEEE Robotics and Automation (ICRA '2000), at 783-88 (Apr. 22-28, 2000).
Maclean, Karen, Publications and patents, bibliography (Nov. 2006).
Maggioni, C., "A novel gestural input device for virtual reality", IEEE Virtual Reality Annual International Symposium (Cat. No. 93CH3336-5), 118-24, 1993.
Markey et al., "The Mechanics of Inertial Position and Heading Indication," Massachusetts Institute of Technology, 1961.
Marrin, "Possibilities for the Digital Baton as a General-Purpose Gestural Interface", Late-Breaking/Short Talks, CHI 97. Mar. 22-27, 1997 (pp. 311-312).
Marrin, Teresa et al.: "The Digital Baton: a Versatile Performance Instrument" (1997).
Marrin, Teresa: "Toward an Understanding of Musical Gesture: Mapping Expressive Intention with the Digital Baton" (1996).
Marti et al., "Biopsy Navigator: A Smart Haptic Interface for Interventional Radiological Gestures", International Congress Series, vol. 1256, Jun. 2003, 6 Pages.
Masliah, "Measuring the Allocation of Control in 6 Degree of Freedom Human-Computer Interaction Tasks," Proceedings of the SIGCHI conference on Human factors in computing systems, pp. 25-32 (2001).
Maybeck, "Stochastic Models, Estimation and Control," vol. 1, Mathematics in Science and Engineering, vol. 141 (1979).
Merians, Alma S. et al.: "Virtual Reality-Augmented Rehabilitation for Patients Following Stroke," Physical Therapy, vol. 82, No. 9 (Sep. 2002).
Merrill, "FlexiGesture: A sensor-rich real-time adaptive gesture and affordance learning platform for electronic music control," Thesis, Massachusetts Institute of Technology (Jun. 2004).
Meyer et al., "A Survey of Position Tracker," vol. 1, Issue 2, pp. 173-200, MIT Presence, (1992).
Microsoft Research Corp., "XWand Devices" (image) (Apr. 2009).
Miles, "New pads lack control," The Times, Dec. 6, 1999 (Dec. 1999).
Mizell, "Using Gravity to Estimate Accelerometer Orientation," IEEE Computer Society (2003).
Morgan, C.; "Still chained to the overhead projector instead of the podium? (TV Interactive Corp's LaserMouse Remote Pro infrared

(56) References Cited

OTHER PUBLICATIONS mouse) (Clipboard)(Brief Article) (Product Announcement)", Government Computer News, Jun. 13, 1994.
Morris, "Accelerometry—a technique for the measurement of human body movements," J Biomechanics 6: 729-736 (1973).
Moser, "Low Budget Inertial Navigation Platform (2000)," www.tmoser.ch/typo3/11.0.html, Oct. 2008.
Mulder, "How to Build an Instrumental Glove Based on the Powerglove Flex Sensors," PCVR 16, pp. 10-14 (1994).
Mulder, "Human movement tracking technology," School of Kinesiology, Simon Fraser University (Jul. 1994).
Myers, et al., "Interacting at a Distance: Measuring the Performance of Laser Pointers and Other Devices," CHI 2002, (Apr. 2002).
N.I.C.E., "*The N.I.C.E. Project*" (video). (1997) http://www.niceproject.com/.
Naimark, et al., "Circular Data Matrix Fiducial System and Robust Image Processing for a Wearable Vision-Inertial Self-Tracker," Proceedings. International Symposium on Mixed and Augmented Reality, ISMAR (2002).
Naimark, et al., "Encoded LED System for Optical Trackers," Fourth IEEE and ACM International Symposium on Mixed and Augmented Reality, pp. 150-153 (2005).
Navarrete, et al., "Eigenspace-based Recognition of Faces: Comparisons and a new Approach," Image Analysis and Processing (2001).
Newswire PR, "Five New Retailers to Carry Gyration's Gyropoint Point and Gyropoint Pro" (1996).
Newswire PR, "Three-Axis MEMS-based Accelerometer From STMicroelectronics Targets Handheld Terminals," STMicro (Feb. 2003).
Nichols, "Geospatial Registration of Information for Dismounted Soldiers (GRIDS)," Contractor's Progress, Status, and Management Report (Milestone 3 Report to DARPA ETO) (Oct. 1998).
Nintendo Game Boy. Consumer Information and Precautions Booklet, Nintendo, Jul. 31, 1969.
Nintendo Wavebird Controller, Nintendo, Jun. 2010 Wikipedia Article, http://en.wikipedia.org/wiki/wavebird.
Nintendo World Report: Nintendo Announces Wireless GBA Link, http://www.nintendoworldreport.com/newsArt.cfm?artid=9011, Sep. 25, 2003.
Nintendo, G3 Wireless Controller (Pelican) (2001).
Nintendo, Game Boy Advance SP System (2003).
Nintendo, GameBoy Color (1998).
Nintendo, GameCube Controller (2001).
Nintendo, GameCube System and Controller (2001).
Nintendo, NES Controller (1984).
Nintendo, NES Duck Hunt Game (1984).
Nintendo, NES System and Controllers (1984).
Nintendo, NES Zapper Guns (1984).
Nintendo, Nintendo 64 Controller (1996).
Nintendo, Nintendo 64 System (N64) (1996).
Nintendo, Nintendo 64 System and Controllers (1996).
Nintendo, Nintendo Entertainment System (NES) (1984).
Nintendo, Nintendo Entertainment System Booth 2002.
Nintendo, Nintendo Entertainment System Consumer Information and Precautions Booklet, Nintendo of America, Inc. 1992.
Nintendo, Nintendo Entertainment System Instruction Nintendo of America, Inc. 1992.
Nintendo, Nintendo Entertainment System Layout, May 9, 2002.
Nintendo, Nintendo Feature: History of Pokemon Part 2, Official Nintendo Magazine May 17, 2009, http:///www.officialnintendomagazine.co.uk/article.php?id=8576.
Nintendo, Nintendo Game Boy Advance (2001).
Nintendo, Nintendo Game Boy Advance System (2001).
Nintendo, Nintendo Game Boy Advance Wireless Adapter (Sep. 26, 2003).
Nintendo, Nintendo Game Boy Color Game Cartridge with Built-In Rumble (Jun. 28, 2009).
Nintendo, Nintendo GameBoy Color System (1998).
Nintendo, Nintendo GameBoy System (1989).
Nintendo, Nintendo GameCube System (2001).
Nintendo, Nintendo N64 Controller with Rumble Pack (1996-1997).
Nintendo, Nintendo N64 Rumble Packs (1996-1997).
Nintendo, Nintendo Super NES (SNES) (1991).
Nintendo, Nintendo: Kirby Tilt & Tumble game, packaging and user manual (Aug. 2000-2001).
Nintendo, Nintendo: WarioWare: Twisted game, packaging and user manual (2004-2005).
Nintendo, Pokemon Pinball (1998).
Nintendo, SNES Superscope (1991).
Nintendo, SNES System & Controllers (1991).
Nintendo, Wavebird Wireless Controllers (May 2002).
Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Notice of Reasons for Refusal issued in Japanese Application No. JP2014-13196, dated Jul. 30, 2015 (with partial translation written thereon).
Odell, "An Optical Pointer for Infrared Remote Controllers," Proceedings of International Conference on Consumer Electronics (1995).
Odell, Transcript of Testimony, Investigation No. 337-TA-658, Before the United States International Trade Commission, vol. IV, redacted (May 14, 2009).
Office Action issued in Japanese Patent Application 2005-249265 (dated Apr. 21, 2011).
Office Action issued in Japanese Patent Application 2008-256858 (dated Sep. 9, 2010).
Office Action issued in Japanese Patent Application 2008-256858 (dated Apr. 22, 2011).
Office Action issued in U.S. Appl. No. 11/404,871 (dated Sep. 4, 2008).
Office Action issued in U.S. Appl. No. 11/404,871 (dated Mar. 18, 2009).
Office Action issued in U.S. Appl. No. 11/404,871 (dated Sep. 30, 2009).
Office Action issued in U.S. Appl. No. 11/404,871 (dated Jun. 14, 2010).
Office Action (Interview Summary) issued in U.S. Appl. No. 11/446,187 (dated Oct. 26, 2009).
Office Action issued in U.S. Appl. No. 11/446,188 (dated Apr. 30, 2008).
Office Action issued in U.S. Appl. No. 11/446,188 (dated Feb. 27, 2009).
Office Action issued in U.S. Appl. No. 11/446,188 (dated Oct. 21, 2009).
Office Action issued in U.S. Appl. No. 11/532,328 (dated Nov. 25, 2008).
Office Action issued in U.S. Appl. No. 11/532,328 (dated Oct. 6, 2009).
Office Action issued in U.S. Appl. No. 12/222,787 (dated Feb. 5, 2010).
Office Action issued in U.S. Appl. No. 12/285,812 (dated Nov. 9, 2011).
Office Action issued in U.S. Appl. No. 13/071,008 (dated May 30, 2012).
Office Action issued in U.S. Appl. No. 13/071,028 (dated Jun. 21, 2012).
Office Action issued in U.S. Appl. No. 13/071,028 (dated Jan. 29, 2013).
Office Action issued in U.S. Appl. No. 13/071,028 (dated Mar. 21, 2014).
Office Action/Search Report issued in Taiwanese Patent Application No. 10021121610 (dated Dec. 14, 2011).
Ogawa et al., "Wii Are the Elite," Gamespot Web Site (Feb. 5, 2008).
Ojeda, et al., "No GPS? No Problem!" University of Michigan Develops Award-Winning Personal Dead-Reackoning (PDR) Sys-

(56) References Cited

OTHER PUBLICATIONS tem for Walking Users, http://www.engin.umich.edu/research/mrl/urpr/In_Press/P135.pdf (post 2004).
OLPC, "One Laptop Per Child," wiki.laptop.org/go/One_Laptop_per_Child (May 2009).
Omelyan, "On the numerical integration of motion for rigid polyatomics: The modified quaternion approach" Computers in Physics, vol. 12 No. 1, pp. 97-103 (1998).
Ovaska, "Angular Acceleration Measurement: A Review," Instrumentation and Measurement Technology Conference, Conference Proceedings. IEEE, vol. 2 (Oct. 1998).
PAD—Controller and Memory I/F in Playstation (Apr. 17, 1995; Jan. 12, 2002).
Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paley, W. Bradford, "Interaction in 3D Graphics," SIGGRAPH Computer Graphics Newsletter, Cricket Input Device (Nov. 1998).
Paradiso, et al., "Interactive Therapy with Instrumented Footwear," CHI 2004, Apr. 24-29, 2004, Vienna, Austria (2004).
Paradiso, Joseph A., "The Brain Opera Technology: New Instruments and Gestural Sensors for Musical Interaction and Performance" (Nov. 1998) ("Brain Opera Article").
Park, Adaptive control strategies for MEMS gyroscopes (Dissertation), Univ. Cal. Berkley (2000).
PC World, "The 20 Most Innovative Products of the Year" (Dec. 27, 2006).
PCTracker, Product Technology Brief, http://www.intersense.com/uploadedFiles/Products/White_Papers/PCTracker_Tech_Overview.pdf.
Pelican Accessories G3 Wireless Controller (Sep. 6, 2002).
Perforce Perforce Controller (image).
Perry Simon: "Nintendo to Launch Wireless Game Boy Adaptor," Digital Lifestyles, Sep. 26, 2003 http://digital-lifestyles.info/2003/09/26/nintendo-to-launch-wireless-game-boy-adaptor/.
Pham, Hubert "Pointing in Intelligent Environments with WorldCursor," Proceedings of Internet 2003, Andrew Wilson (2003).
Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr. 2000).
Photographs of prior art ASCII Grip V2 Controller, (cited in previous IDS as: ASCII/Sammy Grip V2 One Switch-Accessible Gaming Shop-ASCII Grip V2, http://www.oneswitch.org.uk/1/AGS/AGS-onehand/ascii-grip-v2.html, Jul. 10, 2008, pp. 1-2).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," Dissertation, Univ. Minnesota (Nov. 2004).
Piyabongkarn, "Development of a MEMS Gyroscope for Absolute Angle Measurement," IEEE Transactions on Control Systems Technology, vol. 13, Issue 2, pp. 185-195 (Mar. 2005).
Pokemon Pinball Game, 1999, Wikipedia Article, http://en.wikipedia.org/wiki/Pok?C3?A9mon_Pinball.
Polhemus, "Polhemus 3SPACE FASTRAK devices" (image) (2000).
Polhemus: "FASTRAK, The Fast and Easy Digital Tracker" copyrighted 2001, Coldiester, Vermont 2 pages.
PowerGlove product photo and Nintendo product photo, Mattel, 1989.
PowerGlove product Program Guide, Mattel, 1989.
PowerGlove product, Instructions, Mattel, 1989.
PowerGlove product, Mattel, 1989 Wikipedia Article.

Pryor et al., "A Reusable Software Architecture for Manual Controller Integration," IEEE Conf. on Robotics and Automation, Univ of Texas (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Regan, "Smart Golf Clubs", The Baltimore Sun, Jun. 17, 2005, 1 page.
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," SENSORS, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, C., Robotics Institute, http://www.ri.cmu.edu/people/riviere.sub.-cameron.html http://www.ri.cmu.edu/person.html?type=publications&person_id=248 (Aug. 2007).
Riviere, Cameron, Testimony, Trial Day 5, In the Matter of Certain Video Game Machines and Related Three-Dimensional Pointing Devices, ITC Investigation No. 337-TA-658 (May 15, 2009).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Roberts, "The Lincoln Wand," AFIPS Conference Proceedings, MIT Lincoln Laboratory (1966).
Robinett et al., "Implementation of Flying, Scaling, and Grabbing in Virtual Worlds," ACM Symposium (1992).
Robinett et al., "The Visual Display Transformation for Virtual Reality," University of North Carolina at Chapel Hill (1994).
Robotics Research Group, "Robot Design: Robot Manual Controller Design," The University of Texas of Austin, May 2009.
Roetenberg, "Inertial and magnetic sensing of human motion," Thesis (2006).
Roetenberg, et al., "Inertial and Magnetic Sensing of Human Movement Near Ferromagnetic Materials," Proceedings. The Second IEEE and ACM International Symposium on Mixed and Augmented Reality (Mar. 2003).
Rolland, et al., "A Survey of Tracking Technology for Virtual Environments," University of Central Florida, Center for Research and Education in Optics Lasers (CREOL) (2001).
Roll-Rama Photos, Nintendo.
Sakai, et al., "Optical Spatial Filter Sensor for Ground Speed," Optical Review, vol. 2, No. 1 pp. 65-67 (1994).
Satterfield, Shane, E3 2002: Nintendo announces new GameCube games, GameSpot, May 21, 2002, http://wwwgamespot.com/gamecube/action/rollarama/new.html?sid=2866974&com_act-convert&om_clk=nesfeatures&tag=newsfeatures%Btitle%3B.
Savage, Paul G., "Advances in Strapdown Inertial Systems," Lecture Series Advisory Group for Aerospace Research and Development Neuilly-Sur-Seine (France) (1984).
Sawada et al., "A Wearable Attitude-Measurement System Using a Fiberoptic Gyroscope" Massachusetts Institute of Technology, vol. 11, No., Apr. 2002, pp. 109-118.
Saxena et al., "In Use Parameter Estimation of Inertial Sensors by Detecting Multilevel Quasi-Static States," Lecture Notes in Computer Science, 2005—Berlin: Springer-Verlag, (Apr. 2004).
Sayed, "A Framework for State-Space Estimation with Uncertain Models," IEEE Transactions on Automatic Control, vol. 46, No. 7 (Jul. 2001).

(56) References Cited

OTHER PUBLICATIONS

Sayed, UCLA Adaptive Systems Laboratory—Home Page, UCLA, http://asl.ee.ucla.edu/index.php?option=com.sub.--frontpage&Itemid=1 (Aug. 2007).
Schmorrow et al., "The PSI Handbook of Virtual Environments for Training and Education," vol. 1, 2009.
Schofield, Jack et al., Coming up for airpad, The Guardian (Feb. 2000).
Screenshot of Brave Spirits (1998).
Sega/Sports Sciences, Inc., "Batter Up, It's a Hit," Instruction Manual, Optional Equipment Manual (1994).
Sega/Sports Sciences, Inc., "Batter Up, It's a Hit," Photos of baseball ball (1994).
Selectech, "Airmouse Remote Control System Model AM-1 User's Guide," Colchester, VT (Sep. 24, 1991).
Selectech, "AirMouse Remote Controls, AirMouse Remote Control Warranty" (1991).
Selectech, "Changing Driver Versions on CDTV/AMIGA" (Oct. 17, 1991).
Selectech, "Selectech AirMouse Remote Controls, Model # AM-R1," photographs (1991).
Selectech, Facsimile Transmission from Rossner to Monastiero, Airmouse Remote Controls, Colchester, VT (Mar. 25, 1992).
Selectech, Selectech AirMouse Devices (image) (1991).
Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).
Seoul National Univ., "EMMU System"—Seoul National Univ Power Point Presentation, www.computer.org/portal/cms_docs_ieeecs/ieeecs/education/cside/CSIDC03Presentations/SNU.ppt (2003).
Serial Communication (Wikipedia) (Jul. 2, 2005).
Shoemake, Ken, Quaternions, UPenn, Online (Oct. 2006).
Simon, et al. "The Yo Yo: A Handheld Combining Elastic and Isotonic Input," http://www.uni-weimar.de/cms/fileadmin/medien/vr/documents/publications/TheYoYo-Interact2003-Talk.pdf (2003).
Simon, et al., "The Yo Yo: A Handheld Device Combining Elastic and Isotonic Input," Human-Computer Interaction—INTERACT'03, pp. 303-310 (2003).
Smartswing internal drawing, 1 page (2004).
Smartswing, Letter from the CEO— pp. 1-3, May 2009.
Smartswing, Training Aid, Apr. 2005, Austin, Texas.
Smartswing: "The SmartSwing Learning System Overview," 3 pages, 2004, retrieved May 19, 2009, http://web.archive.org/web/20040810142134/http://www.smartswinggolf.com/t . . . .
Smartswing: "SmartSwing: Intellegent Golf Clubs that Build a Better Swing," 2 pages, 2004 retrieved May 19, 2009, http://web.archive.org/web/20040728221951/http://www.smartswinggolf . . . .
Smartswing: The SmartSwing Learning System: How it Works, 3 pages, 2004, retrieved May 19, 2009, http://web.archive.org/web/20040403213108/http://www.smartswinggolf.com/ . . . .
Smartswing: The SmartSwing Product Technical Product: Technical Information, 1 page, 2004, retrieved May 19, 2009, http://web.archive.org/web/200400403205906/http://www.smartswinggolf.com/ . . . .
Smartswing: "The SmartSwing Product, 3 pages, 2004, retrieved May 19, 2009, http://web.archive.org/web/200400403204628/http://www.smartswinggolf.com/ . . . ".
Smartswing: "Register to be notified when Smartswing products are available for purchase," 3 pages, May 2004, retrieved May 19, 2009, http://web.archive.org/web/20040426182437/www.smartswinggolf.com/.
Smith, "Gyrevolution: Orienting the Digital Era," http://www.gyration.com/images/pdfs/Gyration_White_Paper.pdf (2007).
Sorenson, et al., "The Minnesota Scanner: A Prototype Sensor for Three-Dimensional Tracking of Moving Body Segments," IEEE Transactions on Robotics and Animation (Aug. 1989).
sourceforge.com, "ARToolkit API Documentation" (SourceForge web pages) (2004-2006).
Stovall, "Basic Inertial Navigation," NAWCWPNS TM 8128, Navigation and Data Link Section, Systems Integration Branch (Sep. 1997).
Sulic, "Lopitech Wingman Cordless Rumblepad Review", Review at IGN, 4 pages, Jan. 14, 2002.
Sutherland, "A Head-Mounted Three Dimensional Display," AFIPS '68 (Fall, part I): Proceedings of the Dec. 9-11, 1968, fall joint computer conference, part I, pp. 757-764 (Dec. 1968).
Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).
Sweetster, "A Quaternion Algebra Tool Set," http://world.std.com/%7Esweetser/quaternions/intro/tools/tools.html (Jun. 2005).
Swisher "How Science Can Improve Your Golf Game, Your Club is Watching" The Wall Street Journal, Apr. 18, 2005, 1 Page.
Templeman, James N., "Virtual Locomotion: Walking in Place through Virtual Environments," Presence, vol. 8 No. 6, pp. 598-617, Dec. 1999.
Thinkoptics, Thinkoptics Wavit devices (image) (2007).
Timmer, "Data Analysis and Modeling Dynamic Processes in the Life Sciences," Freiburg Center for Data Analysis and Modeling, http://webber.physik.uni-freiburg.de/.about.jeti/ (Aug. 2007).
Timmer, "Modeling Noisy Time Series: Physiological Tremor," International Journal of Bifurcation and Chaos, vol. 8, No. 7 (1998).
Timmer, et al, "Pathological Tremors: Deterministic Chaos or Nonlinear Stochastic Oscillators?" Chaos, vol. 10, No. 1 (Mar. 2000).
Timmer, et al., "Characteristics of Hand Tremor Time Series," Biological Cybernetics, vol. 70 (1993).
Timmer, et al., Cross-Spectral Analysis of Physiological Tremor and Muscle Activity: I Theory and Application to unsynchronized electromyogram, vol. 78 (1998).
Timmer, et al., Cross-Spectral Analysis of Physiological Tremor and Muscle Activity: II Application to Synchronized Electromyogram, Biological Cybernetics, vol. 78 (1998).
Timmer, et al., "Cross-Spectral Analysis of Tremor Time Series," International Journal of Bifurcation and Chaos, vol. 10, No. 11 (2000).
Titterton et al., "Strapdown Inertial Navigation Technology," pp. 1-56 and pp. 292-321 (May 1997).
Translation of Exhibit B-B01: Cancellation Request of BigBen of Oct. 15, 2010 against German utility model.
Translation of Exhibit B-C01: Cancellation Request of BigBen of Oct. 15, 2010 against German utility model.
Translation of Exhibit B-D01: Cancellation Request of BigBen of Oct. 15, 2010 against German utility model.
Translation of Opposition Brief of BigBen of Sep. 2, 2010 Against European Patent No. EP 1854518.
Translation of the brief of BigBen of Oct. 27, 2010 and original German text (Nov. 3, 2010).
Translation of the brief of System Com 99 of Oct. 27, 2010 and original German text.
Transmission Mode (Apr. 22, 1999).
TRAQ 3D (Trazer) Product, http://www.exergamefitness.com/traq_3d.htm, http://www.trazer.com/, http://www.traq3d.com/ (1997).
Traq 3D, "Healthcare" 1 pages, //www.traq3d.com/Healthcare/Healthcare.aspx, 1997.
Ulanoff, Lance, "Nintendo's Wii is the Best Product Ever," PC Magazine (Jun. 21, 2007).
UNC Computer Science Department, "News & Notes from Sitterson Hall," UNC Computer Science, Department Newsletter, Issue 24, Spring 1999 (Apr. 1999).
Univ. Illinois at Chicago, "CAVE—A Virtual Reality Theater," http://www.youtube.com/watch?v=-Sf6bJjwSCE 1993.
Univ. Wash., "ARToolkit" (U. Wash. web pages) (1999).
Urban, "BAA 96-37 Proposer information," DARPA/ETO (1996).
U.S. Appl. No. 11/404,844, filed Apr. 17, 2006.

(56) References Cited

OTHER PUBLICATIONS

U.S. Appl. No. 11/404,871, filed Apr. 17, 2006.
U.S. Appl. No. 11/446,187, filed Jun. 5, 2006.
U.S. Appl. No. 11/446,188, filed Jun. 5, 2006.
U.S. Appl. No. 11/504,086, filed Aug. 15, 2006.
U.S. Appl. No. 11/532,328, filed Sep. 15, 2006.
U.S. Appl. No. 11/598,787, filed Nov. 14, 2006.
U.S. Appl. No. 11/745,842, filed May 8, 2007.
U.S. Appl. No. 11/764,409, filed Jun. 18, 2007.
U.S. Appl. No. 11/790,780, filed Apr. 27, 2007.
U.S. Appl. No. 12/222,787, filed Jan. 1, 2009.
U.S. Appl. No. 12/889,863, filed Sep. 24, 2010.
U.S. Appl. No. 13/028,648, filed Feb. 16, 2011.
U.S. Appl. No. 13/071,008, filed Mar. 24, 2011.
U.S. Appl. No. 13/071,028, filed Mar. 24, 2011.
US Dynamics Corp, "Spinning Mass Mechanical Gyroscopes" (Aug. 2006).
US Dynamics Corp, "The Concept of 'Rate' (more particularly, angular rate pertaining to rate gyroscopes) (rate gyro explaination)," (Aug. 2006).
US Dynamics Corp, "US Dynamics Model 475 Series Rate Gyroscope Technical Brief—brief discussion on rate gyroscope basics, operation, and uses, and a dissection of the model by major component" (Dec. 2005).
US Dynamics Corp, "US Dynamics Rate Gyroscope Interface Brief (rate gyro IO)" (Aug. 2006).
Van Den Bogaard, "Using linear filters for real-time smoothing of rotational data in virtual reality application," http://www.science.uva.nl/research/ias/alumni/m.sc.theses/theses/RobvandenBogaard.pdf (Aug. 2004).
Van Laerhoven, et al., "Using an Autonomous Cube for Basic Navigation and Input," Proceedings of the 5th International Conference on Multimodal interfaces, Vancouver, British Columbia, Canada, pp. 203-210 (2003).
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, Issue 1, pp. 1-10 (Jan. 1994).
Verplaetse, "Inertial Proprioceptive Devices: Self-Motion Sensing Toys and Tools," IBM Systems Journal (Sep. 1996).
Verplaetse, "Inertial-Optical Motion-Estimating Camera for Electronic Cinematography," Masters of Science Thesis, MIT, (1997).
Villoria, Gerald, Hands on Roll-O-Rama Game Cube, Game Spot, May 29, 2002, http://www.gamespot.com/gamecube/action/rollorama/news.html?sid=2868421&com_act=convert&om_clk=newsfeatures&tag=newsfeatures;title;1&m.
Virtual Fishing, Operational Manual, 2 pages, Tiger Electronics, Inc., 1998.
Virtual Technologies, Inc., Cyberglove brochure, Palo Alto, CA, www.virtex.com. (1999).
Vorozcovs, et al.,"The Hedgehog: A Novel Optical Tracking Method for Spatially Immersive Displays," MIT Presence, vol. 15, No. 1, pp. 108-121 (2006).
VR Solutions, "IS-1200", www.vrs.com.au/motion-tracking/intersense/is-1200.html 2 pages (May 2009).
VTI, Mindflux-VTi CyberTouch, 1996, http://www.mindflux.com.au/products/vti/cybertouch.html.
Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).
Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).
Watt, 3D Computer Graphics, "Three-Dimensional Geometry in Computer Graphics,", pp. 1-22 Addison-Wesley (1999).
Welch et al., HiBall Devices (image) (2002-2006).
Welch et al., Motion Tracking: No Silver Bullet, but a Respectable Arsenal IEEE Computer Graphics and Applications, vol. 22, No. 6, pp. 24-38 (Nov. 2002).
Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995).
Welch, "A Self-Contained Wide-Area Tracker Using Sensor Fusion" (copy unavailable) (2001).
Welch, "Hawkeye Zooms in on Mac Screens with Wireless Infrared Penlight Pointer," MacWeek (May 1993).
Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).
Welch, et al., "High-Performance Wide-Area Optical Tracking: The HiBall Tracking System," MIT Presence: Teleoperators & Virtual Environments (2001).
Welch, et al., "SCAAT: Incremental Tracking with Incomplete Information," Computer Graphics, SIGGRAPH 97 Conference Proceedings, pp. 333-344 (Aug. 1997).
Welch, et al., "Source Code for HiBall+Inerital device," UNC-CH Computer Science (copy unavailable) (Jun. 1998).
Welch, et al., "The HiBall Tracker: High-Performance Wide-Area Tracking for Virtual and Augmented Environments," ACM SIGGRAPH, Addison-Wesley (1999).
Welch, et al., "The High-Performance Wide-Area Optical Tracking : The HiBall Tracking System," MIT Presence, Presence, vol. 10 , No. 1 (Feb. 2001).
Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap.1, pp. 23-47] (2008).
Widrow, et al., "Fundamental Relations Between the LMS Algorithm and the DFT," IEEE Transactions on Circuits and Systems, vol. 34, No. CAS-7, (Jul. 1987).
Wiley, M.: "Nintendo Wavebird Review," US, Jun. 11, 2002, 21 pages.
Williams, et al., "Physical Presence: Palettes in Virtual Spaces," Society of Photo-Optical Instrumentation Engineers (SPIE) Conference Series, vol. 3639, No. 374-384 (May 1999).
Williams, Robert L. et al., "Implementation and Evaluation of a Haptic Playback System," vol. 3 No. 3, Haptics-E (2004).
Williams, Robert L. et al., "The Virtual Haptic Back Project," Presented at the Image 2003 Conference, Scottsdale, Arizong (Jul. 14-18, 2003).
Wilson, "Wireless User Interface Devices for Connected Intelligent Environments," Ubicomp 2003 Workshop (2003).
Wilson, "WorldCursor: Pointing in Intelligent Environments with the World Cursor," UIST '03 Companion (Nov. 2003).
Wilson, "XWand: UI for Intelligent Environments," http://research.microsoft.com/en-us/um/people/awilson/wand/default.htm (Apr. 2004).
Wilson, et al., "Demonstration of the XWand Interface for Intelligent Spaces," UIST '02 Companion, pp. 37-38 (Oct. 2002).
Wilson, et al., "Gesture Recognition Using the Xwand," ri.cmu.edu (2004).
Wilson, et al., "Xwand: UI for Intelligent Spaces," CHI 2003, Proceedings of the SIGCHI conference on Human factors in computing systems, pp. 545-552 (Apr. 2003).
Wilson, Research page, biography available at http://research.microsoft.com/en-us/um/people/awilson/?0sr=a, Microsoft Corp. (2009).
Wilson, Transcript of Testimony, Investigation No. 337-TA-658, Before the United States International Trade Commission, vol. V (May 15, 2009).
Wilson, XWand video, http://research.microsoft.com/~awilson/wand/wand%20video%20768k.WMV (Mar. 2002).
Wired Glove, Wikipedia Article, 4 pages, http://en.wikipedia.org/wiki/Wired_glove, (Nov. 18, 2010).
Wireless (Wikipedia) (Aug. 12, 2005).

(56) References Cited

OTHER PUBLICATIONS

Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000 (2000).
Wormell, et al., "Advancements in 3D Interactive Devices for Virtual Environments," ACM International Conference Proceeding Series; vol. 39 (2003).
Worringham, et al., "Directional Stimulus-Response Compatibility: A Test of Three Alternative Principles," Ergonomics, vol. 41, Issue 6, pp. 864-880 (Jun. 1998).
www.3rdtech.com (2000-2006).
Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).
You, et al., "Fusion of Vision and Gyro Tracking for Robust Augmented Reality Registration," Proceedings of the Virtual Reality 2001 Conference, pp. 1-8 (2001).
You, et al., "Hybrid Inertial and Vision Tracking for Augmented Reality Registration," http://graphics.usc.edu/cgit/pdf/papers/Vr1999.PDF (1999).
You, et al., "Orientation Tracking for Outdoor Augmented Reality Registration," IEEE Computer Graphics and Applications, IEEE, vol. 19, No. 6, pp. 36-42 (Nov. 1999).
Youngblut, et al., "Review of Virtual Environment Interface Technology," Institute for Defense Analyses (Jul. 1996).
Yun, et al., "Recent Developments in Silicon Microaccelerometers," SENSORS, University of California at Berkeley (Oct. 1992).
Zhai, "Human Performance in Six Degree of Freedom Input Control," Thesis, University of Toronto (1995).
Zhai, "User Performance in Relation to 3D Input Device Design", Computer Graphics 32(4), Nov. 1998, 15 pages.
Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004).
Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004).
Altmann, Rotations, Quaternions, and Double Groups, Dover Publications (2005).
Brown et al., Introduction to Random Signals and Applied Kalman Filtering, Third Ed., Wiley, John & Sons, Incorporated, (1997).
Brown, et al., Introduction to Random Signals and Applied Kalman Filtering, 2d ed., John Wiley & Sons Inc. (1992).
Burdea, et al., Virtual Reality Technology, Wiley, John & Sons, Incorporated (1994).
Cohn, et al., The PSI Handbook of Virtual Environments for Training and Education, Praeger Security International, vols. 1-3 (2009).
Durlach, et al., Virtual Reality: Scientific and Technological Challenges, National Academy Press, (1995).
Foley, et al., Computer Graphics: Principles and Practice, 2nd ed. in C, Addison-Wesley Publishing Company, Inc. (1996).
Foley, et al., Fundamentals of Interactive Computer Graphics, Addison-Wesley Publishing Co., Inc. Boston, MA, USA (1982).
Fraden, Handbook of Modern Sensors: Physics, Designs and Applications, $3^{rd}$ ed., Springer Science +Business Media, LLC, New York, NY (2004).
Greenberg, Advanced Engineering Mathematics, 2nd ed., Prentice-Hall,Inc., (1998).
Hildebrand, Methods of Applied Mathematics, $2^{nd}$ ed, Dover Publications Inc., (1992).
Hoffman et al., Linear Algebra, 2nd ed., Prentice Hall, (1971).
Jekeli, Inertial Navigation Systems with Geodetic Applications, Walter de Gruyter GmbH & Co. (2001).
Kibble et al., Classical Mechanics, Imperial College Press (2004).
Kreyszig, Advanced Engineering Mathematics, Wiley, John & Sons, Incorporated (1999).
Kuipers, Quaternions and Rotation Sequences, Princeton University Press (1999).
Latombe, Robot Motion Planning, Kluwer Academic Press (1991).
Lavalle, Planning Algorithms, Cambridge University Press, (2006).
Misner, et al., Gravitation, 1st ed., W. H. Freeman & Co. (1973).
Poole, The Physics Handbook: Fundamentals and Key Equations, 2nd ed., Wiley-VHC, (2007).
Spong et al., Robot Modeling and Control, Wiley & Sons, Inc., (2006).
Thornton, et al., Classical Dynamics of Particles & Systems, 5th ed., Brooks Cole, (2004).
Titterton, et al., Strapdown Inertial Navigation Technology, $2^{nd}$ ed., Institution of Electrical Engineers (2004).
Wilson, Sensor Technology Handbook, Elsevier, Inc., (2005).
Zuang, et al., Camera-Aided Robot Calibration, CRC Press, Inc., (1996).
Caolo, iControlPad, the physical controller for your iPhone, finally available for order, Feb. 8, 2011, http://www.tuaw.com/2011/02/08/icontrolpad-the-physical-controller-for-your-iphone-finally-av/.
Chartier, "Preorders begin for iPhone, iPod touch game controller," Macworld website, Feb. 8, 2011, http://www.macworld.com/article/1157741/icontrolpad.html.
Davies, ThinkGeek iCade arcade cabinet for iPad is fake with real promise, Apr. 1, 2010, http://www.slashgear.com/thinkgeek-icade-arcade-cabinet-for-ipad-is-fake-with-real-promise-0179984/.
Atari Arcade, Website Printout, Nov. 30, 2011 http://atari.com/buy-games/arcade/atari-arcade-ipad.
Ion iCade Arcade Cabinet, Website Printout, 2012 http://www.ionaudio.com/products/details/icade.
Wattanajantra, "iControlPad unofficial iPhone gamepad coming soon," in c/net UK website (online), Published Aug. 27, 2010 http://crave.cnet.co.uk/mobiles/icontrolpad-unofficial-iphone-gamepad-coming-soon-50000514.
"Nintendo's Notice of Prior Art" submitted Aug. 31, 2018 by Nintendo in Investigation No. 337-TA-1111, U.S. International Trade Commission in which complainant Gamevice Inc. asserts USP 9855498 & USP9808713 against respondent Nintendo, 24 pages.
Cutrone, "Hot products: Gyration GyroPoint Desk, GyroPoint Pro gyroscope-controlled wired and wireless mice" (Computer Reseller News) (Dec. 1995).
Cutts, "A Hybrid Image/Inertial System for Wide-Area Tracking" (Internal to UNC-CH Computer Science) (Jun. 1999).
CyberGlove Systems.
Deruyck, et al., "An Electromagnetic Position Sensor," Polhemus Navigation Sciences, Inc., Burlington, VT (Nov. 1973).
Dichtburn, "Camera in Direct3D" Toymaker, Mar. 5, 2005, 5 pages, http://web.archive.org/web/20050206032104/http://toymaker.info/games/html/camera.html.
Donelson, et al., "Spatial Management of Information" (1978).
Eibele, "Orientation as an additional User Interface in Mixed-Reality Environments," 1.Workshop Ervwiterte und Virtuelle Realität, pp. 79-90. GI-Fachgruppe AR/VR (2007).
Electro-Plankton Weblog, http://www.tranism.com/weblog/2005/09/, "This is the Revolution, Nintendo Style," Sep. 15, 2005, 2 pgs.
Enura, et al., "Sensor Fusion Based Measurement of Human Head Motion," 3rd IEEE International Workshop on Robot and Human Communication (Jul. 1994).
Enhanced.pdf (1999).
Ewalt, David M., "Nintendo's Wii is a Revolution," Review, forbes.com (Nov. 13, 2006).
Eyestone, Dick: "SmartSwing Company: Letter from the CEO," 3 pages, 2004, retrieved May 19, 2009, http://web.archive.org/web/200404810101314/www.smartswinggolf.com.
Ferrin, "Survey of Helmet Tracking Technologies," Proc. SPIE vol. 1456, p. 86-94 (Apr. 1991).
Fielder, Lauren: "E3 2001: Nintendo unleashes GameCube software, a new Miyamoto game, and more," GameSpot, May 16, 2001, 2 pages, http://www.gamespot.com/downloads/2761390.
Fishing Games: The Evolution of Virtual Fishing Games and related Video Games/Computer Games, 15 pages, 2003.

(56) References Cited

OTHER PUBLICATIONS

Foley et al., "Computer Graphics: Principles and Practice," Second Edition, 1990.
Foremski, T. "Remote Control Mouse Aims at Interactive TV", Electronics Weekly, Mar. 9, 1994.
Foxlin et al., "An Inertial Head-Orientation Tracker with Automatic Drift Compensation for Use with HMD's," Proceedings of the conference on Virtual reality software and technology, Singapore, Singapore, pp. 159-173 (1994).
Foxlin et al., "Miniature 6-DOF Inertial System for Tracking HMDs," SPIE vol. 3362 (Apr. 1998).
Foxlin et al., "Miniaturization, Calibration & Accuracy Evaluation of a Hybrid Self-Tracker," The Second IEEE and ACM International Symposium on Mixed and Augmented Reality, pp. 151-160 (2003).
Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).
Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).
Foxlin, "Generalized architecture for simultaneous localization, auto-calibration, and map-building," IEEE/RSJ Conf. on Intelligent Robots and Systems, Lausanne, Switzerland (Oct. 2002).
Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000 (2000).

\* cited by examiner

GAME OPERATING DEVICE

CROSS-REFERENCE TO RELATED APPLICATIONS

This application is a continuation of U.S. patent application Ser. No. 15/494,793 filed Apr. 24, 2017; which is a continuation of U.S. patent application Ser. No. 15/052,596 filed Feb. 24, 2016, now U.S. Pat. No. 9,700,806; which is a continuation of U.S. patent application Ser. No. 14/631,259 filed Feb. 25, 2015, now U.S. Pat. No. 9,498,728; which is a continuation of U.S. patent application Ser. No. 13/071,028 filed Mar. 24, 2011, now U.S. Pat. No. 9,011,248; which is a continuation of U.S. patent application Ser. No. 11/446,188, filed Jun. 5, 2006, now U.S. Pat. No. 7,931,535; which claims priority to Japanese Patent Application No. 2005-239984 filed Aug. 22, 2005; the contents of all of which are hereby incorporated by reference.

BACKGROUND OF THE INVENTION

Field of the Invention

The present invention relates to a game operating device. More specifically, the present invention relates to a game operating device that analyzes movements of an operating device through detection of a predetermined mark or pattern in an image taken by an imaging device.

Description of the Related Arts

Some operating devices as related arts of this kind of game operating device are disclosed in Japanese Patent No. 3422383 and Japanese Patent Laying-open No. 2002-233665.

The related art disclosed in Japanese Patent No. 3422383 makes it possible to play a shooting game by arranging light emitters at four locations in such a manner as to surround a video screen, providing a CCD camera to a barrel of a shooting gun to take an image containing the four light emitters, and calculating a designation position in the video screen based on information on image positions of the four light emitters contained in the imaging data at that time.

As similar to that of Japanese Patent No. 3422383, the related art of Japanese Patent Laying-open No. 2002-233665 also makes it possible to image a target containing at least four characteristic points in one plane, calculate an attitude parameter of an imaging surface with respect to the plane based on the obtained image data, and make a change to the target based on the parameter.

Japanese Patent No. 3422383 implies no specific shape of the input operating means but discloses the use of a "gun".

Additionally, Japanese Patent Laying-open No. 2002-233665 discloses a specific shape of the gun-type controller. In using this gun-type controller for input operations, the direction of designation is to be the direction of the gun barrel. However, the portions corresponding to the barrel and the grip are separately located, and also the directions of the barrel and the grip are different. Thus, it is difficult to recognize intuitively the direction of designation only with a sensation in the hand holding the grip.

In this case, moreover, the thumb and the index finger are just placed on the grip, and mainly the middle finger, the ring finger, the small finger and the palm need to hold the gun. However, the barrel significantly extends off the holding portion, which causes a problem where the center of gravity of the entire gun cannot be firmly held and thus it is hard to fix the attitude of the gun. Furthermore, with occurrence of shakes due to trigger operation, it is difficult to operate continuously the gun-type controller at a high speed in a stable manner.

SUMMARY OF THE INVENTION

Therefore, it is a primary object of the present invention to provide a novel game operating device.

It is another object of the present invention to provide a game operating device that is easy to operate while holding it by one hand and makes it easy to recognize the direction of designation.

To solve the above mentioned issues, the present invention employs the structure described below. Besides, the reference numerals, supplementary explanations, etc. in parentheses just show the correspondences with the embodiments described later, for helping the understanding of the present invention, and impose no limitations on the present invention.

In one exemplary embodiment, the present invention relates to a game operating device comprising a longitudinal housing, a first operating portion provided on a first plane of the housing along a longitudinal direction at one end in the longitudinal direction, a second operating portion provided on a second plane opposed to the first plane of the housing, a holding portion formed in a direction of the other end along the longitudinal direction of the housing from the second operating portion, and an imaging means provided at the one end of the housing in such a manner that it can perform imaging in a direction along the longitudinal direction.

More specifically, and with reference to the drawings, the first operating portion (26, 42: reference numerals indicative of the portions corresponding to those in the embodiment. The same applies to the following reference numerals.) is provided at one end of the first plane (20) of the longitudinal housing (12) in the longitudinal direction (C1), and the second operating portion (42, 28) is provided on the second plane (22) opposed to the first plane. The housing (12) is of shape and dimensions capable of being held by one hand of the game player, the holding portion (18) for holding the housing, i.e. the controller is formed at one end of the housing along the longitudinal direction from the second operating portion. The imaging means (56) is provided at the one end (52) of the housing. Also, the imaging means can perform imaging in the direction along the longitudinal direction of the housing. It is thus possible to recognize or grasp intuitively the direction of designation by the imaging means while holding the housing.

In another aspect, the present invention relates to a game operating device comprising a longitudinal housing having a thickness capable of being held by one hand, a first operating portion provided on a first plane of the housing along a longitudinal direction, a second operating portion provided on a second plane opposed to the first plane of the housing at a position reached by an index finger of the one hand when a thumb of the one hand is placed on the first operating portion, a holding portion formed at a position where it can be held by a palm and other fingers of the one hand when a thumb is placed on the first operating portion and an index finger is placed on the second operating portion, and an imaging means provided at an end opposed to the holding portion of the housing in such a manner that it can perform imaging in a direction along a direction in which the thumb is faced when the thumb is placed on the first operating portion and the holding portion is held by the palm and the other fingers.

More specifically, relating to this second aspect to the drawings, the first operating portion (26, 42) is provided at one end of the first plane (20) of the longitudinal housing (12) in the longitudinal direction (C1), and the second operating portion (42, 28) is provided on the second plane (22) at the opposite side of the first plane. The housing (12) is of shape and dimensions capable of being held by one hand of the game player, the holding portion (18) for holding the housing is formed on the housing. The holding portion is formed at the position where it can be held by the palm (62P) and the other fingers (62c, 62d, 62e) of the one hand (62), when the thumb (62a) is placed on the first operating portion and the index finger (62b) is placed on the second operating portion. Thus, it is possible to operate the first operating portion and the second operating portion by the thumb and the index finger of one hand while holding the holding portion by that hand. Moreover, the imaging means (56) is provided at the end (52) opposed to the holding portion of the housing. In addition, the imaging means is provided in such a manner that it can perform imaging in the direction along the direction in which the thumb is faced when the thumb is placed on the first operating portion and the holding portion is held by the palm and the other fingers.

It is also a feature of the exemplary embodiment that the first operating portion (26, 42) and the second operating portion (42, 28) are arranged on the first plane and the second plane of the housing, with correspondence in position between the two. Therefore, the housing is supported by the index finger on the second plane in operating the first operating portion on the first plane, and the housing is supported by the thumb on the first plane in operating the second operating portion on the second plane, which makes the operations more stable. In addition, it is possible to change the direction of designation of the imaging means (56) while holding the housing between the thumb and the index finger, which allows the direction of designation of the imaging means to be recognized or grasped more easily.

It is also a feature of the exemplary embodiment that the imaging means (56) is provided in the vicinity of the first operating portion (26; 42) and the second operating portion (42; 28), which makes it easier to recognize the direction of designation of the imaging means.

It is also a feature of the exemplary embodiment that the concave portion (34) is formed in the second plane of the housing (12), for example, and the second operating portion (42; 28) is arranged in the concave portion. Accordingly, it is possible to place the index finger in the concave portion, which makes it possible to operate the second operating portion in a quick and reliable manner.

It is also a feature of the exemplary embodiment that the concave portion (34) includes the first inclined surface (38) extending in the direction of the holding portion (18) and the second inclined surface (40) in the opposite direction. As a consequence, the second operating portion can be operated quickly and reliably just by bending the index finger in the concave portion toward the holding portion.

It is also a feature of the exemplary embodiment that the angle of inclination of the first inclined surface (38) is set so as to be smaller than the angle of inclination of the second inclined surface (40). This brings about the advantages that the housing is easy to hold by both hands and the index finger can be reliably taken off the second operating portion.

It is also a feature of the exemplary embodiment that the concave portion (34) includes the valley (36), for example, and the bottom of the valley forms a plane approximately parallel to the first plane. Meanwhile, the holding portion (18) is provided rearward of the housing. Accordingly, the inclined surface (38) is formed linking the bottom of the valley and the holding portion, and the second operating portion (26) is placed on the inclined surface. Thus, the second operating portion can be naturally operated when the index finger is bent.

It is also a feature of the exemplary embodiment that the vibrator (80) is arranged on the side opposed to the imaging means (56) in the longitudinal direction of the housing (12), which decreases a possibility that the vibrations from the vibrator affect adversely imaging operation by the imaging information arithmetic unit. That is, a distance becomes long between the vibrator and the imaging information arithmetic unit, thereby preventing an imaging element of the imaging information arithmetic unit from being blurred as much as possible.

It is also a feature of the exemplary embodiment that the battery (78) as a relatively heavy matter is stored within a range of the holding portion (18) of the housing (12), and thus a center of gravity G (FIG. 2 (B)) is reliably contained within the range of the holding portion. This makes it possible to change stably the direction of designation of the imaging means while holding the holding portion 18.

According to the present invention, it is easy to operate the first operating portion and the second operating portion while holding the controller by one hand, which makes it possible to obtain a novel game operating device that is high in flexibility and capable of being operated only by one hand. Additionally, the imaging range of the imaging means contains the direction along the longitudinal direction of the holding portion, which makes it possible to recognize or grasp intuitively the direction of designation of the imaging means while holding the housing.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
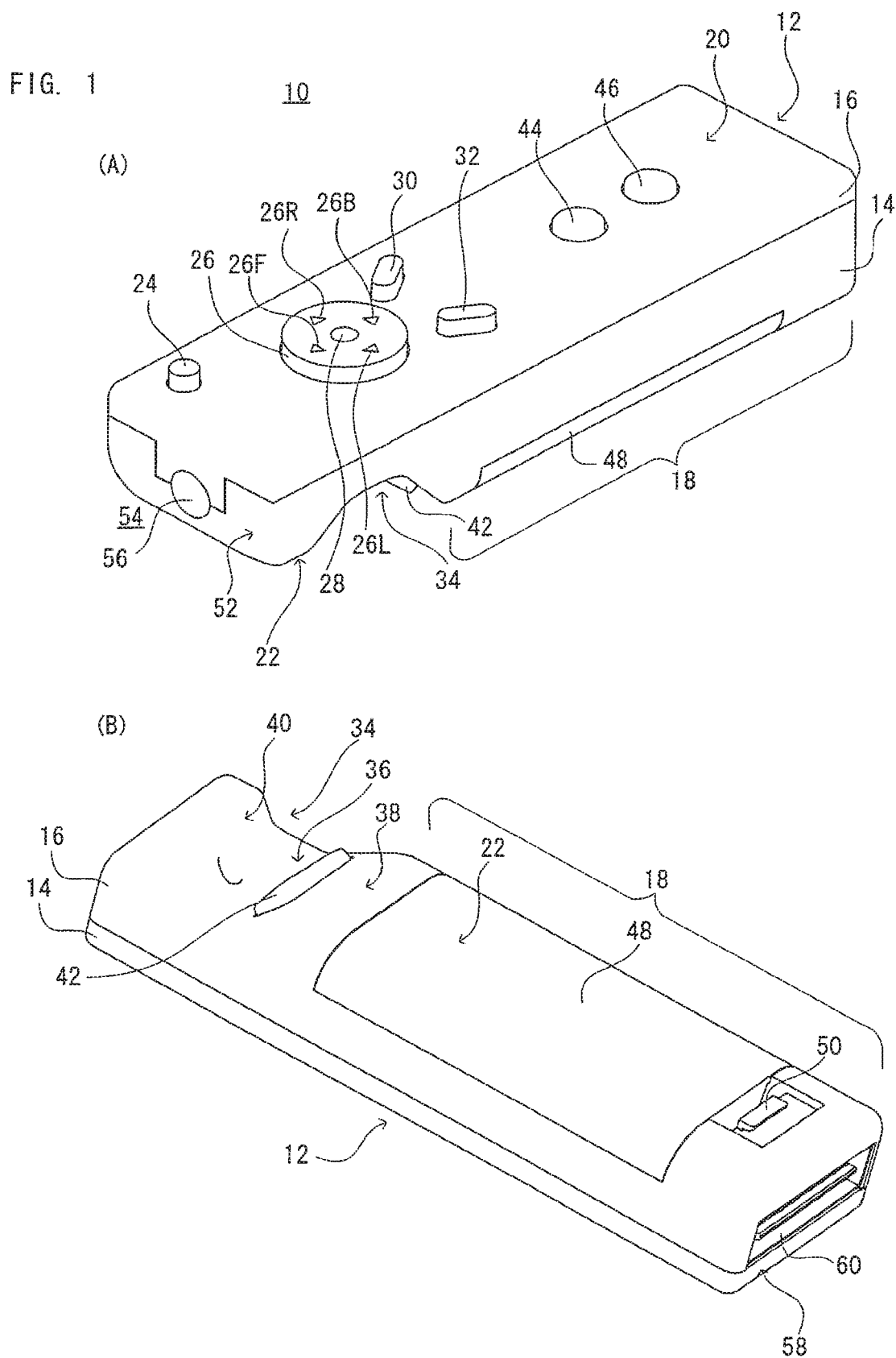
FIG. 1 is a perspective view showing a controller (first controller) forming one embodiment of the present invention, and FIG. 1 (A) presents a front side, upper side and left side, and FIG. 1 (B) shows an upper side, rear side and right side.
Figure 2:
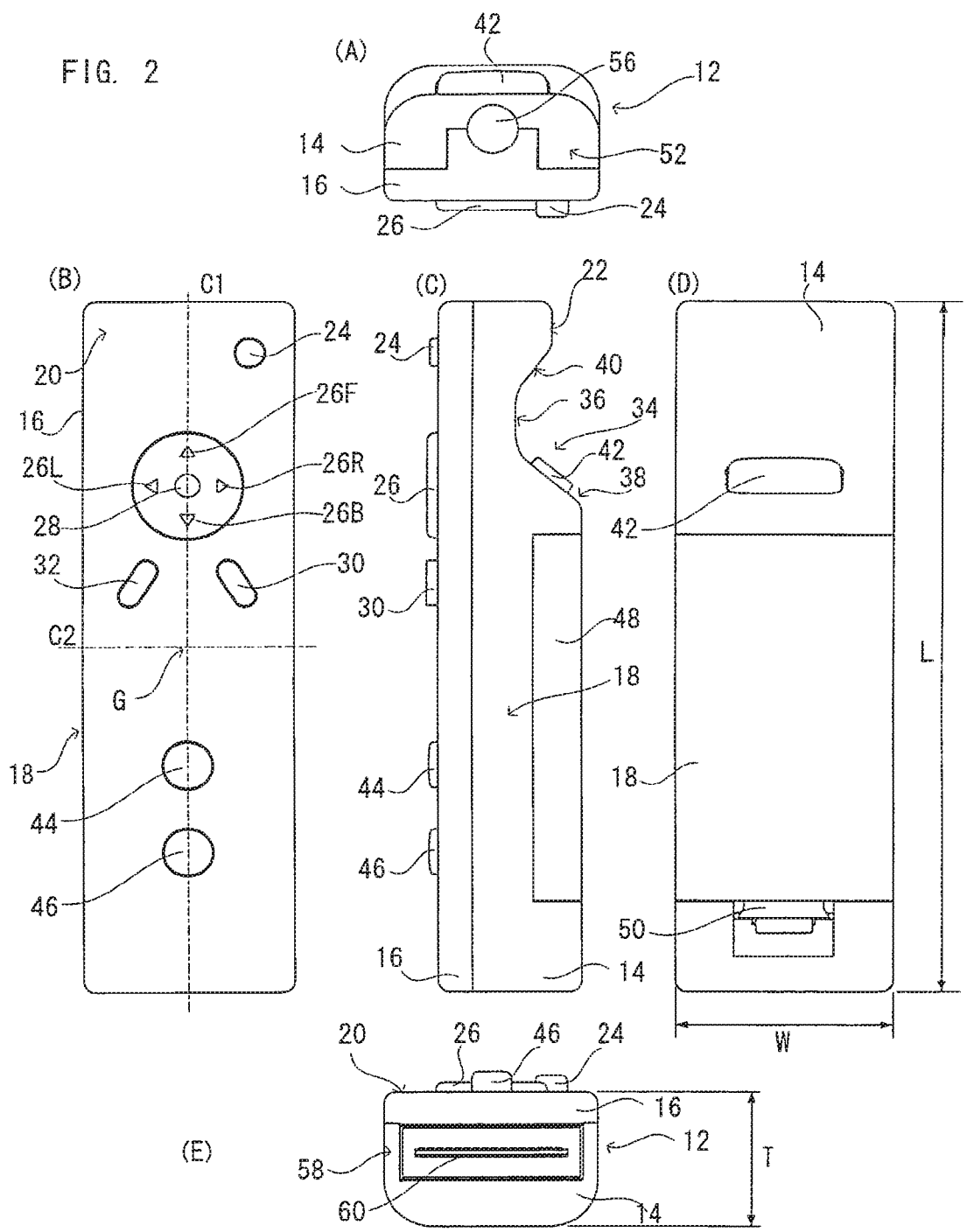
FIG. 2 is a drawing of a hexahedron indicative of the first controller of this embodiment, excluding a view of a left side, and FIG. 2 (A) shows a front side, FIG. 2 (B) a plane side, FIG. 2 (C) a right side, FIG. 2 (D) a bottom side, and FIG. 2 (E) a rear side, respectively.

A controller 10 of one embodiment of the present invention shown in FIG. 1 and FIG. 2 includes a longitudinal housing 12 molded of plastic or metal, for example. The housing 12 has a required depth and includes a lower housing 14 having a shape of a flat rectangle with a top-surface opening and an bottom, an upper housing 16 assembled integrally with the lower housing 14 in such a manner as to close up the top-surface opening of the lower housing 14, and in particular, has a cross-section rectangle on the whole as shown in FIG. 2 (A) and FIG. 2 (E).

The housing 12 has a holding portion 18 and is of size capable of being held by one hand of an adult or child on the whole. Its length L (FIG. 2 (D)) in a longitudinal direction (a direction along a longitudinal center line or axis C1 shown in FIG. 2 (B)) is set at 8 to 15 cm, for example, and its width (orthogonal to the longitudinal direction C1) W (FIG. 2 (D)) is set at 2 to 4 cm, for example, respectively.

Alternatively, the shape of the housing 12 is not limited to a longitudinal shape with a plane rectangle and may be a longitudinal shape with a plane oval or the like. Likewise, its cross-section shape is not limited to a rectangle and may be a circle or other polygons.

A flat main surface of the upper housing 16 constitutes an upper surface 20 of the housing 12. As can be seen well from FIG. 1 (A) and FIG. 2 (B) in particular, the upper surface 20 of the housing 12 is a rectangle extending along the longitudinal direction of the housing 12. Also, the upper surface 20 is equivalent to a first plane, and a surface or main surface 22 of the lower housing 18 is equivalent to a second plane opposed to the first plane 20. The second plane 22 is approximately parallel with the first plane 20. Besides, an upward direction is assumed to be forward (side of one end) and a downward direction is assumed to be backward (side of the other end) in the longitudinal direction C1 of the housing 12.

A power switch 24 is provided on the upper surface 20 of the housing 12, on the slightly right side of the center in a width direction of the upper surface 20 (indicated by the transverse center line or axis C1 in FIG. 2 (B)) in the vicinity of the housing front end (one end). The power switch 24 is intended to turn on or off an electric power source to a game machine 112 (FIG. 9) by a remote operation.

Besides, in this embodiment, a power switch for turning on or off the controller 10 itself is not provided. The controller 10 is turned on by operating any one of the operating switches of the controller 10, and is automatically turned off if no operation is performed for a predetermined period of time or more.

A direction switch 26 is provided on the width-direction center line C1 of the upper surface 20, forward of the longitudinal-direction center of the housing 12 (indicated by a center line C2 in FIG. 2 (B)). The direction switch 26 is a combined switch of four-direction push switches and center switch, and includes operating portions 26F, 26B, 26R and 26L for four directions indicated by arrows, forward (or up), backward (or down), right and left, and also includes a center switch 28. The operating portions 26F, 26B, 26R and 26L are arranged on a single key top, in a shape of a ring with a turn of 90 degrees among them. By operating any one of them, one of contacts (not shown) which are arranged in a shape of a polygon corresponding individually to these operating portions 26F, 26B, 26R and 26L is selectively turned on, thereby selecting any one of the directions of upward, downward, right and left. For example, by operating any one of the operating portions 26F, 26B, 26R and 26L, one of those contacts is turned on to make it possible to designate a movement direction of a character or object (player character or player object) capable of being operated by a game player or to designate a movement direction of a cursor.

The center switch 28 is a single push-button switch and may be used as a so-called B button. As is well known, the B button 28 can be used for changing the game mode selected by means of a select switch 32 described later, canceling the action decided by means of an A button described later, and so on.

Besides, as is well known, such a combined switch as described in relation to the embodiment is highly utilized for cellular telephones and the like (see http://www.jpo.go.jp/shiryou/s_sonota/hyoujun_gijutsu/small_switch/b-6-2.htm, for example), and thus a more detailed description of it is omitted.

As stated above, the direction switch 26 of the embodiment includes the contacts (not shown) arranged in the shape of a polygon (rectangle or rhombus) as to indicate individual directions (the four directions in the embodiment) so that these contacts are operated by means of the operating portions 26F, 26B, 26R and 26L formed on a single key top. Alternatively, the operating portions 26F, 26B, 26R and 26L may be provided as individual key tops so that one contact is operated by means of each corresponding key top.

In addition, the direction switch 26 may be a cross key or a joystick. In the case of the direction switch 26 as a joystick, an arbitrary direction and position can be designated by turning its tip end 360 degrees in an arbitrary direction or deflecting the same.

As can be seen well from FIG. 2 (B), a start switch 30 and a select switch 32 having key tops arranged in a shape of the Japanese KATAKANA character "ハ" with the width-direction center line C1 of the housing 12 between them are provided on the upper surface 20, backward of the direction switch 26. The start switch 30 is used for starting (re-starting) and pausing a game and the like. The select switch 32 is used for selecting a game mode, etc.

Additionally, the start switch 30 and the select switch 32 may be provided in an arbitrary layout such as one transverse line and one vertical line, not limited to the shape of the Japanese KATAKANA character "ハ" presented in relation to the embodiment.

A concave portion 34 is formed on the second plane 22 of the lower housing 14, at a position approximately corresponding to the position of the direction switch 26. The concave portion 34 is a concave formed so as to reach from one end of the other of the second plane 22 in a width direction, as can be understood from FIG. 1 and FIG. 2 (C). Additionally, strictly speaking, the concave portion 34 of this embodiment is formed slightly forward of the direction switch 26, as can be seen from a contrast between FIG. 2 (B) and FIG. 2 (C). The concave portion 34 is formed at a position where, when the player holds the controller 10, i.e., the holding portion 18 of the housing 12 by one hand as described later, the index finger of the same hand naturally falls. Therefore, a width of a valley 36 of the concave portion 34 (in the longitudinal direction of the housing 12) is formed in a size that allows the index finger to come into there. The concave portion 34 has two inclined surfaces 38 and 40 rising from the valley 36. The former inclined surface 38 is formed with a rise from the valley 36 toward the rear of the housing 12, and conversely, the latter inclined surface 40 is rising from the valley 36 toward the front of the housing 12.

An A button 42 is provided on the inclined surface 38 on the rear side of the concave portion 34 of the lower housing 14. The A button 42 is provided at a position corresponding to the direction switch 26. Here, the corresponding position means a position where the direction switch 26 and the A button 42 are arranged close to each other as viewed through from the upper surface of housing 12, and more preferably, the direction switch 26 and the A button 42 are arranged in such a manner as to be at least partially overlapped. As can be seen well from the illustration, the bottom of the valley 36 is on a plane approximately parallel with the upper surface 20, i.e., the first plane of the housing 12, and the rear inclined surface 38 on which the A button 42 is arranged is formed between the bottom parallel surface of the valley 36 and the holding portion 18 formed on the rear (other) side of the housing 12 described earlier. Also, the A button 42 is a push switch having a switch contact (not shown) and a key top for turning on or off the switch contact, and the key top is provided so as to move in a direction perpendicular to the inclined surface 38. Therefore, as described later, the player can turn on the A button 42 just by putting his/her index finger or middle finger in the concave portion 34 and pulling it toward him/her. That is, the index finger or the middle finger can be positioned in the concave portion 34, which makes it possible to operate the A button 42 quickly and reliably when needed.

Besides, the A button 42 allows a player character or a player object to perform an arbitrary action such as punching, throwing, capturing (obtaining), riding and jumping. For example, in an action game, the A button 42 makes it possible to designate jumping, punching and manipulating a weapon, etc. Also, in a role-playing game (RPG) or simulation RPG, the A button 42 makes it possible to designate the obtainment of an item, the selection and decision of a weapon and a command, and so on.

In addition, the above stated holding portion 18 is formed on the housing, backward of the concave portion 34, i.e., the A button 42. As described later, in using the controller 10, the controller 10, i.e., the housing 12 is held in such a manner that the player's palm of one hand wraps the holding portion 18. At that time, the player can hold stably the holding portion 18 only by one hand because the controller 10, i.e., the housing 12 is of a size or thickness capable of being held by one hand.

Moreover, the key top of the A button 42 is turned on by pushing it in the direction perpendicular to the inclined surface 38, that is, the direction toward the holding portion 18. The inclined part 38 is not perpendicular to the upper surface of the housing 12, that is, the first plane 20 and, in the end, the key top of the A button 42 is pushed in a direction not perpendicular to the upper surface 20. On the contrary, the B button 28 and the direction switch 26 are turned on by pushing them in the direction perpendicular to the upper surface 20 of the upper housing 16. These push directions mean directions in which the index finger and the thumb can apply pressure naturally in holding the holding portion 18. This makes it possible to support a periphery of the operating portion continuously by the thumb and the index finger during the operation while holding the holding portion 18, and perform the operation in the stable holding state at any time.

Furthermore, an X button 44 and a Y button 46 are arranged on the width-direction center line C1 and backward of the longitudinal-direction center C2 of the housing 12, in a straight line with a spacing between the two. These X button 44 and Y button 46 are used to make adjustments to view point position and view point direction in displaying a three-dimension game image, that is, make adjustments to a position and a field angle of a virtual camera.

Figure 7:
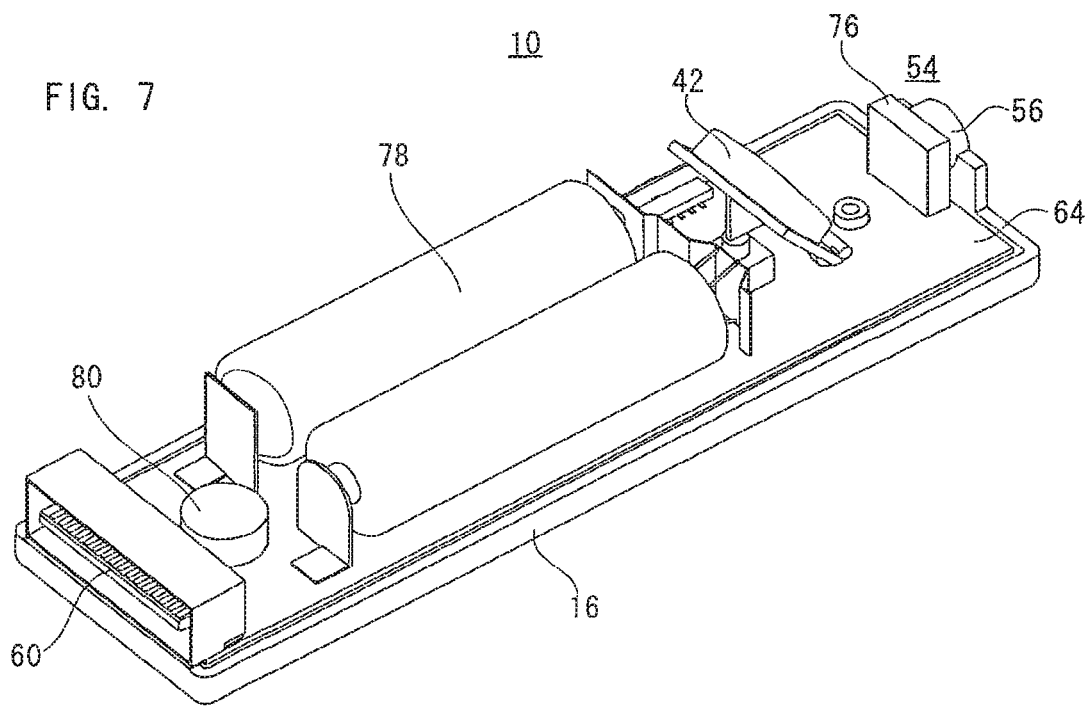
FIG. 7 is a perspective view of the first controller shown in FIG. 1 and FIG. 2 from which a lower housing is removed.

A battery cover 48 is detachably attached to the lower housing 14 forming the holding portion 18, and a battery 78 shown in FIG. 7 is stored inside the battery cover 48. Thus, the controller 10 operates with the battery 78 as a power source. In addition, the battery cover 48 can be detached by removing an engagement pawl 50 from the lower housing 14.

As stated above, the battery 78 as a relatively heavy matter is stored within a range of the holding portion 18 of the housing 12, and thus a center of gravity G (FIG. 2 (B)) is reliably contained within the range of the holding portion 18. This makes it possible to perform stably the displacement or movement of the controller 10 while holding the holding portion 18.

An infrared imaging device 56 forming one part of an imaging information arithmetic unit 54 described later in detail is arranged on a front-end surface 52 (FIG. 1 and FIG. 2 (A)) of the housing 12, and a 32-pin edge connector 60 is provided on a rear-end surface 58 (FIG. 1 and FIG. 2 (E)) of the housing 12, for example. The connector 58 is used to attach and connect the controller of this embodiment (the first controller) 10 to another second controller (described later), and so on.

Figure 3:
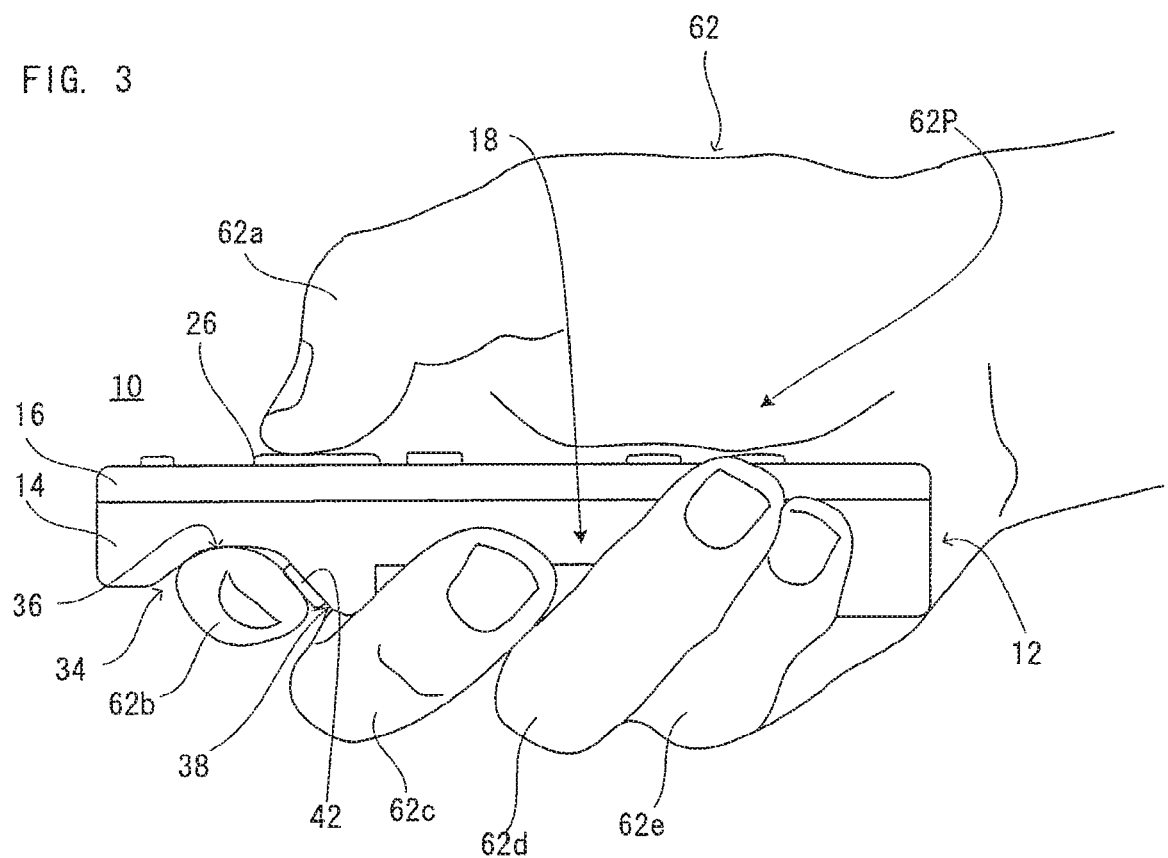
FIG. 3 is a side view of the first controller of the embodiment held by one hand.
Figure 4:
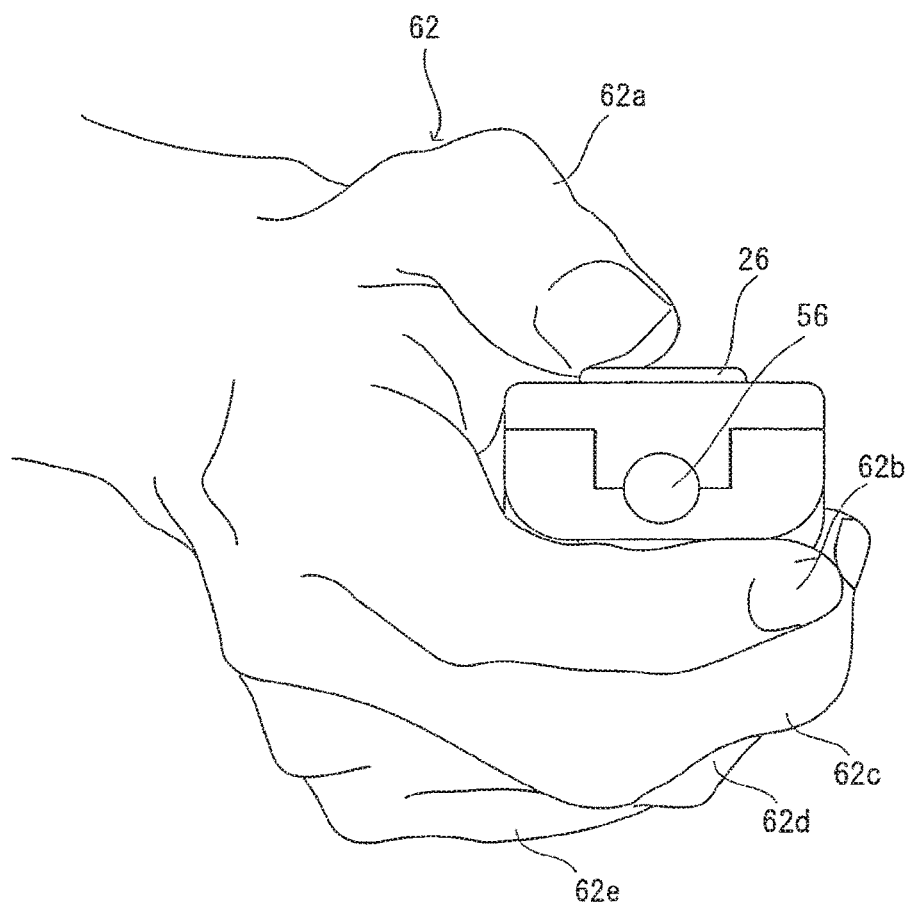
FIG. 4 is a front view of the first controller of the embodiment held by one hand.

The controller 10 structured in such a manner can be held by one hand of the game player (not shown). FIG. 3 and FIG. 4 show a state in which the player holds the controller 10 by his/her hand. Referring to these drawings, a player's palm 62P and balls of middle finger 62c, ring finger 62d and small finger 62e of one hand 62 (right hand in the drawings) hold the holding portion 18 of the housing 12 in such a manner as to wrap the holding portion 18 lightly. In the state, a thumb 62a of the hand 62 is positioned on the direction switch 26 and an index finger 62b is positioned in the valley 36 of concave portion 34 of the lower housing 14. More specifically, the direction switch 26 is arranged at a position reached by the thumb 62a of the hand 62 holding the housing 12, that is, at a position capable of being operated by the thumb 62a. The A button 42 is arranged at a position reached by the index finger 62b of the hand 62 holding the housing 12, that is, at a position capable of being operated by the index finger 62b. Accordingly, the player can operate the direction switch 26 by the thumb 62a and operate the A button 42 by the index finger 62b while holding the housing 12 by the hand 62. More specifically, the index finger 62b of the hand 62 is positioned in such a manner as to make contact with a surface of the valley 36 of the above stated concave portion 34 formed in the lower housing 14. By bending the index finger 62b toward him/her (rightward in FIG. 3) in that state, the user can push the key top of the A button 42 by the ball of the index finger 62b in a direction perpendicular to the near-side inclined surface 38 of the concave portion 34. Consequently, the player can operate the A button 42 by the index finger 62b while holding the housing 12 by the hand 62.

Besides, the same applies if the holding hand 62 is a left hand.

In addition, the A button 42 is described above as being operated by the index finger 62b. Alternatively, by further providing an A2 button (not shown) of the same shape as the A button backward of the A button 42, the housing 12 may be held by the palm 62P and the balls of the ring finger 62d and small finger 62e so that the A button 42 can be operated by the index finger 62b and the A2 button 32 by the middle finger 62c, respectively.

As stated above, the controller 10 of this embodiment, under the state of being held by one hand, allows the first operating portion (the direction switch 26 in the embodiment) and the second operating portion (the A button 42 in the embodiment) to be easily operated. That is, the controller 10 of this embodiment makes it possible to operate each of the operating portions with stability while holding the controller 10 by one hand. Therefore, the player can use the other hand for playing a game or for another purpose. Moreover, since it can be held only by one hand, the controller 10 can be handled more freely as compared with the case of holding by the both hands. As a consequence, it is possible to perform smoothly the carrying, movement or displacement of the controller 10.

Additionally, in the controller 10 of this embodiment, the position of the first operating portion, for example, the direction switch 26 provided on the upper surface 20 of the housing 12 and the position of the second operating portion, e.g., the A button 42 provided on the lower surface of the housing 12 correspond to each other on the upper and lower surfaces 20 and 22 of the housing 12 so that the housing 12 can be caught by the thumb and the index finger (or middle finger) operating these portions, resulting in further stable operations. For example, when the direction switch 26 is operated by the thumb 62a, the housing 12 is supported from underneath by the index finger 62b or the middle finger 62c positioned in the concave portion 34 for operating the A button 42, which makes it possible to push the direction switch 26 by the thumb 62a in a stable manner. Likewise, when the A button 42 is operated by the index finger 62b or the middle finger 62c, the housing 12 is supported from above by the thumb 62a for operating the direction switch 26, which make it possible to push the A button 42 by the index finger 62b or the middle finger 62c with stability.

Furthermore, in this embodiment, the center of gravity G of the controller 10 falls a cross point of the width-direction center line C1 and the longitudinal-direction center line C2 shown in FIG. 2 (B) or a vicinity thereto. The position of the center of gravity G is contained in a range of the holding portion 18, as can be seen well from FIG. 2. Therefore, when the controller 10 is held at the holding portion 18, the holding hand 62 (FIG. 6) supports the position of the center of gravity G, which allows the holding state to be maintained with greatly high stability. Thus, it is possible to perform further smoothly the movement, carrying or displacement of the controller 10 for the imaging information arithmetic unit.

Figure 5:
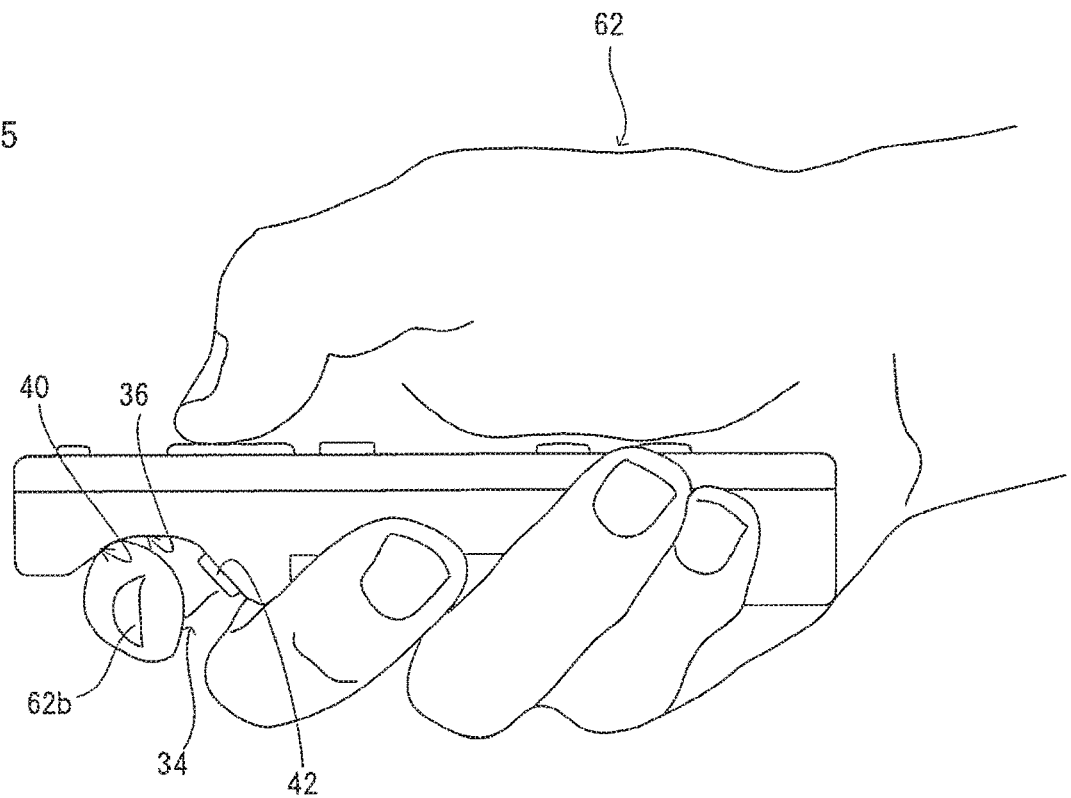
FIG. 5 is an illustrative view showing the state of FIG. 3 in which an index finger is taken off an A button.

FIG. 3 shows a state that the index finger 62b presses the A button 42. When it is not necessary to press the A button 42, the index finger 62b may be moved off the A button 42 (the same applies to the middle finger 62c). That is, as shown in FIG. 5, by pushing the index finger 62b (or the middle finger 62c) against the front-end inclined surface 40 of the concave portion 34, it is possible to make the housing stable in the state that the A button 42 is released from the index finger 62b (the middle finger 62c). Consequently, it is not necessary to change the state of holding the housing 12 (change a holding manner), depending on whether to press the A button 42 or not.

Figure 6:
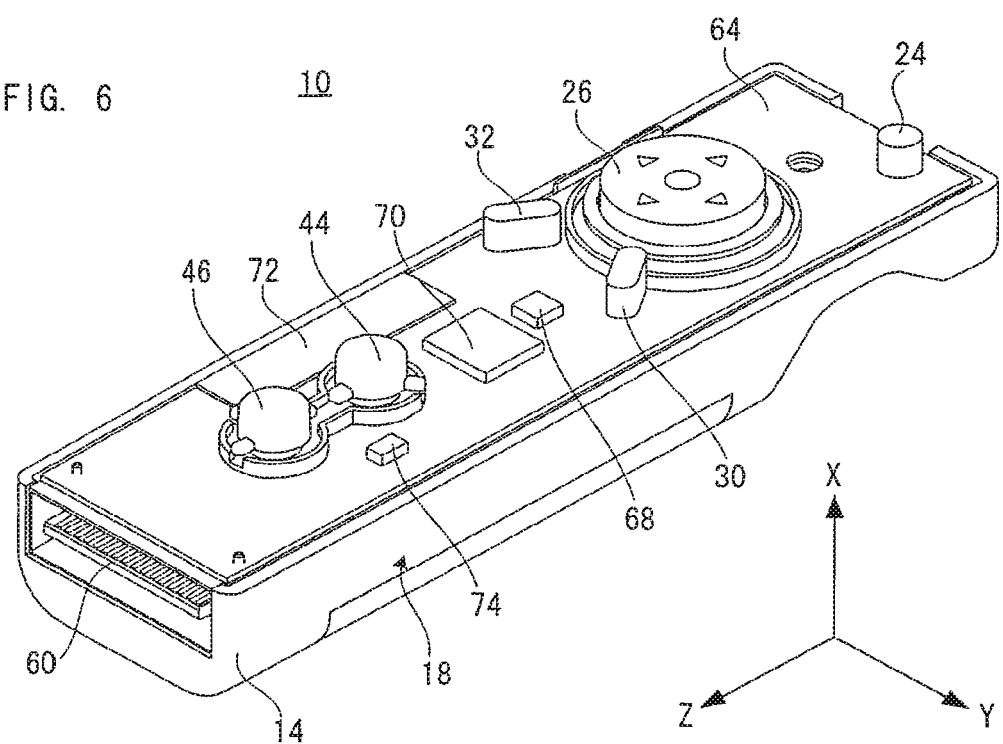
FIG. 6 is a perspective view of the first controller shown in FIG. 1 and FIG. 2 from which an upper housing is removed.

FIG. 6 and FIG. 7 illustrate the state that the upper housing 16 is removed from the controller 10 and the state that the lower housing 14 is removed from the controller 10, respectively. As shown in FIG. 6 indicating the removal of the upper housing 16, a substrate 64 is attached to an upper end of the lower housing 14 in such a manner as to seal the upper opening of the lower housing 14. The above described power switch 24, direction switch 26, start switch 30, select switch 32, X button 44 and Y button 46 are mounted on an upper main surface of the substrate 64, and they are connected to a processor 66 (FIG. 8) constituting a controller circuit by means of appropriate wiring (not shown).

Moreover, an acceleration sensor 68 and a wireless module 70 are assembled on the upper main surface of the substrate 64, between the direction switch 26 and the X button 44, for example, between the start switch 30 and the select switch 32.

The acceleration sensor 68 is preferably a three-axis linear accelerometer that detects linear acceleration along each of an X axis, Y axis and Z axis. Alternatively, a two-axis linear accelerometer that only detects linear acceleration along each of an X axis and Y axis (or other pair of axes) may be used in another embodiment depending on the type of control signals desired. As a non-limiting example, the three-axis or two-axis linear accelerometer 68 may be of the type available from Analog Devices, Inc. or STMicroelectronics N.V. Preferably, the acceleration sensor 68 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 68.

As one skilled in the art understands, a linear accelerometer, such as acceleration sensor 68, is only capable of detecting acceleration along a straight line corresponding to each axis of the acceleration sensor. In other words, the direct output of the acceleration sensor 68 is limited to signals indicative of linear acceleration (static or dynamic) along each of the two or three axes thereof. As a result, the acceleration sensor 68 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 68, additional information relating to the housing 12 can be inferred or calculated, as one skilled in the art will readily understand from the description herein. For example, by detecting static linear acceleration (i.e., gravity), the linear acceleration output of the acceleration sensor 68 can be used to infer tilt of the object relative to the gravity vector by correlating tilt angles with detected linear acceleration. In this way, the acceleration sensor 68 can be used in combination with the processor 66 (or another processor) to determine tilt, attitude or position of the housing 12. Similarly, various movements and/or positions of the housing 12 can be calculated or inferred through processing of the linear acceleration signals generated by the acceleration sensor 68 when the housing 12 containing the acceleration sensor 68 is subjected to dynamic accelerations by, for example, the hand of a user. In another embodiment, the acceleration sensor 68 may include an embedded signal processor or other type of dedicated processor for performing any desired processing of the acceleration signals output from the accelerometers therein prior to outputting signals to processor 66. For example, the embedded or dedicated processor could be used to convert the detected acceleration signal to a corresponding tilt angle when the acceleration sensor is intended to detect static acceleration (i.e., gravity).

In this embodiment, the acceleration sensor 68 and processor 66 function as a position and/or attitude determining means for determining the position and/or attitude of the controller 10 held by the player with his/her hand. By outputting information on the position and/or attitude through conversion of the acceleration signal output from the acceleration sensor 68, in addition to operation signals from the direction switch 26, the A button 42, etc. and obtaining operation signals for position or attitude at the game machine side, it is possible to perform game operations with a high degree of flexibility.

As stated above, by arranging the acceleration sensor 68 within the housing 12 so that the acceleration detected by acceleration sensor 68 can be used to determine the attitude and position of the housing 12, i.e. the controller 10, the player can easily change the position and attitude of the controller 10 by moving (turning) the wrist of his/her hand while holding the holding portion 18 of the housing 12 by that hand described above with reference to FIG. 3 to FIG. 5. Therefore, according to the controller 10 of this embodiment, it is possible to utilize not only operation signals from the operating switches 24 to 32, 44 and 46 of the controller 10 but also the position and attitude of the controller 10 as controller data, allowing further higher degrees of operations.

Moreover, the acceleration sensor 68 is provided within the housing 12 of the holding portion 18, and in the course of nature, the thumb is placed on the direction switch 26 and the index finger is placed on the A button 42, and the remaining fingers support the holding portion. Thus, no variations occur among individuals in the way to hold the controller 10, which makes it possible to perform high-precision detection without variations under predetermined criteria. That is, the above mentioned turning operation of the wrist may result in a displacement of a rotational axis due to its rotation. Also, since right-handed rotation and left-handed rotation are asymmetrical, there is a possibility of causing an error. However, by providing the acceleration sensor 68 within the housing 12 of the holding portion 18 as in this embodiment, the displacement of the rotation axis due to its rotation is reduced with a decreased possibility of detection errors.

Additionally, in the embodiment, the acceleration sensor 68 is set up within a range of the holding portion 18 of the housing 12 (FIG. 1). This brings about an advantage that the position and/or attitude determining means can determine the position and/or the attitude with high accuracy. Besides, the position and/or attitude determining means may be arranged at another position within the housing 12 according to the purpose. For example, as the position and/or attitude determining means is moved backward of the housing 12, the amount of change in position and/or attitude due to the displacement of the housing 12 becomes smaller. On the contrary, as the means is moved forward of the housing 12, the amount of change in position and/or attitude due to the displacement of the housing 12 becomes larger. Consequently, the position and/or attitude determining means may be arranged at the most appropriate position according to required performance.

In another exemplary embodiment, the acceleration sensor 68 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 68, a gyro-sensor is capable of directly detecting rotation (or angular rate) around an axis defined by the gyroscopic element (or elements) therein. Thus, due to the fundamental differences between a gyro-sensor and an linear acceleration sensor, corresponding changes need to be made to the processing operations that are performed on the output signals from these devices depending on which device is selected for a particular application. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotational movement, linear acceleration sensors are generally more cost effective when used in connection with the controller applications described herein.

An antenna pattern 72 is formed on the upper main surface of the substrate 64, and the controller 10 is provided as a wireless controller by the means of the antenna pattern 72 and the above mentioned wireless module 70. More specifically, the operation signals from the above stated individual switches and buttons 24 to 32, 44 and 46, and the detection data (detection signal) from the imaging information arithmetic unit 54 and acceleration data (acceleration signal) from the acceleration sensor 68 are modulated in the wireless module 70 to weak radio wave signals, and the modulated weak radio wave signals are emitted from the antenna pattern 72. Accordingly, the game machine (not shown), by receiving the weak radio waves and performing demodulation and decoding on them, can obtain the operation signals from the above stated individual switches and buttons 24 to 32, 44 and 46, and the detection data from the imaging information arithmetic unit 54 and the detected acceleration data from the acceleration sensor 68. Then, the game machine makes the game progress, based on the signals, data and game programs obtained in such a manner.

In addition, a crystal oscillator 74 provided on the upper main surface of the substrate 64 is intended to generate a basic clock of a computer or processor 66 (FIG. 8) contained in the controller 10.

As shown in FIG. 7 in which the lower housing 14 is removed, the imaging information arithmetic unit 54 is attached to an edge of the front end on the lower main surface of the substrate 64, and the connector 60 is attached to an edge of the rear end thereof. The imaging information arithmetic unit 54 has the above mentioned infrared imaging device 56 and an image processing circuit 76 for processing image data imaged by the imaging device (imaging means) 56.

Additionally, the above described A button 42 is attached to the lower main surface of the substrate 64 backward of the imaging information arithmetic unit 54, and the aforesaid battery 78 is stored further backward thereof. A vibrator 80 is attached to the lower main surface of the substrate 64, between the battery 78 and the connector 60. The vibrator 80 may be a vibrating motor or solenoid, for example. The vibrator 80 creates vibrations in the controller 10, and the vibrations are transmitted to the player's hand 62 (FIG. 3) holding it, which realizes a vibration-ready game. Consequently, it is possible to provide the player with a vibratory stimulus.

Besides, as stated above, arranging the vibrator 80 on the opposite side of the imaging information arithmetic unit 54 in the longitudinal direction of the housing 12 would decrease the possibility that the vibrations from the vibrator 80 affect adversely imaging by the imaging information arithmetic unit 54. That is, a longest distance can be secured between the vibrator 80 and the imaging information arithmetic unit 54, which makes it possible to prevent the imaging element of the imaging information arithmetic unit 54 from being blurred as much as possible.

Besides, in changing the direction of imaging with the imaging means or imaging device 56, the player may hold the holding portion 18 of the housing 12 by one hand and move the wrist of the hand in that state, as already described with reference to FIG. 3 to FIG. 5. At that time, the imaging means 56 is provided at the front end of the housing 12, the thumb is placed on the direction switch 26 and the index finger is placed on the A button 42 in the course of nature, and the remaining fingers support the holding portion. This makes it possible to perform an imaging operation under predetermined uniform criteria, independent of variations among individuals in the way to hold the controller 10.

Figure 8:
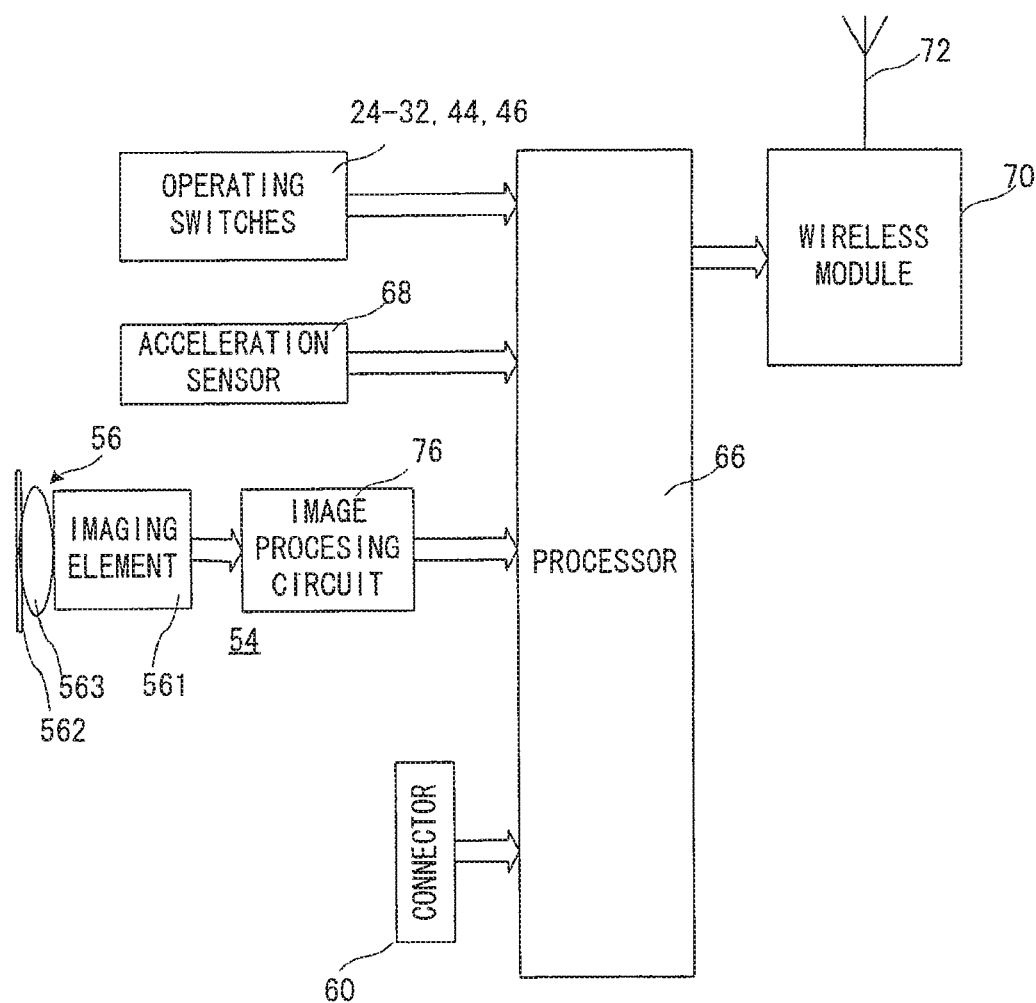
FIG. 8 is a block diagram showing electrical circuit structure of this embodiment.

Here, referring to FIG. 8, a description is given as to electric circuit structure of the controller 10 of the embodiment.

The imaging information arithmetic unit 54 has the infrared imaging device 56 and the aforesaid image processing circuit 76 for processing image data imaged by the imaging device 56. As illustrated, the imaging device 56 includes a solid imaging element 561 such as a CMOS sensor and a CCD. An infrared filter (a filter permeable to infrared rays only) 562 and a lens 563 are arranged frontward of the imaging element 561. Accordingly, the imaging device 56 generates image data through detection of infrared rays alone. In addition, the image processing circuit 76 processes the infrared image data obtained from the imaging device 56, senses a high-intensity portion, detects the portion's center-of-gravity position and area, and outputs the data on them. The data on the position and area of the high-intensity portion is input from the image processing circuit 76 to the processor 66. Moreover, the operation signals from the aforementioned switches and buttons 24 to 32, 4 and 46 are input into the processor 66. In addition, the three-axis or two-axis acceleration data (acceleration signal) from the acceleration sensor 68 is also input into the processor 66.

Based on the operation signals from the operating switches 24 to 32, 44 and 46, the processor 66 detects which one of the operating switches and operating buttons is being operated from time to time. The operation data is output as a sequence of controller data together with the acceleration data and the high-intensity portion data, and is input into the wireless module 70. The wireless module 70 modulates a carrier wave of predetermined frequency with the controller data, and emits the weak radio wave signal from the antenna 72.

Besides, the signals and data input through the connector 60 provided at the rear end of the controller 10 are also input into the processor 66, and processed by the processor 66 as with the aforementioned signals and data, provided as controller data to the wireless module 70, and then output as a weak radio wave signal from the controller 10 in the same manner.

Additionally, the processor 66 may be independent from the wireless module 70, and, in using a wireless module based on Bluetooth (registered trademark) standard, etc., it may be contained as a microcomputer in the module.

Figure 9:
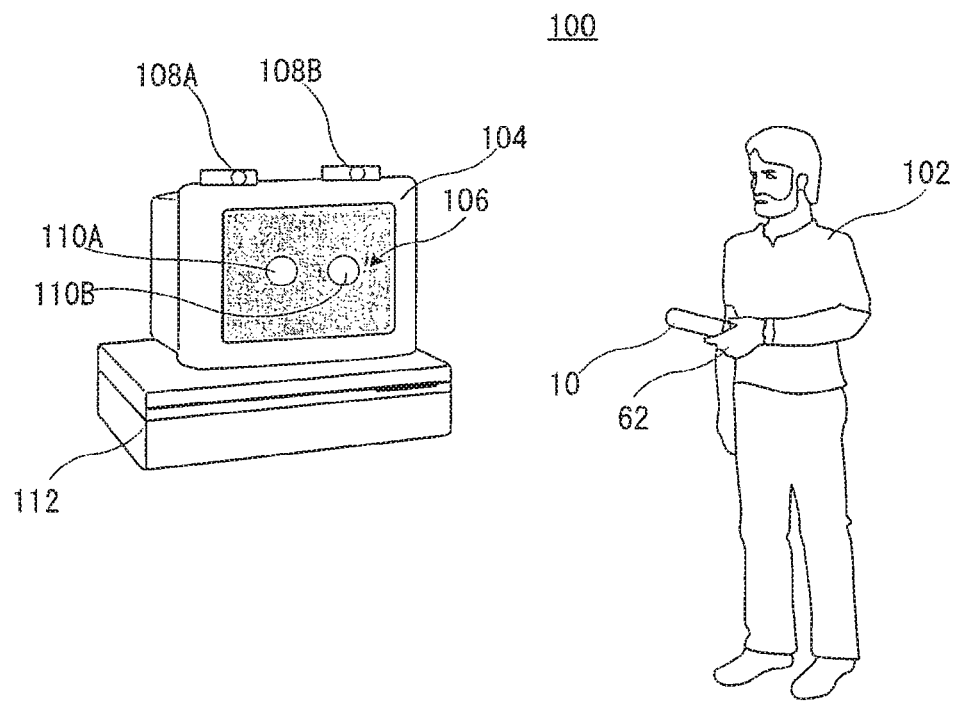
FIG. 9 is a schematic view of a situation in which a game is played by means of an imaging information arithmetic unit with the use of the first controller of this embodiment.

In order to play a game using the controller 10 in a game system 100, a player 102 holds the controller 10 (the housing thereof) by one hand 62, as shown in FIG. 9. Then, the player 102 faces the imaging device 56 (FIG. 8) of the aforementioned imaging information arithmetic unit 54 at the front end of the controller 10 toward a screen 106 of a display 104. At that time, two LED modules 108A and 108B are set up in a vicinity of the screen 106 of the display 104. Each of the LED modules 108A and 108B outputs infrared rays. Meanwhile, the infrared filter 562 (FIG. 8) is incorporated into the imaging information arithmetic unit 54 of the controller 10 held by the player, as described above.

The image processing circuit 76 (FIG. 8) of the imaging information arithmetic unit 54 obtains information on the positions and areas of the LED modules 108A and 108B as high-intensity point information, by processing the taken image containing the infrared rays. Data on the positions and magnitudes of the intensity points is transmitted from the controller 10 to a game machine 112 by radio (weak radio waves), and received by the game machine 112. When the player moves the controller 10, i.e. the imaging information arithmetic unit 54, the data on the intensity point positions and magnitudes is changed. By taking advantage of this, the game machine 112 can obtain an operation signal corresponding to the movement of the controller and make the game progress according to that.

In this manner, the imaging information arithmetic unit 54 can image a marker (an infrared light from the LED in the embodiment) and obtain an operation signal according to a change in the position of the marker in the taken image. This allows coordinate direct input and rotational input to the screen, unlike operations with the operating switches, operating keys or operating buttons which are manipulated with fingers. However, the principle of the imaging information arithmetic unit is well known as described in Japanese Patent No. 3422383, and thus a more detailed explanation on it is omitted here. Besides, motion tracking means an analysis of the movement of an object or camera (the controller 10 here) with a specific mark or pattern as a target in the screen (image).

Figure 10:
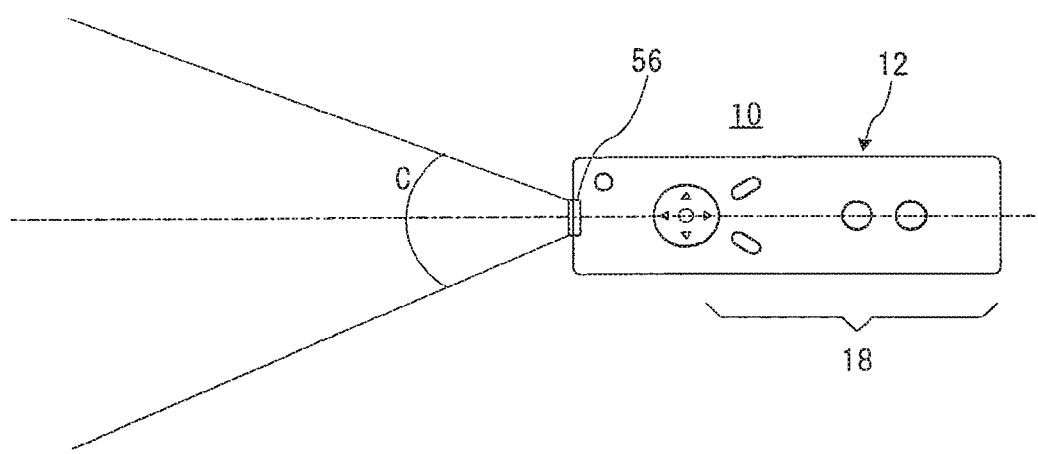
FIG. 10 is an illustrative view of a situation in which an imaging range of the imaging information arithmetic unit covers the longitudinal direction of the holding portion in alignment with the same.
Figure 29:
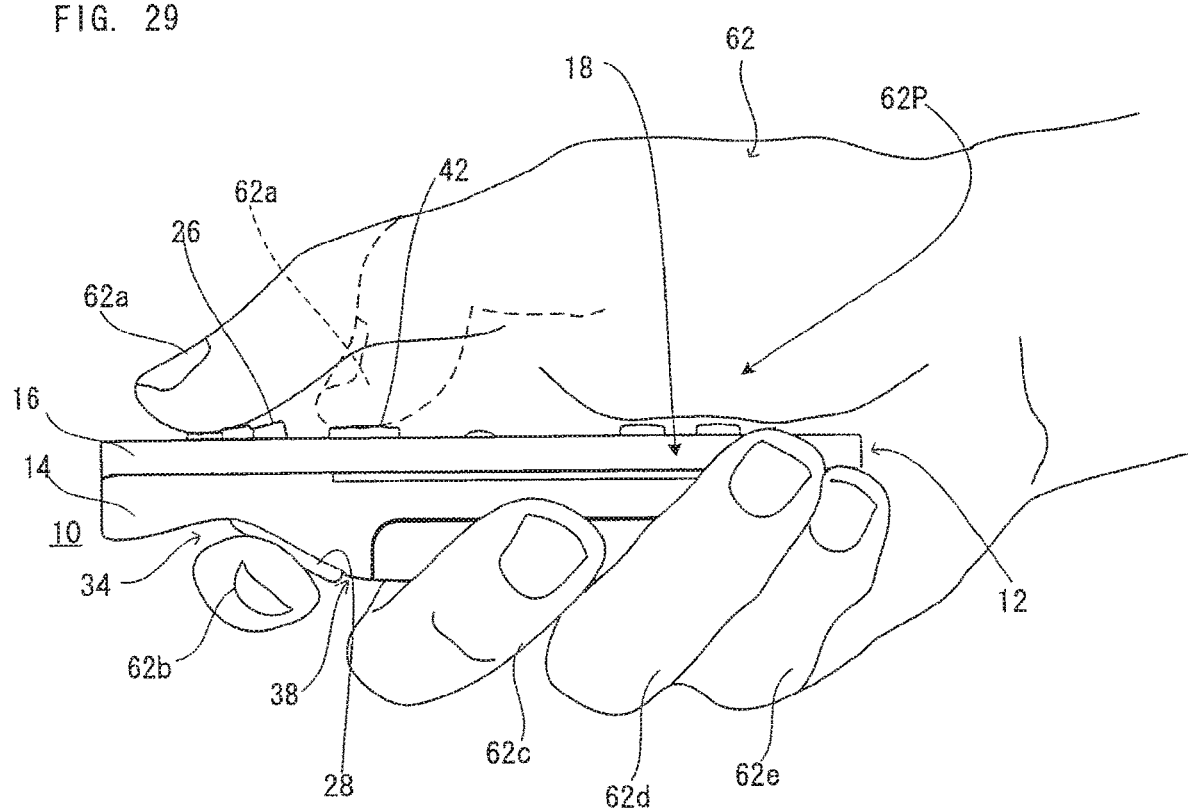
FIG. 29 is a side view of the first controller of this embodiment held by one hand.

FIG. 10 is a schematic view of the controller 10 illustrated in detail in FIG. 1 and FIG. 2, for example. As depicted in FIG. 10, the holding portion 18 is set up near a one end of the longitudinal direction of the housing 12 of the controller 10, that is, a one end of the direction along the width-direction center line C1, and the imaging device 56 is installed at the other end of the housing 12, on the center line C1 and on the opposite side of the holding portion 18. Accordingly, as shown in FIG. 3, a straight line (the width-direction center line C1) passing through the palm 62P of the hand 62 holding the holding portion 18 is in alignment with the direction of designation by the imaging device 56, which brings about an advantage that it is easy to recognize the direction in which the imaging device 56 is faced. More specifically, since the direction of imaging by the imaging device 56 (corresponding to a direction in which a viewing angle C described later is faced) is in parallel with the longitudinal direction of the housing 12, it is possible to grasp the direction of designation by the imaging device 56 through intuition while holding the housing 12. Here, the longitudinal direction of the housing 12, in the case of a rectangular housing as with the embodiment, is represented by the width-direction center line C1, for example. In addition, when the thumb is placed in the center of the direction switch 26, for example, and the holding portion 18 is held by the palm and the other fingers as shown in FIG. 29 described later, the direction of imaging by the imaging device 56 denotes a direction in which the thumb is faced.

Besides, the LED modules 108A and 108B shown in FIG. 9 and the imaging information arithmetic unit 54 of the controller 10 have viewing angles A, B and C, respectively. In the embodiment, the viewing angles A and B are equal to each other and they are 34° (half-value angle), for example, and the viewing angle C is 41°, for example. Additionally, in tracking operation, when the two LED modules 108A and 108B exist within the viewing angle C of the imaging device 56 as shown in FIG. 10, the imaging information arithmetic unit 54 detects the movements of the imaging information arithmetic unit 54, i.e. the controller 10, by using the information on the positions and magnitudes of high-intensity points from the two LED modules 108A and 108B.

Figure 11:
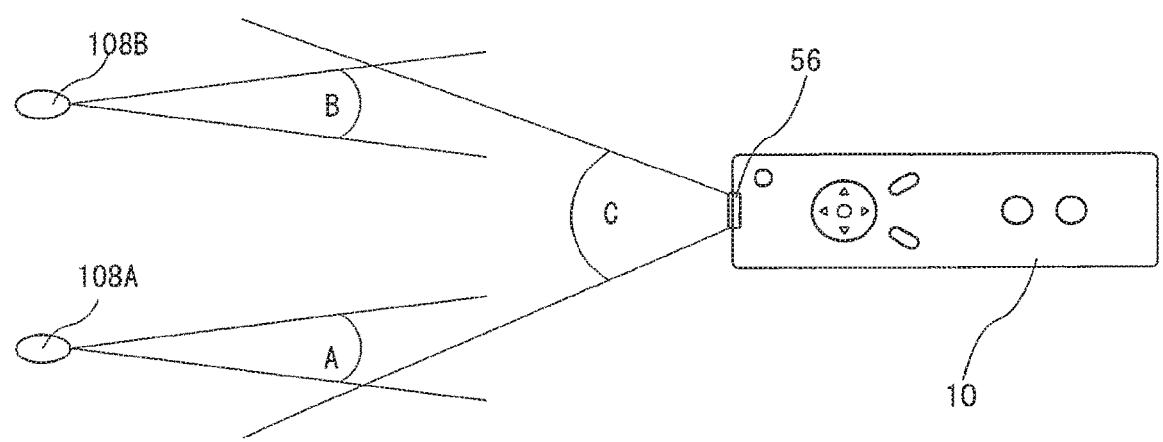
FIG. 11 is an illustrative view showing a situation in which, because of a relationship between an imaging range (viewing angle) of the imaging device of the first controller and a half-value angle of light intensity of LED module, two LED modules exist concurrently within the viewing angle of the imaging device.
Figure 12:
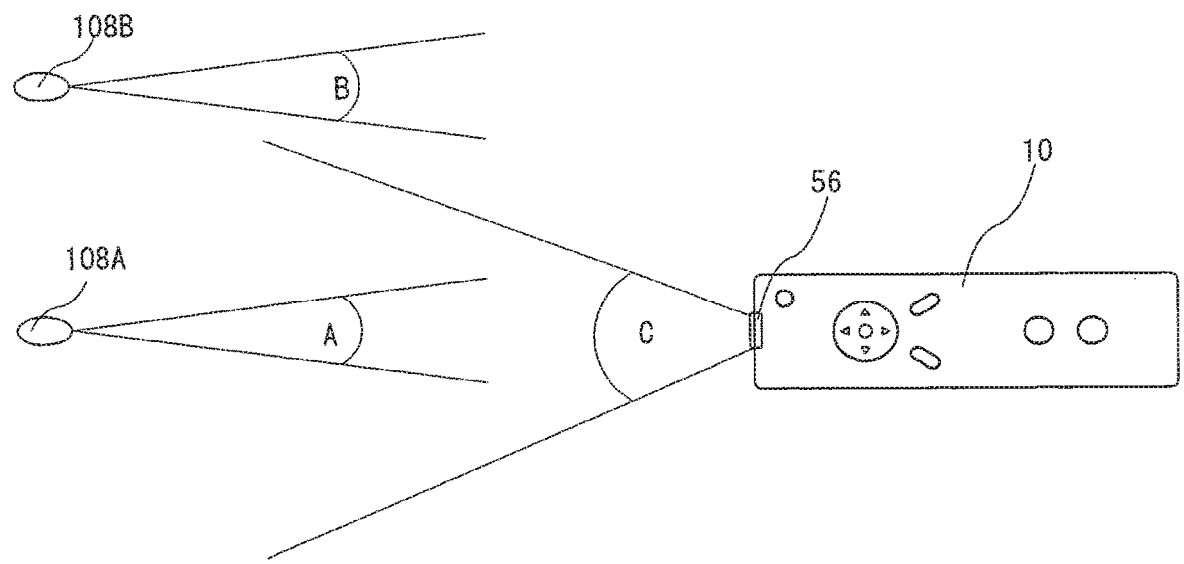
FIG. 12 is an illustrative view showing a situation in which, because of a relationship between an imaging range (viewing angle) of the imaging device of the first controller and a half-value angle of light amount of LED module, only one LED module exists within the viewing angle of the imaging device.

However, when only one LED module 108A or 108B exists within the viewing angle C of the imaging device 56 as shown in FIG. 11, the imaging information arithmetic unit 54 detects the movement of the controller 10 by using the information on the position and magnitude of high-intensity point from only one of the two LED modules 108A and 108B.

The above described controller 10 sufficiently carries out the functions as a game operating device by itself. Furthermore, as in an embodiment described below, it is possible to make the controller 10 cooperate with another controller (or an adapter).

Figure 13:
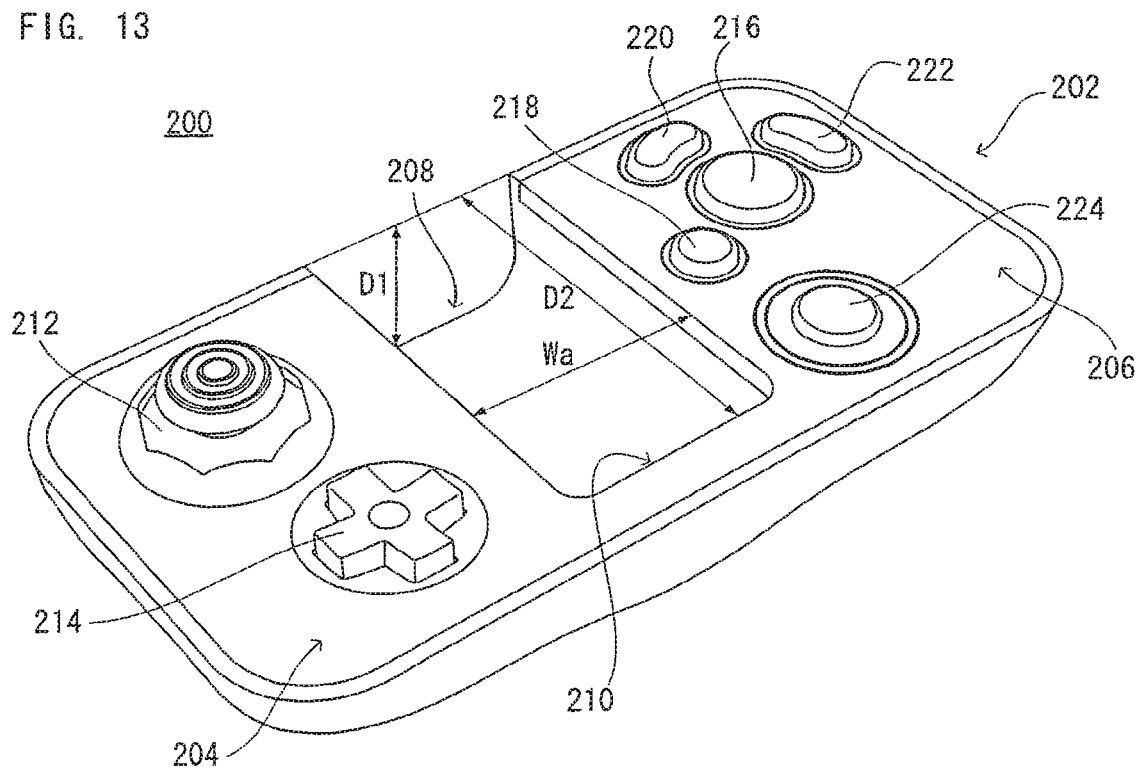
FIG. 13 is a perspective view showing a controller (second controller) constituting another embodiment of the present invention.
Figure 14:
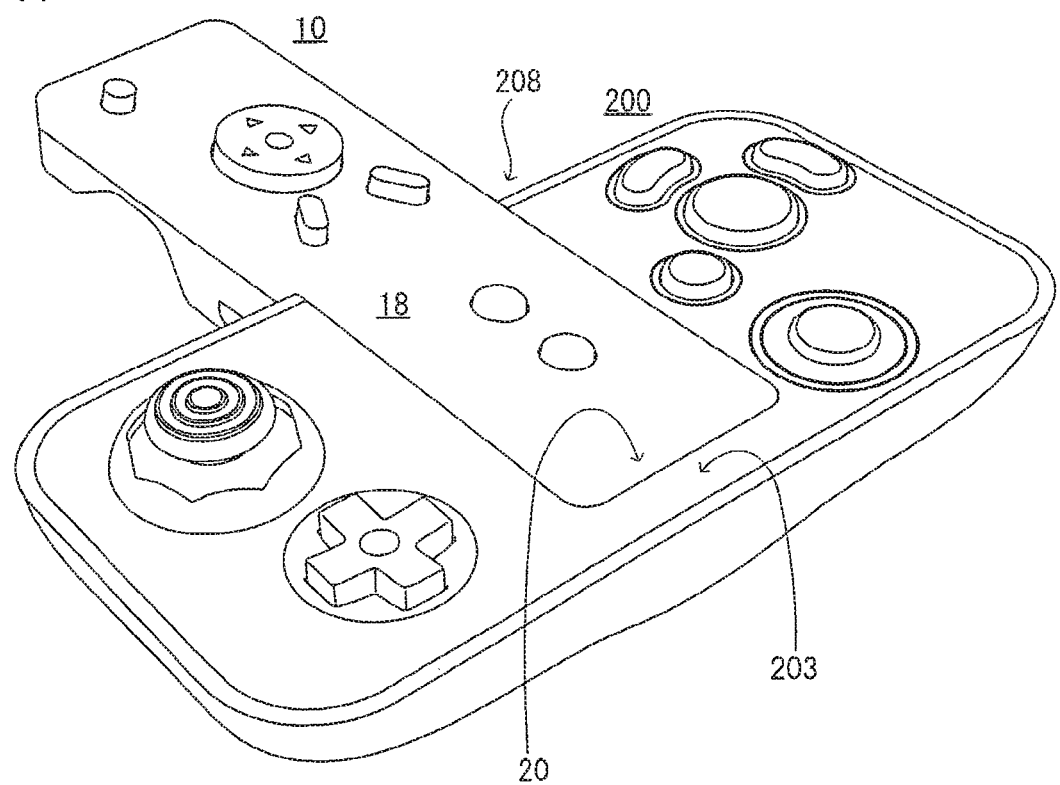
FIG. 14 is a perspective view showing a combination of the second controller of this embodiment and the first controller of the preceding embodiment.
Figure 15:
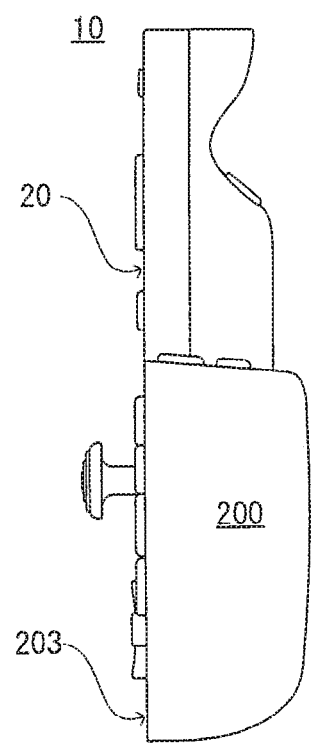
FIG. 15 is a right side view showing the combination of the second controller of this embodiment and the first controller of the preceding embodiment.
Figure 16:
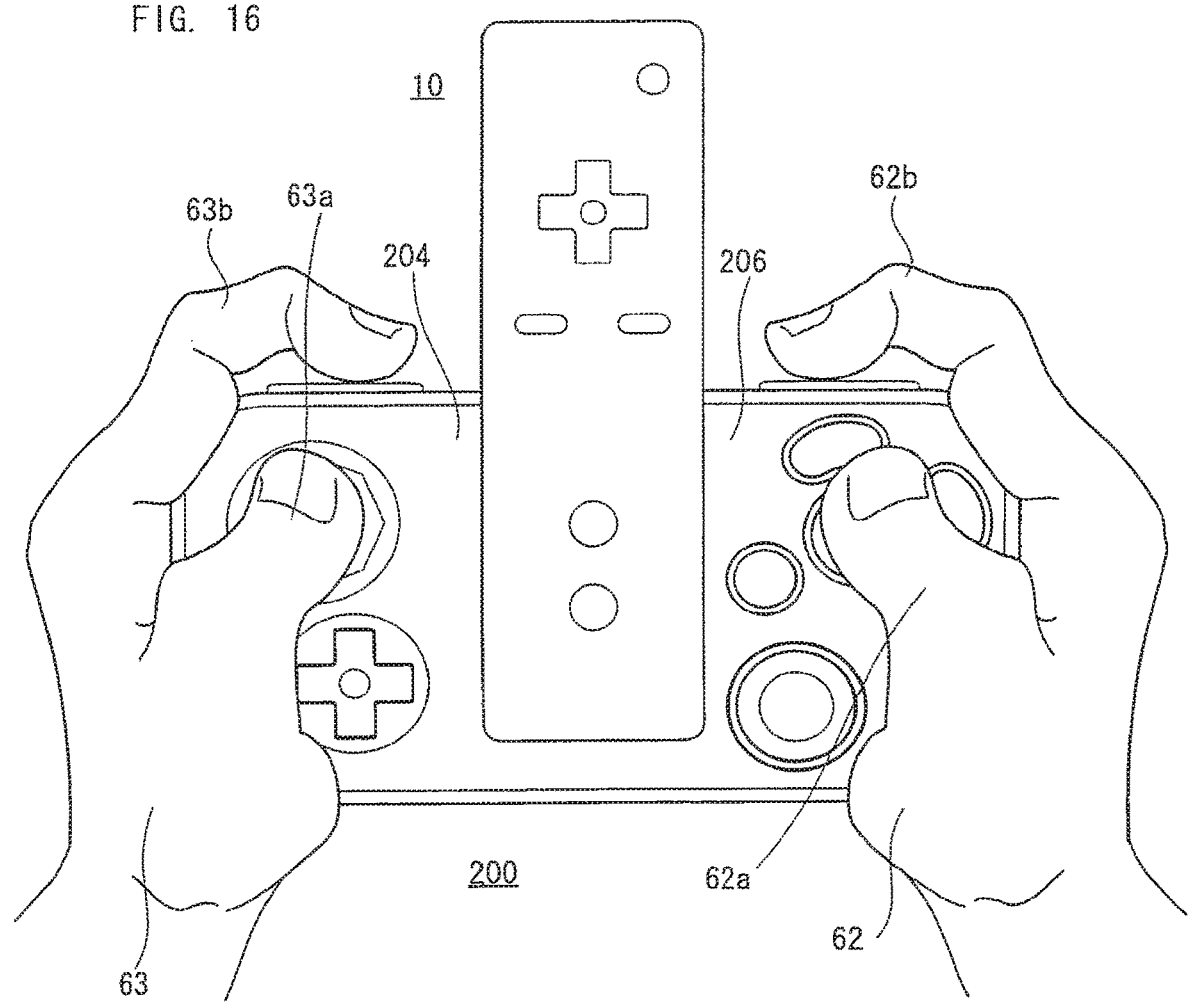
FIG. 16 is an illustrative view showing the case of performing an operation with the combination of the first controller and the second controller.

In the embodiment represented in FIG. 13 to FIG. 17, a second controller 200 shown in FIG. 13 and the first controller 10 of the embodiment described earlier are employed. More specifically, the second controller 200 includes a transverse housing 202, unlike the longitudinal housing 12 of the first controller 10. Left and right sides of the transverse housing 202 function as holding portions 204 and 206, respectively. The holding portion 204 is wrapped and held by the palm of the left hand 63, and the holding portion 206 is wrapped and held by the palm of the right hand 62, as illustrated in FIG. 16. That is, the holding portion 204 is a left-hand holding portion and the holding portion 206 is a right-hand holding portion. The same thing applies to a different embodiment of FIG. 18 to FIG. 20. In addition, a surface of the holding portion 204 and a surface of the holding portion 206 are located in the same plane, and form together an upper surface 203 of the housing 202 shown in FIG. 14 and FIG. 15.

A receiving portion 208 is formed between the left-hand holding portion 204 and right-hand holding portion 205 of the housing 202. The receiving portion 208 is a concave portion for accepting the housing 12 of the first controller 10. The receiving portion 208 has a shape with opened front surface and upper surface, and its inner shape is similar to the outer shape of the housing 12 (FIG. 2 (E)) in a direction orthogonal to the longitudinal direction of the first controller 10, and is slightly larger in dimensions than the same. More specifically, a width Wa of the receiving portion 208 is equal to or slightly larger than the width W of the housing 12 of the first controller 10 shown in FIG. 2 (D), and a depth D1 of the same is almost equal to the thickness T of the housing 12 (FIGS. 2 (A) and (E)). However, a length D2 of depth of the same is set in correspondence with the length of the holding portion 18 of the housing 12 of the first controller 10 clearly illustrated in FIG. 1, for example. That is, the depth D2 of the receiving portion 208 is equal to or slightly longer than or slightly shorter than the length of the holding portion 18 of the first controller 10 (in the longitudinal direction of the first controller).

Additionally, although not illustrated with precision, a connector 210 to be connected with the connector 56 provided to the first controller 10 is arranged in a back of the receiving portion 208. Since the connector 56 of the first controller 10 is a male connector, the connector 210 of the second controller 200 is a female connector.

A well-known analog joystick 212 and direction switch (digital joystick) 214 are arranged on the upper surface of the left-hand holding portion 204 of the housing 202 of the second controller 200. Also, an A button 216 and B button 218 are provided on the upper surface of the right-hand holding portion 206, and an X button 220 and Y button 222 are provided so as to surround the slightly larger A button 216. Moreover, a joystick 224 is provided for changing a position, i.e. view point of a virtual camera while a three-dimensional game image is displayed in the display screen 106 (FIG. 9). The functions and actions of the A button 216 and B button 218 are the same as those of the A button 42 and B button 28 of the first controller 10. The X button 220 is used to change an angle of gaze around an X axis of the virtual camera, for example, and the Y button 222 is used for changing an angle of gaze around the Y axis, for example.

The housing 12 of the first controller 10 is inserted from its other end (rear end) thereof into the opening of the front surface of the receiving portion 208 of the second controller 200. Then, the housing 12 is pushed into until the connector 56 of the first controller 10 is connected to the connector 210 of the receiving portion 208. By doing that, the first controller 10 is combined with the second controller 200, as shown in FIG. 14.

In the state of a combination of the first controller 10 and the second controller 200, the holding portion 18 of the first controller 10 is almost buried in the receiving portion 208, as can be seen well from FIG. 14 and FIG. 15 in particular. This is because the depth of the receiving portion 208 is set as to be equal to or slightly longer than or slightly shorter than the length of the holding portion 18. Accordingly, the center of gravity of the first controller 10 is supported by the second controller 200, and thus the first controller 10 can be stably supported by the second controller 200.

Moreover, the width of the receiving portion 208 is set as to be equal to or slightly longer than the width of the housing 12 of the first controller 10, and the depth of the same is formed so as to be equal to or slightly longer than the thickness of the housing 12. Thus, when the first controller 10 is inserted into or attached to the receiving portion 208 of the second controller 200, no rattle occurs between the first controller 10 and the second controller 200. In addition, as can be well understood from FIG. 15, the upper surface 20 of the housing 12 of the first controller 10 is flush with the upper surface 203 of the housing 202 of the second controller 200, and thus the first controller 10 never protrudes from the surface of the second controller 200 or interferes with the operation of the second controller 200.

When the first controller 10 and the second controller 200 are combined to each other, the player holds the holding portions 204 and 206 of the housing 202 of the second controller 200 by the left hand 63 and the right hand 62, respectively, as shown in FIG. 16. In that state, there is no need for using all the operating switches and buttons of the first controller 10 but a few of them. However, the wireless transmission function of the first controller 10 and the function of the imaging information arithmetic unit can be used as they are.

Figure 17:
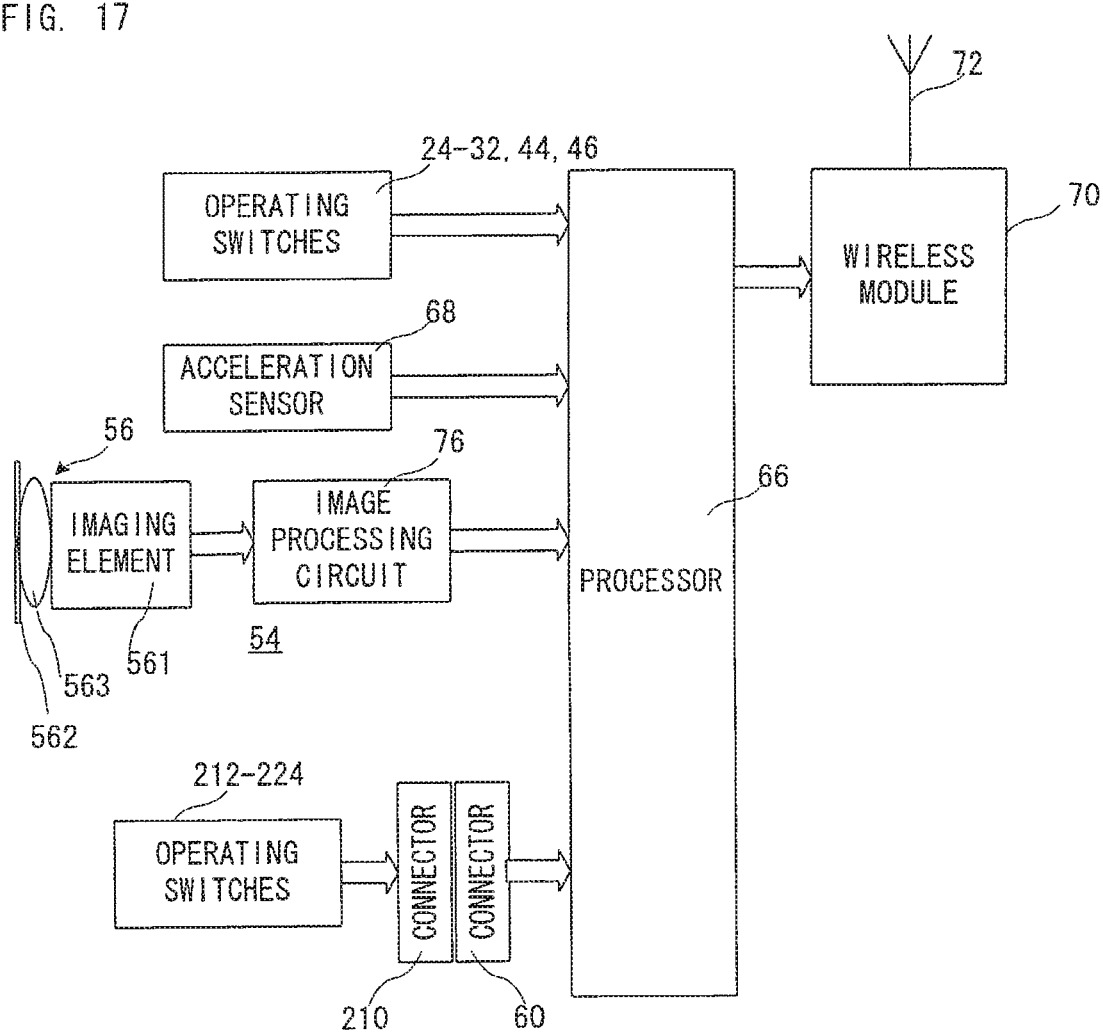
FIG. 17 is a block diagram showing electric circuit structure with the combination of the first controller and the second controller.

When the first and second controllers 10 and 200 are combined with each other as shown in FIG. 14 and FIG. 15, the electric circuit structure is as shown in FIG. 17. More specifically, in FIG. 17, the operating switches 212 to 224 are the operating switches and buttons of the second controller 200, and operation signals from these operating switches 212 to 224 are input from the connector 210 through the connector 56 into the processor 66 of the first controller 10. Accordingly, the processor 66 processes the operation signal from the second controller 200 in the same manner as the operating signals from the first controller 10, and inputs them as controller data into the wireless module 70. Therefore, the operating signals from the individual switches and buttons 212 to 24 of the second controller 200 can be wirelessly transmitted as controller data via weak radio waves from the wires module 70 through the antenna 72. As a consequence, the combination of the first controller 10 and second controller 200 functions as a wireless controller.

In addition, the imaging information arithmetic unit 54 of the first controller 10 is never affected by the combination of the first controller 10 and the second controller 200. Thus, by displacing the housing 202 of the second controller 200 held by both hands as shown in FIG. 16 from side to side or up and down, it is possible to play a game with the use of the function of the imaging information arithmetic unit of the first controller 10.

Besides, in the state where the first controller 10 and the second controller 200 are combined with each other, the first operating portion is typically the aforesaid direction switch 26 of the first controller 10, and the second operating portion is the A button 42 in the same sense. The third operating portion is the joystick 212 and the direction switch 214 provided in the left-hand holding portion 204 of the second controller 200. The fourth operating portion is the A button 216, etc. provided in the right-hand holding portion 206 of the second controller 200. However, the correspondences of the third operating portion and the fourth operating portion may be exchanged. In either case, the third operating portion and the fourth operating portion can be operated by the thumb 63a of the left hand 63 and the thumb 62a of the right hand 62, as shown in FIG. 16.

As described above, in the first controller 10, the first operating portion (the direction switch 26) is arranged at a position that can be operated by the thumb 62, and the second operating portion (the A button 42) is arranged at a position that can be operated by the index finger 62b or the middle finger 62c when the first controller 10 is held at the holding portion 18. Thus, in the first controller 10, it is a little hard to operate the X button 44 and the Y button 46 provided within a range of the holding portion 18. On the contrary, in the second controller 200, the X button 220 and the Y button 222 are both provided in the right-hand holding portion 206 of the housing 202 and are easy to operate by the thumb 62a in the state that the holding portion 206 is held by the right hand 62 (FIG. 16).

As stated above, it is possible to make the one-handed first controller 10 easier to operate by one hand by arranging a minimum required number of operating switches or keys therein. However, the aforementioned X button 44 and Y button 46, for example, may need to be operated with considerable frequency depending on the kind of a game. In the first controller 10, the X button 44 and the Y button 46 are not necessarily easy to operate because they are provided in the range of the holding portion 18. That is, the player may be dissatisfied with the first controller 10 alone due to difficulty of operating the X button 44 and the Y button 46. In this case, by combining the second controller 200 and the first controller 10, it is possible to prevent the player from having such dissatisfaction because the X button 220 and the Y button 222 of the second controller 200 are easy to operate.

In addition, the joystick 212 and the direction switch 214 are arranged as direction designation means in the second controller 200 as well. Meanwhile, the joystick 212 and the direction switch 214 are provided in the left-hand holding portion 204 of the housing 202 and easy to operate by the thumb 63*a* in the state that the holding portion 204 is held by the left hand 63 (FIG. 16). Accordingly, when the first and second controllers 10 and 200 are combined with each other, the direction designation means also becomes easy to operate. Moreover, the direction switch 26 is originally provided in the first controller 10 at an easy-to-operate position, the direction designation means to be used with a relatively high frequency has easy operability in both the cases of the first controller 10 is used singly and in combination with the second controller 200.

Besides, in the embodiment of FIG. 13 to FIG. 17, the A button 216, the B button 218, the X button 220 and the Y button 222 are arranged in the right-hand holding portion 206 of the second controller 200. Alternatively, in the case of this embodiment, it is possible to eliminate the A button 216 and the B button 218 from the second controller 200 so that only the X button 220 and the Y button 222 are arranged in the second controller 200.

That is, even when the first controller 10 and the second controller 200 are combined with each other, the A button 42 and the B button 28 (FIG. 1) can be operated without hindrance, and thus it is possible to eliminate some operating switch(es) and operating button(s) with duplicate functions from the second controller 200, resulting in cost reduction. On the other hand, the X button 44 and the Y button 46 of the first controller 10 becomes hard in some degree to operate at the time of the controller combination, and the functions of these buttons are covered by the operating switches (buttons) separately provided in the second controller 200. This would eliminate the inconvenience of operation resulting from the controller combination.

Figure 18:
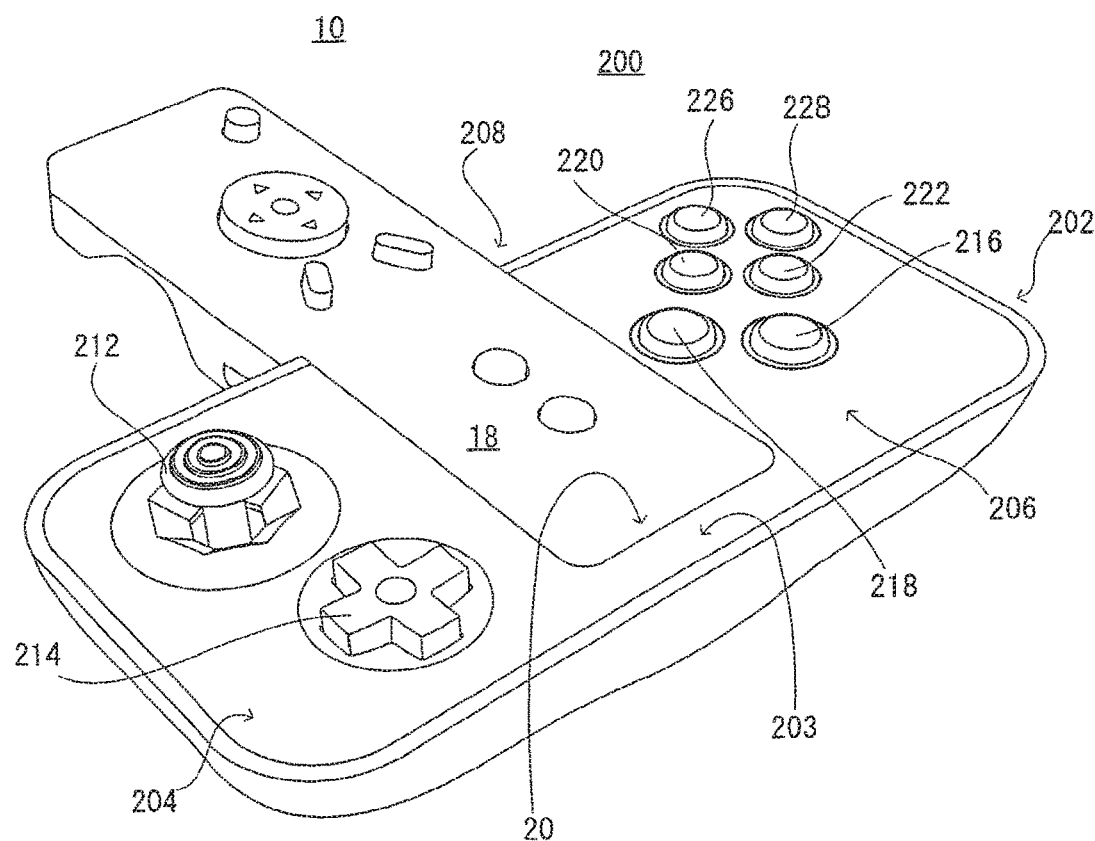
FIG. 18 is a perspective view showing a combination of another second controller constituting another embodiment of the present invention and the first controller.

An embodiment shown in FIG. 18 is the same as the embodiment shown in FIG. 13 to FIG. 17 except that the operating switches provided on upper surface of the right-hand holding portion 206 of the housing 202 of the second controller 200 are slightly different from those of the embodiment shown in FIG. 13 to FIG. 16. A duplicate description is omitted below, with assignment of the same reference numerals to similar operating switches or operating buttons. In the embodiment of FIG. 18, provided on the upper surface of the right-hand holding portion 206 of the housing 202 are the A button 216, the B button 218, the X button 220, the Y button 222, a C button 226, and a D button 228. The A button 216 and the B button 218 have the same functions as those of the A button 216 and the B button of the above described embodiment. The X button 220, the Y button 222, the C button 226 and the D button 228 realize the equivalent functions of the joystick 224 of the preceding embodiments.

Besides, in the embodiment of FIG. 18, the A button 216 and the B button 218 may be eliminated from the right-hand holding portion 206 of the second controller 200 so that only the X button 220 and the Y button 222 are arranged in the second controller 200, as in the case of the embodiment of FIG. 13 to FIG. 17. This makes it possible to achieve cost reduction and prevent a decrease in operability at the time of the controller combination.

Figure 19:
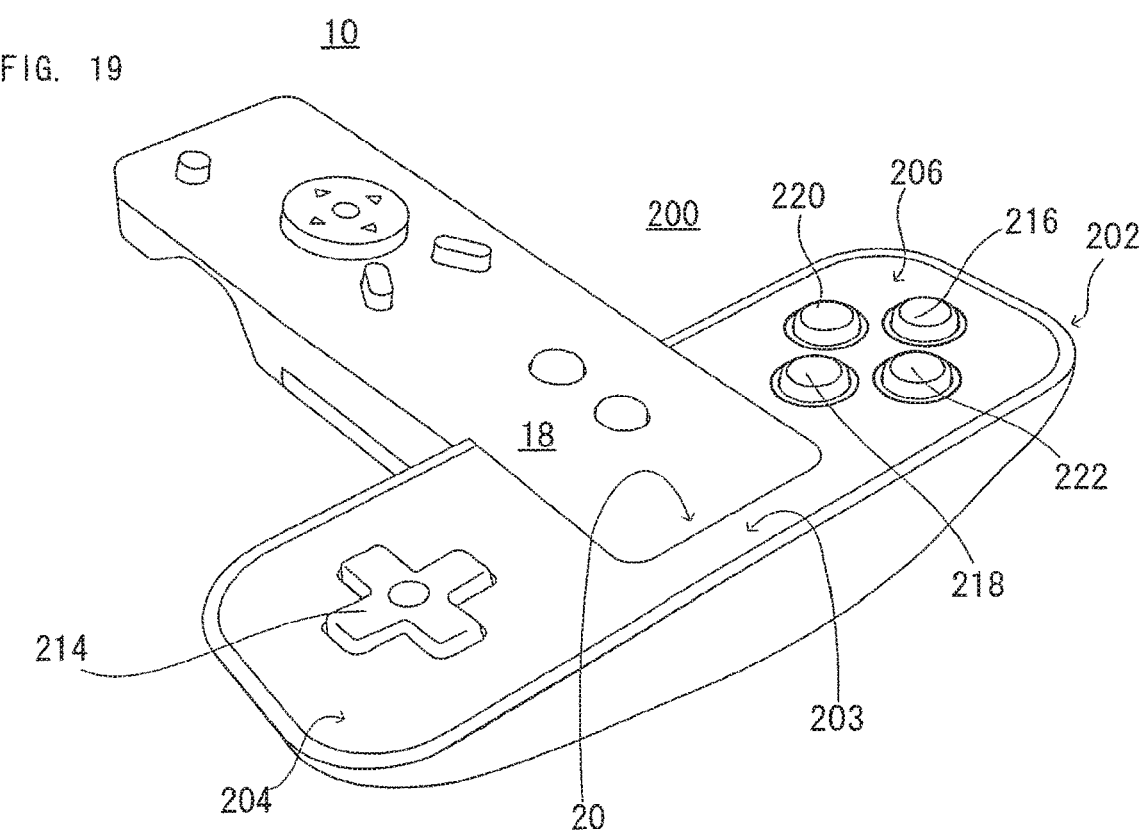
FIG. 19 is a perspective view showing a combination of still another second controller constituting still another embodiment of the present invention and the first controller.

An embodiment of FIG. 19 is identical with the embodiment of FIG. 13 to FIG. 17 and the embodiment of FIG. 18 except for a point described below.

Specifically, in both the embodiment of FIG. 13 to FIG. 16 and the embodiment of FIG. 18, the housing 202 has a sufficient width (in the longitudinal direction of the first controller 10) and thus the holding portion 18 of the first controller 10 is almost buried in the housing 202 of the second controller 200. On the contrary, in the embodiment of FIG. 19, the width of the housing 202 is slightly smaller as compared with the embodiment of FIG. 13 to FIG. 16 and the embodiment of FIG. 18, most part of the holding portion 18 of the first controller 10 is exposed from the housing 202. Accordingly, this embodiment is slightly unstable as compared with the preceding embodiments. However, the upper surfaces 20 and 203 of the respective housings 12 and 202 of the first controller 10 and second controller 200 are flush with each other as in the cases of the preceding embodiments.

Since the width of the housing 202 is slightly shorter, the joystick 212 provided in the left-hand holding portion 204 of the housing 202 of FIG. 18 embodiment is omitted and some changes are made to the switches of the right-hand holding portion 206 in this embodiment. In this embodiment, only the A button 216, the B button 218, the X button 220 and the Y button 222 are arranged in the right-hand holding portion 206.

Besides, in the embodiment of FIG. 19, the A button 216 and the B button 218 of the right-hand holding portion 206 of the second controller 200 may be eliminated so that only the X button 220 and the Y button 222 are arranged in the second controller 200, as in the case of the embodiment of FIG. 13 to FIG. 17. This makes it possible to achieve cost reduction and prevent a decrease in operability with the controller combination.

Figure 20:
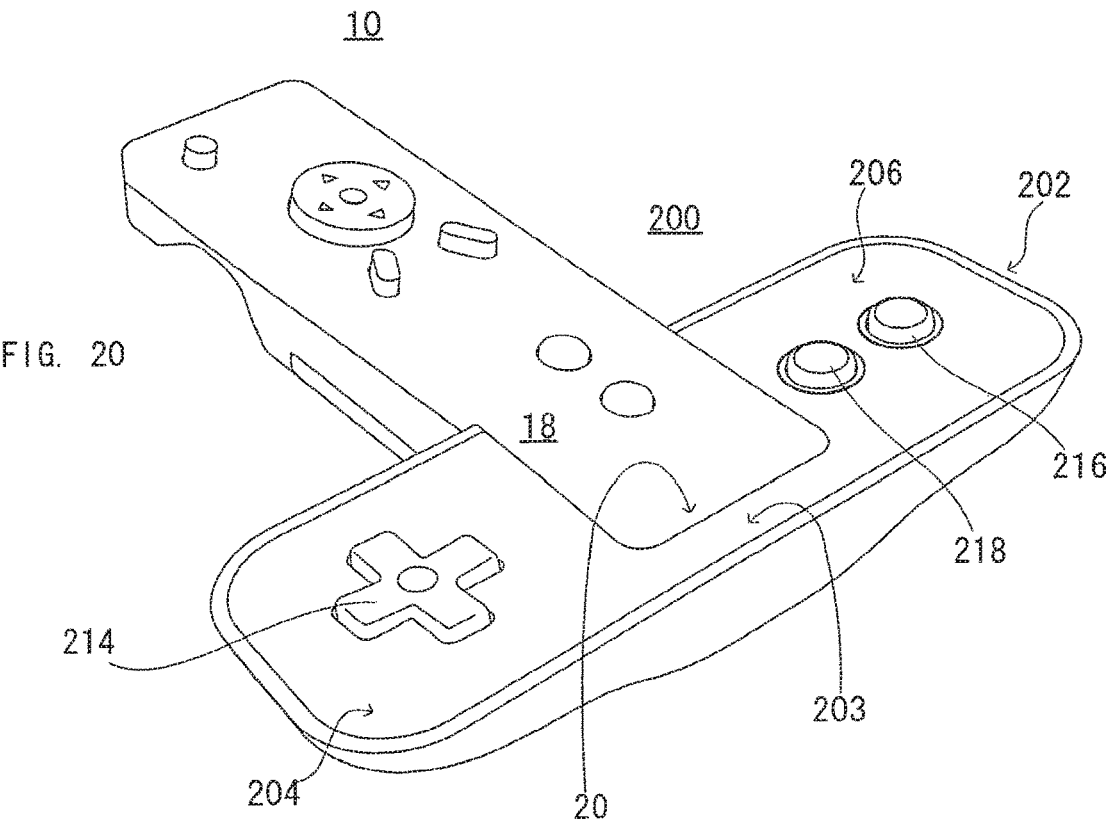
FIG. 20 is a perspective view showing a combination of further another second controller constituting further another embodiment of the present invention and the first controller.

An embodiment of FIG. 20 is the same as the embodiment of FIG. 19 except for a point described below. Specifically, as with the FIG. 19 embodiment, the holding portion 18 of the first controller 10 protrudes or is exposed longer from the housing 202 of the second controller 200 as compared with the embodiment of FIG. 13 to FIG. 16 and the embodiment of FIG. 18. Thus, also in this embodiment, only the A button 216 and the B button 218 are provided in the right-hand holding portion 206 of the housing 202. Alternatively, these buttons 216 and 218 may function as X button and Y button, not as A button and B button.

Figure 21:
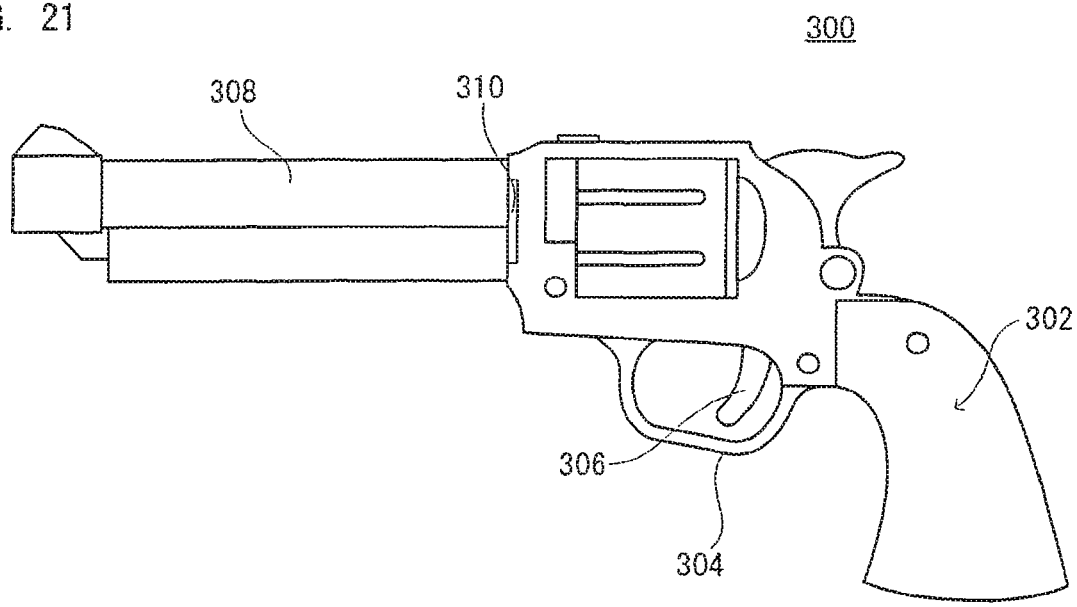
FIG. 21 is an illustrative view showing a gun-type adapter constituting yet another embodiment of the present invention.
Figure 22:
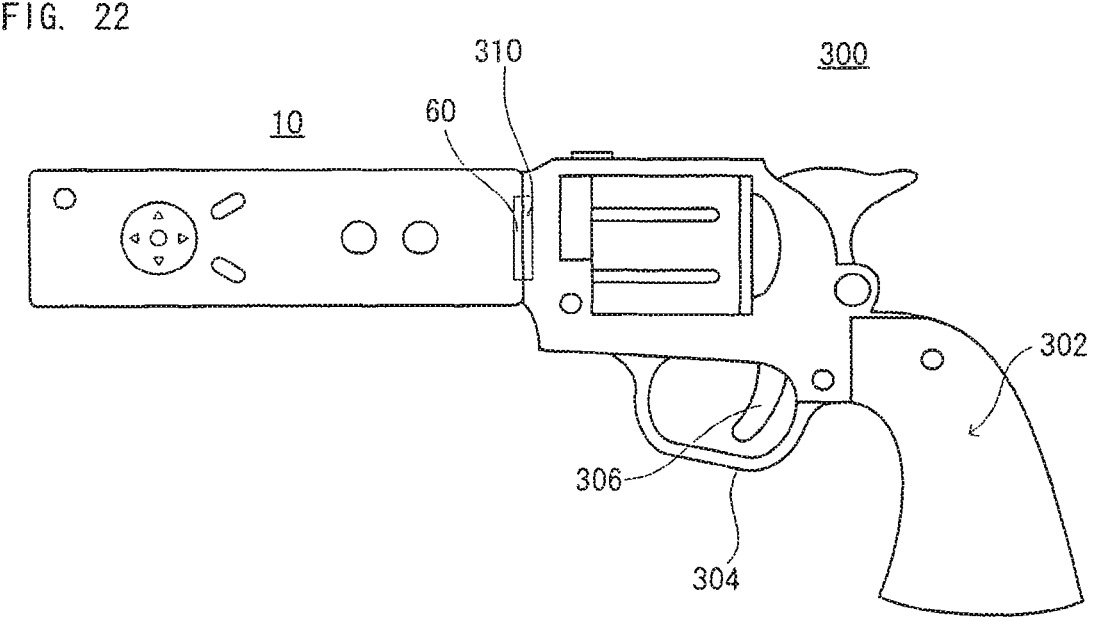
FIG. 22 is an illustrative view of the adapter of FIG. 20 embodiment to which the first controller is attached.

Shown in FIG. 21 is a gun-type adapter 300. The adapter 300 has a butt 302 for holding by hand, as with general gun-type controllers. The butt 302 is provided with a trigger 306 surrounded by a trigger guard 304. A gun barrel 308 extends from the butt 302 through a magazine. Besides, the gun barrel 308 can be detached by a connector 310 with respect to the butt 302.

In addition, by pulling out the gun barrel 308 from the connector 310 and inserting the connector 60 of the controller 10 into a connector 310, the first controller 10 can be attached instead of the gun barrel 308. In this case, it is possible to make the shooting game more interesting by allowing the trigger 306 to be used in place of the A button 42 of the controller 10.

Figure 23:
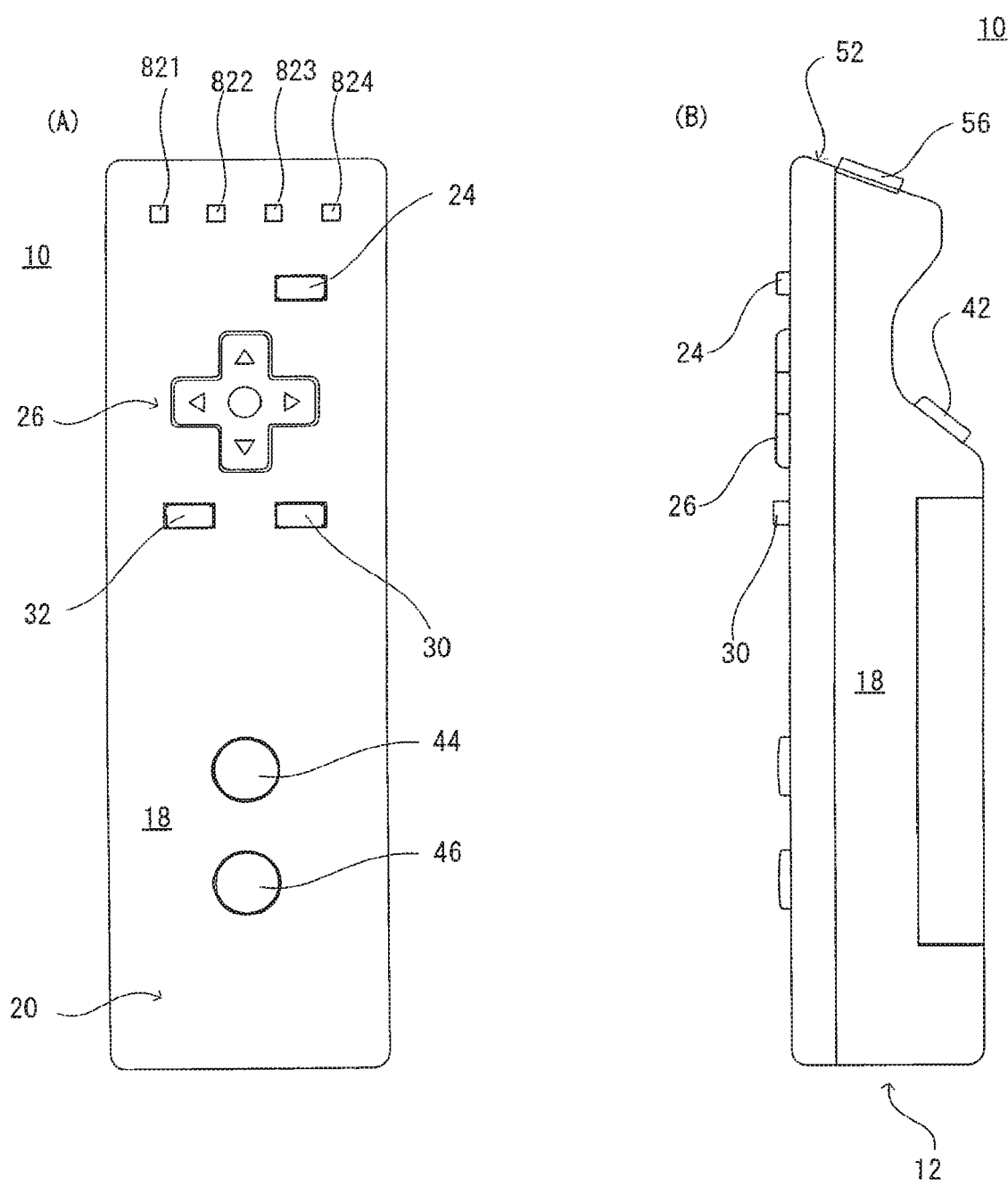
FIG. 23 is an illustrative view showing another embodiment of the first controller, and FIG. 23 (A) shows a layout of operating switches, in particular, on an upper surface thereof, and FIG. 23 (B) denotes a right side thereof.

In the first controller 10 of an embodiment shown in FIG. 23, the operating switches and buttons 24 to 32, 44 and 46 are changed in shape and layout as compared with the embodiment of FIG. 1. The direction switch 26, in particular, employs not the combined switch of FIG. 1 embodiment but a direction switch formed of a cross key frequently used in game machines. The cross key, i.e. the direction switch 26 may be identical with the direction switch 214 of the second controller 200. Also, in the first controller 10 of this embodiment, the start switch 30 and the select switch 32 are arranged in a sideway line, not arranged in the shape of the character "︿" as with the preceding embodiments.

Moreover, a plurality of (four in this embodiment) light-emitting diodes (LEDs) 821, 822, 823 and 824 are provided at one end (front end) of the upper surface 20 of the controller 10 of this embodiment. Light from the LEDs 821 to 824 can be visually recognized from outside, but they are buried in the upper surface 20 of the housing 12 and thus do not appear to protrude in FIG. 23 (B). Alternatively, it is absolutely acceptable that they are arranged so as to appear to protrude. When the first controller 10 transmits a radio wave signal as a controller signal (controller data), these LEDs 821 to 824 indicate the number of the controller because the LED corresponding to the controller number is turned on.

For example, when the game machine 112 shown in FIG. 9 is designed to accept four controllers at a time, each of four game players uses the first controller 10. The selective lighting of the LEDs 821 to 824 allows each of the users to ascertain which is his/her own controller, out of the first to fourth ones. When the LED 821 of his/her controller 10 is turned on, for instance, the player can understand that the controller is assigned as first controller.

Additionally, in the embodiment of FIG. 23, the front-end surface 52 of the housing 10 is formed as an inclined surface, not a surface orthogonal to an axis along the longitudinal direction of the housing 12, unlike the preceding embodiments. Also, the imaging device 56 of the imaging information arithmetic unit is attached to the inclined front-end surface, and thus a central axis in the imaging range of the imaging information arithmetic unit, i.e. the imaging device 56 crosses obliquely the axis along the longitudinal direction of the housing 12. Accordingly, the housing 12 can be inclined on the whole by holding the housing 12 at the holding portion 18 and facing the inclined front-end surface 52, i.e. the imaging device 56 straight toward the screen 106 of the display 104. Consequently, according to this embodiment, the player may feel less tiredness on his/her hand in operating the controller 10 in his/her chair, for example.

That is, in the preceding embodiments, the front-end surface of the housing 12 is orthogonal to the axis along the longitudinal direction. Accordingly, in facing the imaging device 56 attached thereto straight toward the screen 106, it is necessary to hold the controller 10 in such a manner that the upper surface 20 of the housing 12 is faced upward and that the axis is in a horizontal state. Also, in that state, the imaging device 56 needs to be brought to a place within the screen 106. In that case, the wrist of the hand holding the holding portion 18 may be under too much tension. On the contrary, in the embodiment of FIG. 23, the imaging device 56 can be faced straight toward the screen 106 even while holding the housing 12 by the wrist at a natural angle or in a natural state. This makes it possible to reduce the tiredness on the player's wrist without causing excessive stress on it.

Figure 24:
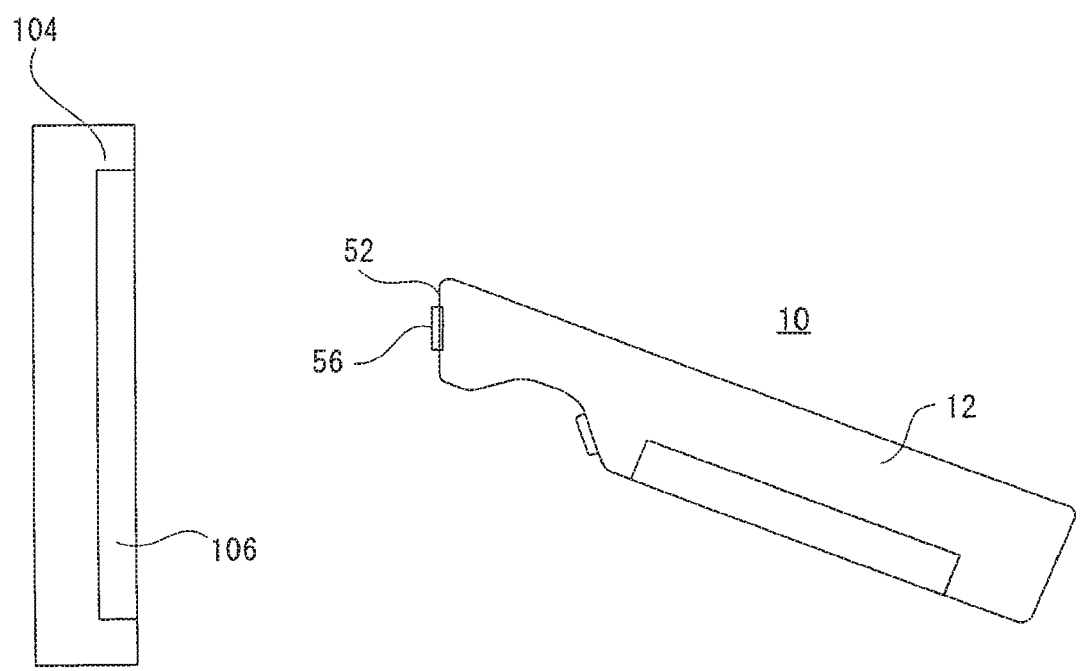
FIG. 24 is an illustrative view showing the imaging device of the first controller of FIG. 23 that is correctly faced toward a screen of a display.
Figure 25:
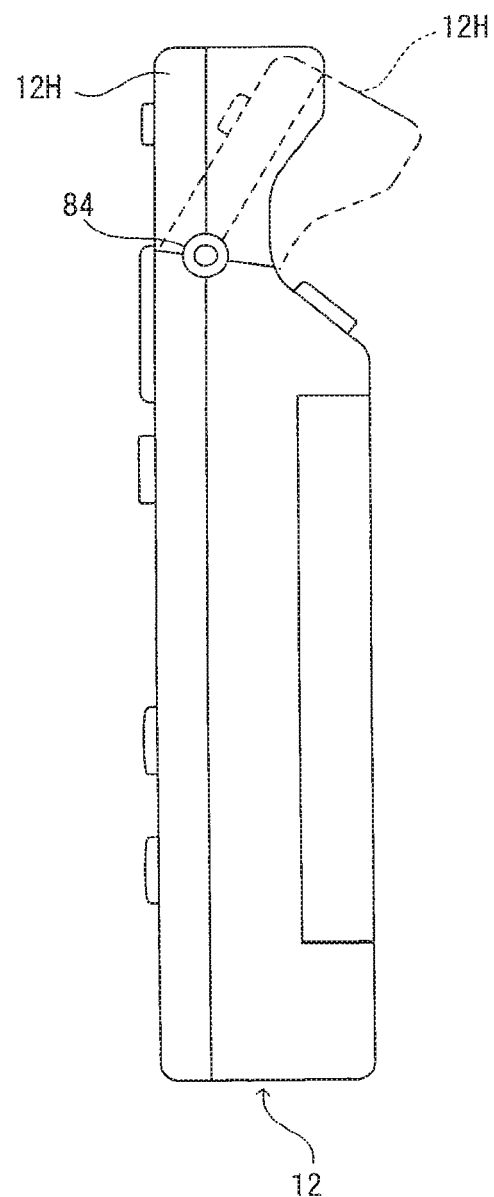
FIG. 25 is an illustrative view showing still another embodiment of the first controller.

Based on the same idea, as with an embodiment shown in FIG. 25, a front end 12H of the housing 12 of the controller 10 is separated from another part and is attached to a front end of the other part by means of a shaft 84. By doing this, since the front end 12H can be folded in such a manner as indicated by dotted lines if required, an imaging surface of the imaging device 56 of the imaging information arithmetic unit is displaced according to that, as shown in FIG. 25. Thus, as with the embodiments shown in FIG. 23 and FIG. 24, the effect of reducing wrist tiredness can be expected.

Besides, if this is not required for the embodiment of FIG. 25, the front end 12H may be in an upright state (a state indicated by solid lines in FIG. 25) according to the axis along the longitudinal direction.

Figure 26:
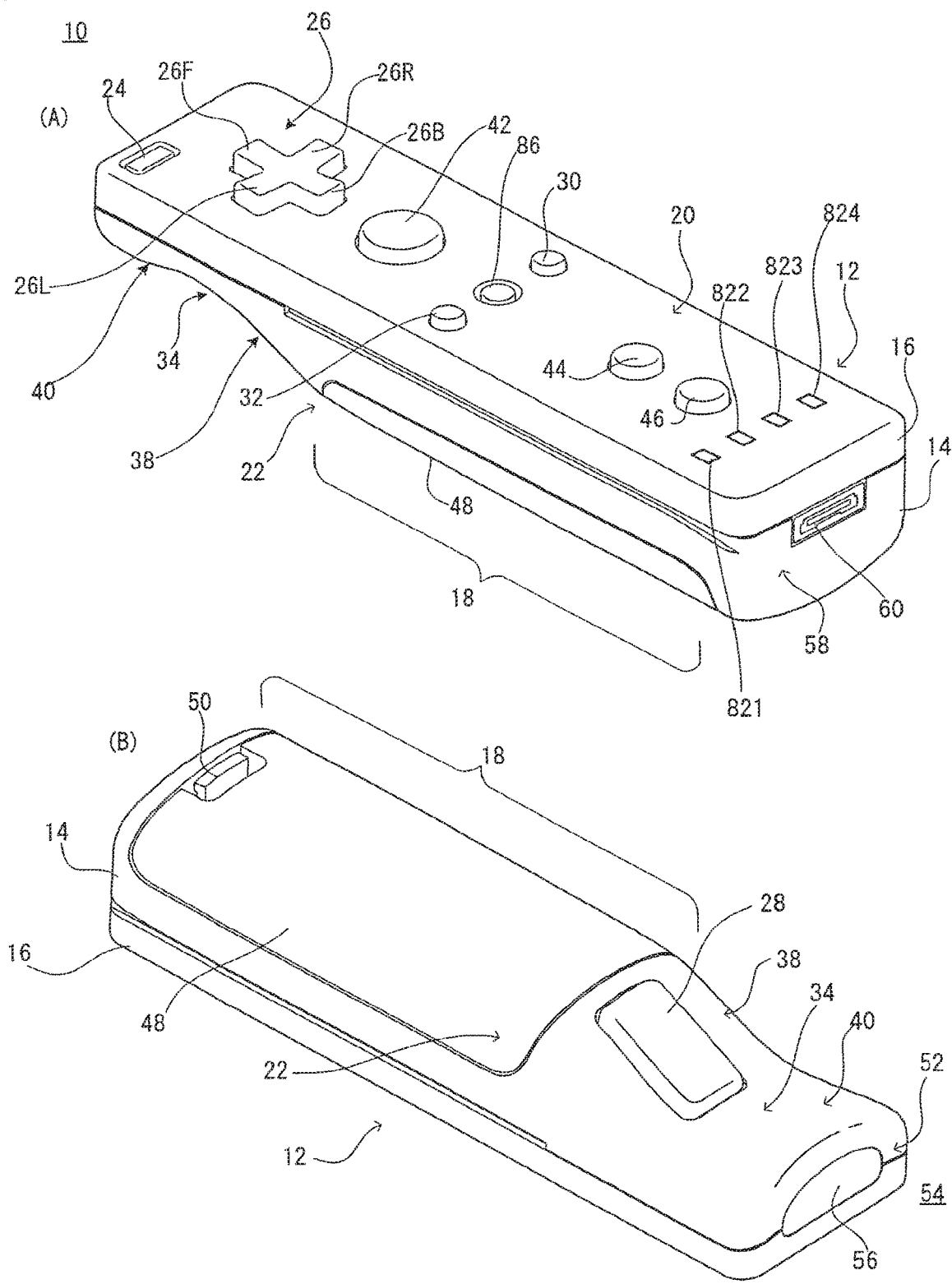
FIG. 26 presents further another embodiment of the first controller, and FIG. 26 (A) is a perspective view showing a rear side, upper side and left side, and FIG. 26 (B) is a perspective view showing a bottom side, front side, plane side and right side.
Figure 27:
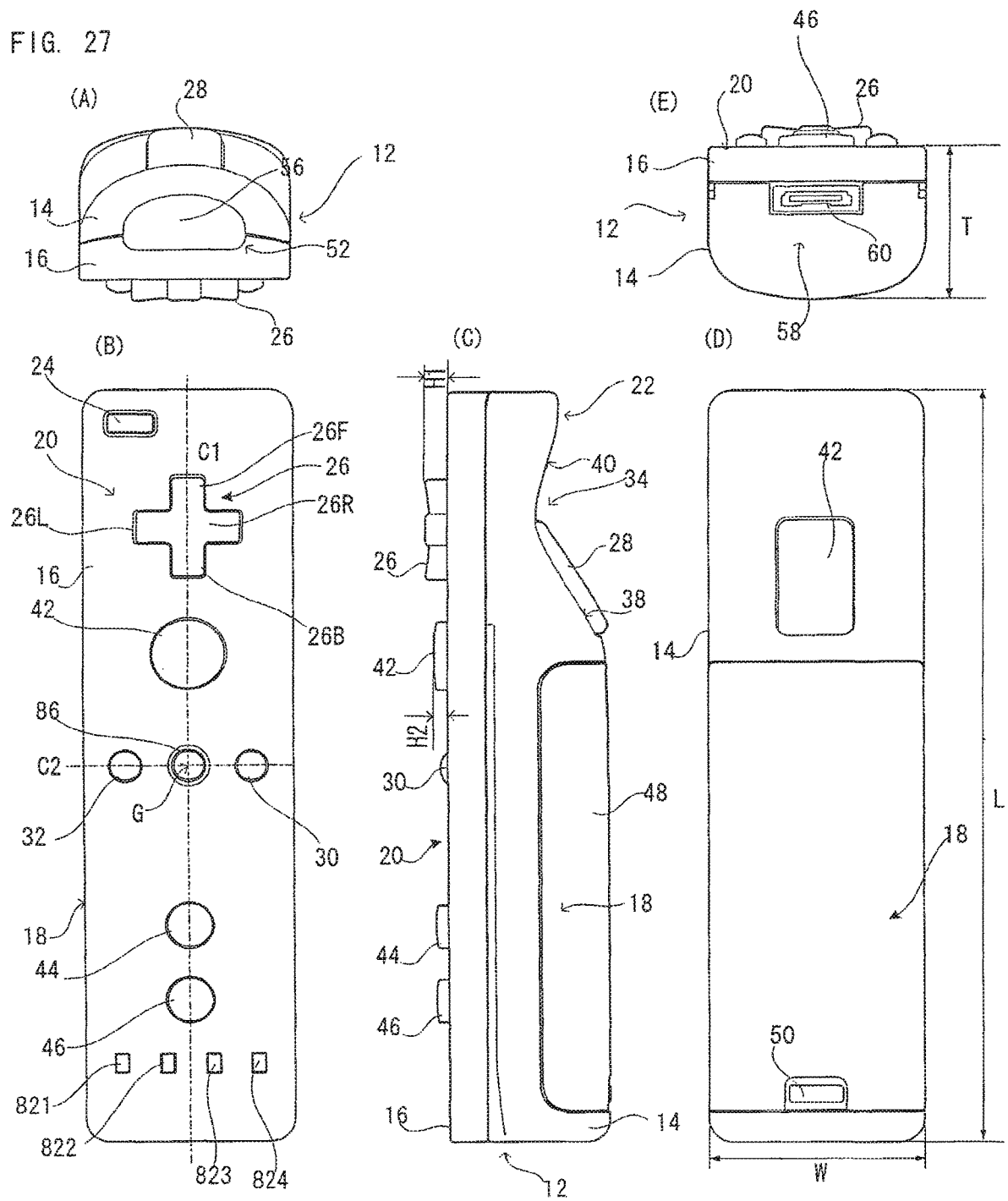
FIG. 27 is a drawing of a hexahedron excluding a view of a left side, and FIG. 2 (A) shows a front side, FIG. 2 (B) a plane side, FIG. 2 (C) a right side, FIG. 2 (D) a bottom side, and FIG. 2 (E) a rear side, respectively.
Figure 28:
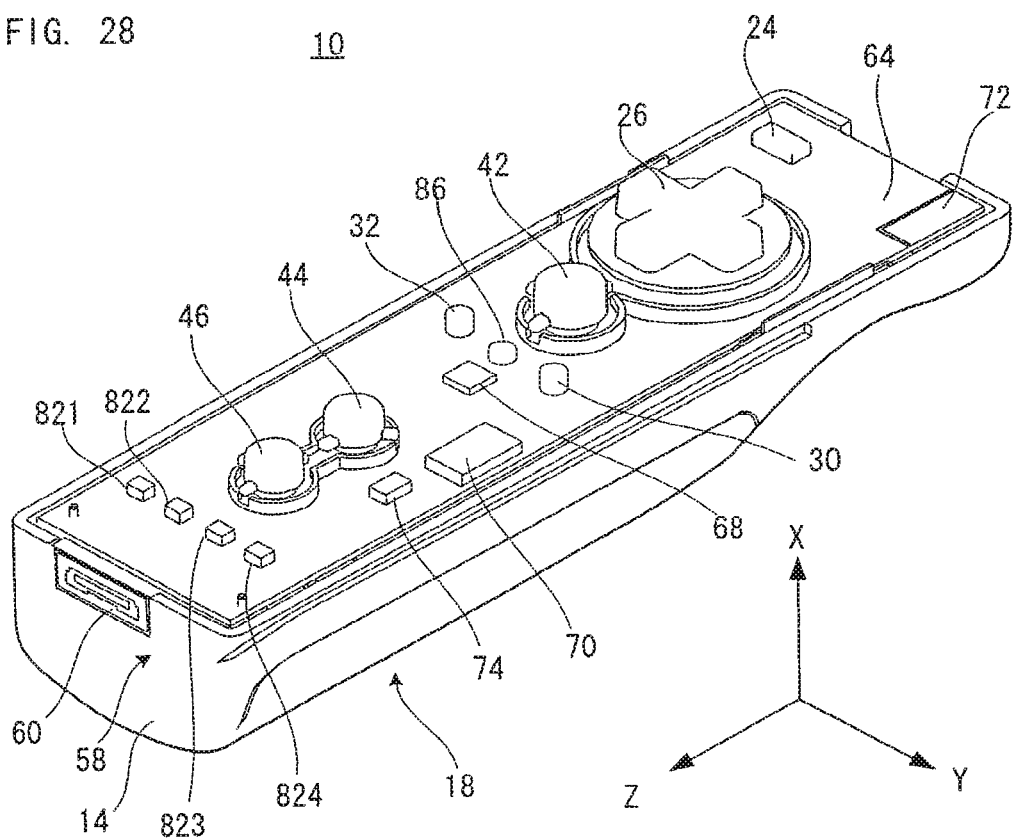
FIG. 28 is a perspective view showing the first controller shown in FIG. 26 and FIG. 27 from which the upper housing is removed.

FIG. 26 to FIG. 28 represents still another embodiment of the first controller 10. The controller 10 of this embodiment is identical with the controller of the embodiment shown in FIG. 1 and FIG. 2 except for points described below. Duplicate descriptions are omitted below with assignment of the same reference numerals to the same or similar components.

The controller 10 of this embodiment also includes the housing 12 of a longitudinal and cross rectangular shape or a shape close thereto that is structured by the lower housing 14 and the upper housing 16. Also, the holding portion 18 of a size or thickness capable of being held by one hand is formed at the rear end of the housing 12. In addition, the direction switch 26 is arranged on the upper surface 20 of the housing 12, at the side (front end) opposite to the holding portion 18 in the longitudinal direction C1 (FIG. 27). Besides, in this embodiment, the direction switch 26 is a so-called cross key, not a combined switch such as that of the FIG. 1 embodiment. Additionally, the A button 42 is provided below (near the rear end) of the cross key, i.e. the direction switch 26, at center of the housing 12 in a width direction. In the preceding embodiments, the A button 42 is provided in the concave portion 34 on the bottom surface 22 of the housing 12, and in this embodiment, the A button 42 is changed so as to be arranged on the upper surface 20 of the housing 12. This is intended to allow the A button 42 to be operated by the thumb quickly and reliably because the A button 42 is operated more frequently than the B button 28, as can be well understood from FIG. 29 described later, for example. The direction switch 26 and the A button 42 correspond to the first operating portion in this embodiment. Accordingly, the direction switch 26 and the A button 42 are a key top pushed in a direction orthogonal to the first plane 20 and a push switch having contacts (not shown) operated by the key top.

Moreover, in this embodiment, as understood well from FIG. 27(C) especially, a height H1 from the first plane 20 of the key top of the cross switch, i.e. the direction switch 26 is made higher as compared with a height H2 from the first plane 20 of the key top of the A button 42. That is, the direction switch 26 is set to be higher than the A button 42. This aims to prevent the A button 42 from being pushed by accident while the cross key, i.e. the direction switch 26 is operated.

The start switch 30 and the select switch 32 are arranged in one straight line in a direction orthogonal to the longitudinal direction (width direction), and also a menu switch 86 is provided between them. The menu switch 86 is used to select a menu item of a game to be executed by means of the controller 10 (for example, a one-person play mode, a match-up mode, etc.) and to switch the game mode instantly to the menu to be provided immediately after the startup of the game machine or the like. The center of the menu switch 86 is aligned with that of the A button 42 in the width direction of the housing 12, and the start switch 30 and the select switch 32 are arranged at positions with uniform spacing at left and right from the menu switch 86 (i.e. the A button 42).

With such a button layout as mentioned above, in manipulating the controller 10 with the right hand, for example, the player can operate the select switch 32 quickly just by sliding the thumb placed on the A button 42 without having to bending the thumb. Additionally, in the case of operation with the left hand, the start switch 30 is a switch suitable for a quick operation in the same manner. Accordingly, it is possible to perform a quick operation regardless of whether the user is right-handed or left-handed, by making a change to the assignments of the select switch 32 and the start switch 30 through the use of a software program or the like.

Besides, the menu switch 86 and the power switch 24 are provided in such a manner as to be caved in or buried in holes formed on the upper surface 20 of the housing 12 so that they are invisible from a side view as shown in FIG. 27 (C). These switches 24 and 86 are caved because, although they may be operated only on specific occasions such as the time of starting the game, operating these switches by accident during the game would cause some inconvenience such as data loss, and thus these switches are designed to be capable of being intentionally operated at the game start but incapable of being unconsciously operated during the game.

Furthermore, in the controller 10 of this embodiment, the LEDs 821 to 824 for indicating the controller numbers are provided as with the controller of FIG. 23. However, the LEDs 821 to 824 of FIG. 23 embodiment are provided at one end (front end) of the housing 12, whereas those of this embodiment are arranged at the other end (rear end) of the housing 12.

The concave portion 34 is formed on the lower surface 22 of the housing, at a position approximately corresponding to the position of the above mentioned direction switch 26, on the side opposite to the holding portion 18 in the longitudinal direction. In the preceding embodiments, the concave portion 34 has the valley 36 with a plane parallel to the first plane 20, and in this embodiment, the concave portion 34 has no valley and includes the first inclined surface 38 and the second inclined part 40 that have gentle inclination. Also, the B button 28 is provided on the first inclined surface 38 extending in the direction of the holding portion 18. In addition, the B button 28 is provided at a position corresponding to the direction switch 26 and the A button 42 forming the first operating portion. Besides, the corresponding position denotes a position where the B button 28 is arranged close to the direction switch 26 and the A button 42 when viewed through the upper surface of the housing 12.

Besides, the A button is arranged on the lower surface of the housing in the preceding embodiments, whereas the A button 42 of this embodiment is arranged at a position easier to press as compared with the center switch of the preceding embodiments. Thus, this button is assumed to be the frequently-used A button and the switch on the lower surface 22 of the housing is assumed to be the B button, which makes button operations to be easier.

Additionally, in this embodiment, the B button 28 corresponds to the second operating portion. The B button 28 therefore has a key top to be pushed in a direction perpendicular to the inclined surface 38 but non-perpendicular to the first plane 20, and a contact (not shown) turned on or off by the key top.

Figure 32:
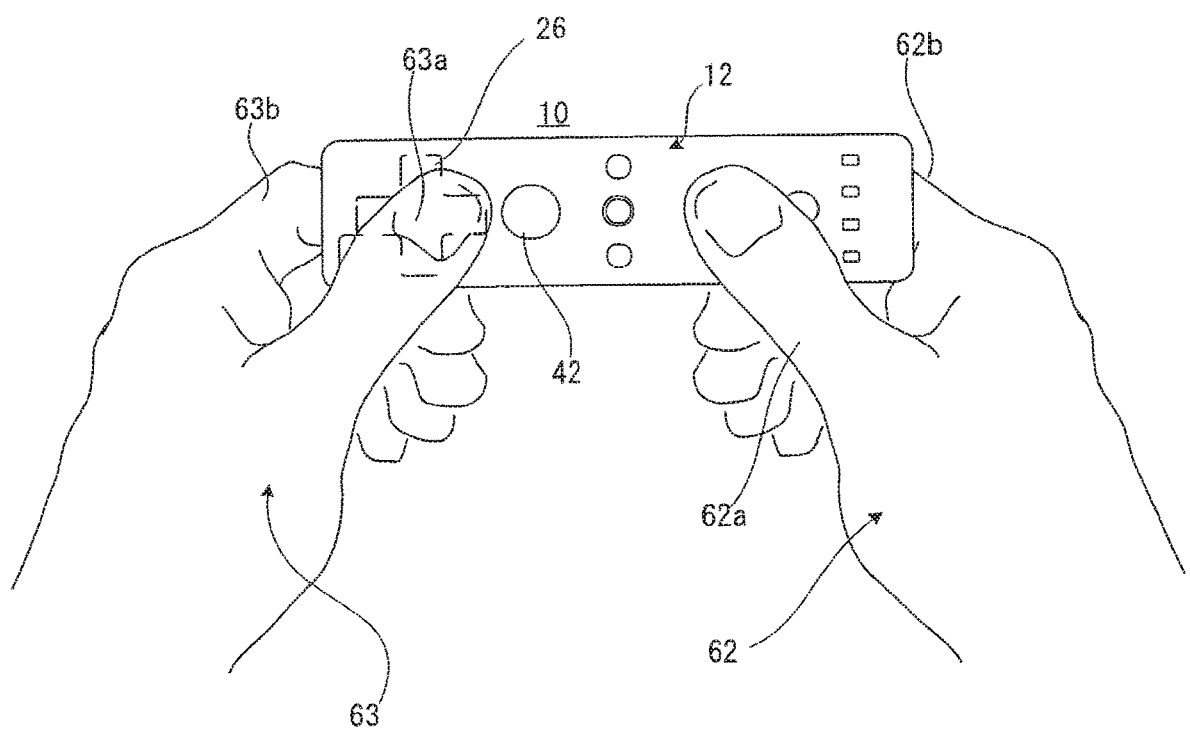
FIG. 32 is a top view of the first controller of this embodiment that is held and operated by both hands.

Moreover, in this embodiment, an angle of inclination of the second inclined surface 40 extending toward the front end 52 of the housing 12, with respect to the first plane 20 is set as to be smaller than an angle of inclination of the first inclined surface 38 with respect to the first plane 20, as can be well understood from FIG. 26 and FIG. 27 (C). That is, the second inclined surface 40 has gentle inclination as compared with the first inclined surface 38. In this manner, by making the second inclined surface 40 more gentle in inclination than the first inclined surface 38, there are such advantages that it is easier to hold the controller with both hands as shown in FIG. 32 described later and it is possible to take the index finger properly off the B button 28 because the finger can be sufficiently moved in the direction of the takeoff.

Furthermore, as can be understood from FIG. 28, because of a layout of the start switch 30, the menu switch 86 and the select switch 32 arranged in one horizontal straight line, in this embodiment, the wireless module 70 is arranged on the right side of the housing 12 in the width direction. Also, the power switch 24 is provided on the left side of the housing 12 of the substrate 64 in the width direction, in contrast to the preceding embodiments, and the antenna pattern 72 is arranged at the front end on the right side of the substrate 64 in the width direction. As stated above, by arranging the antenna pattern 72 at the front end on the right side of the housing 12 in the width direction, there is such an advantage that, even in the case of holding with both hands as shown in FIG. 32, the emission of weak radio waves from the antenna 72 is not affected by the hands holding the housing 12, that is, the controller 10. That is, the antenna pattern 72 is arranged on the side opposite to the hands holding the controller 10, in the width direction of the housing 12.

Besides, in the embodiment of FIG. 26 to FIG. 28, the switch provided in the concave portion 34 on the lower surface of the housing 12 is the B button 28. Alternatively, the B button 28 may be replaced with an operating means having the functions of the Z button. In addition, the Z button is used as a trigger switch in a shooting game, for example, and also operated on occasions when a non-player object is to be targeted by a player object (a so-called Z-targeting feature), etc.

Figure 30:
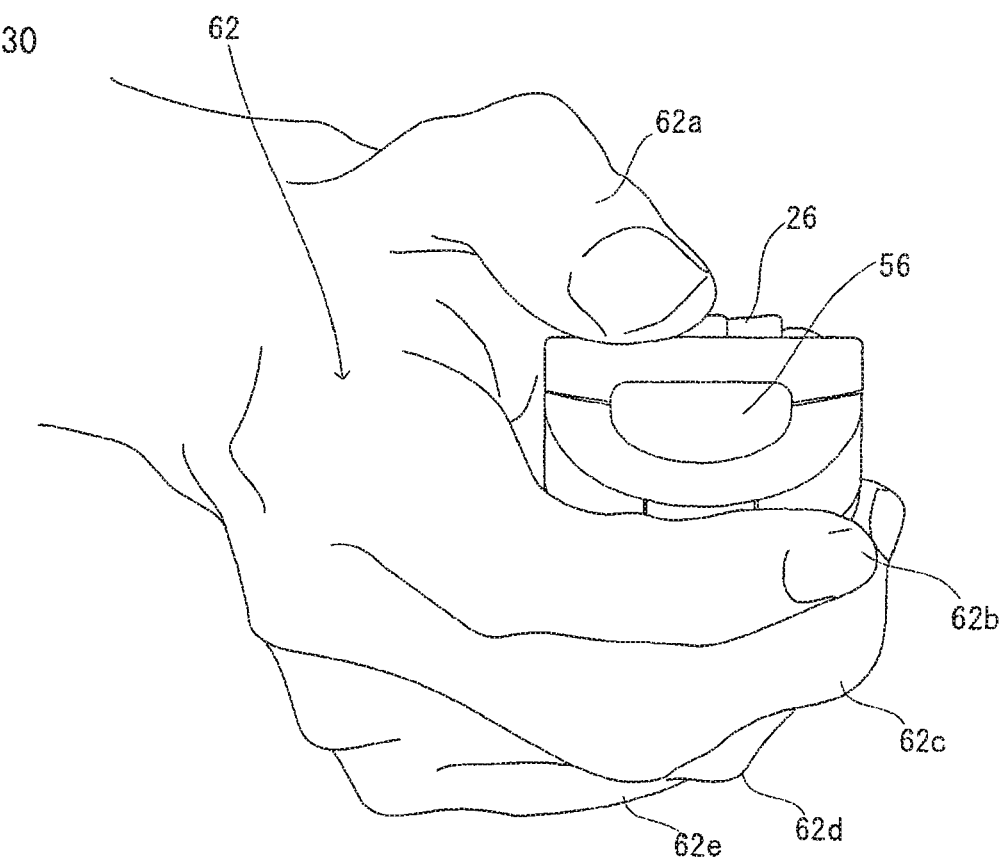
FIG. 30 is a front view of the first controller of this embodiment held by one hand.
Figure 31:
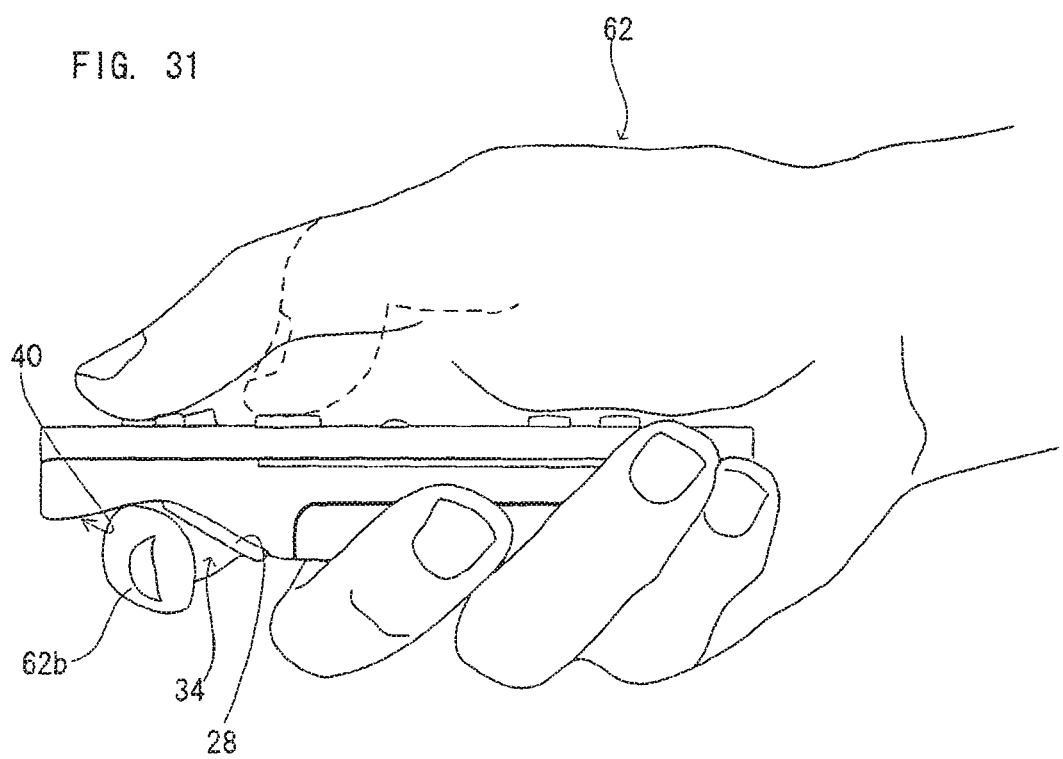
FIG. 31 is an illustrative view showing the state of FIG. 29 in which the index finger is taken off the B button.

FIG. 29 and FIG. 30 show the state that the controller 10 such structured as stated above is held by the game player's hand. Referring to these drawings, the palm 62P and the balls of middle finger 62c, ring finger 62d and small finger 62e of the player's right hand 62 hold the holding portion 18 of the housing 12 in such a manner as to wrap the holding portion 18 lightly. In the state, the thumb 62a of the hand 62 is positioned on the direction switch 26, and the index finger 62b is positioned in the concave portion 34 of the lower housing 14. Specifically, the direction switch 26 is arranged at a position reached by the thumb 62a of the hand 62 holding the housing 12, that is, at a position capable of being operated by the thumb 62a. The B button 28 is arranged at a position reached by the index finger 62b of the hand 62 holding the housing 12, that is, at a position capable of being operated by the index finger 62b. Accordingly, the player can operate the direction switch 26 by the thumb 62a and operate the B button 28 by the index finger 62b while holding the housing 12 by the hand 62. More specifically, the index finger 62b of the hand 62 is positioned in such a manner as to make contact with the surface of the second inclined surface 40 having gentle inclination in the front-end direction of the above stated concave portion 34 formed in the lower housing 14. By bending the index finger 62b toward him/her (rightward in FIG. 29) in that state, the user can push the key top of the B button 28 by the ball of the index finger 62b in a direction perpendicular to the near-side inclined surface 38 of the concave portion 34. Additionally, in the case of this embodiment, the A button 42 is to be operated by the thumb 62a of the one hand 62 as with the direction switch 26, as can be seen well from FIG. 29 in particular. That is, in this embodiment, the direction switch 26 is operated by extending the thumb 62a and the A button 42 is operated by bending the thumb 62a. As a consequence, both the direction switch 26 and the A button 42 are operated by the thumb 62a. Thus, the thumb 62a may also be placed in an operation-waiting state (rest state) on the A button 42, not on the direction switch 26.

FIG. 29 shows a state that the B button (or the Z button) 28 is pushed by the index finger 62*b*. When it is not required to push the B button 28, the index finger 62*b* (or the middle finger 62*c*) may be taken off the B button 28. More specifically, by placing the index finger 62*b* (or the middle finger 62*c*) on the second inclined surface 40 of the concave portion 34, it is possible to make the index finger 62*b* (the middle finger 62*c*) stable in the state of being separated from the B button 28. Thus, there is no need for changing the state of holding the housing 12 (passing the housing 12 from one hand to the other) depending on whether or not to push the B button (or Z button) 28.

As described above, the controller 10 of this embodiment makes it easy to operate the first operating portion (the direction switch 26 and the A button 42 in the embodiment) and the second operating portion (the A button 42 in the embodiment) while holding the controller 10 by one hand. That is, in the controller 10 of this embodiment, it is possible to operate the individual operating portions in a stable manner while holding the controller 10 by one hand, which brings about a highly favorable effect of allowing the other hand to be used for playing a game or for another purpose, and which also makes it possible to perform operations in a state of holding by both hands. FIG. 32 shows the state of holding by both hands. Additionally, in this embodiment, the A button 42 is arranged at a place on the holding portion in vicinity of the direction switch 26. Moreover, the B button 28 is arranged at the back of the area in which the direction switch 26 and the A button 42 are arranged (in other words, slightly rearward of the immediate back of the direction switch 26), which makes it easy to operate the A button 42 and the B button by one hand in a stable manner. Furthermore, as stated above, since the direction switch 26 is in a higher position than the A button 42, it is possible to make the A button hard to press by mistake.

In the case of holding by both hands, as shown in FIG. 32, the front end of the housing 12 is held by the left hand 63, and the rear end of the housing 12 is held by the right hand 62. At that time, with commonality between the right hand and the left hand, the controller 10, i.e. the housing 12 is held in such a manner that the upper surface 20 (FIG. 27) is retained by the balls of the thumbs 62*a* and 63*a* and the bottom surface 22 (FIG. 27) is supported by the sides of the index fingers 62*b* and 63*b*. Accordingly, the direction switch 26 and the A button 42 are operated by the ball of the thumb 63*a* of the left hand 63, and the B button 28 (FIG. 26 and FIG. 27) is operated by the tip of the index finger 63*b* of the left hand. Also, the X button 44 and the Y button 46 are operated by the thumb 62*a* of the right hand 62.

However, in the case of holding by both hands, the manner in which the controller is held, and the hands and fingers to operate the individual operating switches and operating buttons are not limited to the example of FIG. 32. Thus, for example, it is possible to operate the A button 42 by reaching out the thumb 62*a* of the right hand 62 or the like. Besides, holding in such a manner as shown in FIG. 32 would prevent radio emission through the antenna 72 (FIG. 28) from being affected by the holding hand.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A gaming device for use with an electronic device of the type that includes an input device configured to receive manual user input, the electronic device having a control surface, the input device being located on the control surface of the electronic device,
the gaming device comprising:
a support comprising left and right hand portions, the support configured to detachably hold the electronic device such that the control surface of the electronic device is visible while a user is holding the left and right hand portions of the gaming device;
an interface that enables circuitry in the gaming device to communicate with circuitry in the electronic device;
a first input device disposed on the left hand portion and configured to receive first manual user input; and
a second input device disposed on the right hand portion and configured to receive second manual user input;
wherein the support is configured such that when the support is detachably holding the electronic device, at least a portion of the control surface of the electronic device is located and manually accessible between the first and second input devices.

2. The gaming device of claim 1, wherein the first input device comprises a thumbstick.

3. The gaming device of claim 1, wherein the first input device comprises a cross key.

4. The gaming device of claim 1 wherein the second input device comprises a thumb stick.

5. The gaming device of claim 1 wherein the second input device comprises an array of push buttons.

6. The gaming device of claim 1 wherein at least one of the first and second input devices comprises a trigger button.

7. The gaming device of claim 1 wherein the left and right hand portions are dimensioned and shaped to be grasped by left and right hands, respectively, so that a palm of the left hand is capable of wrapping around and holding the left hand portion and a palm of the right hand is capable of wrapping around and holding the right hand portion.

8. The gaming device of claim 1 wherein the left and right hand portions are connected.

9. The gaming device of claim 1 wherein the left and right hand portions comprise a unitary structure.

10. The gaming device of claim 1, wherein the support is configured to detachably hold opposite sides of the electronic device.

11. The gaming device of claim 1, wherein the interface comprises an electrical connector that is configured to mate with a corresponding electrical connector of the electronic device.

12. The gaming device of claim 1, wherein the input device located on the control surface of the electronic device comprises a button.

13. The gaming device of claim 1, wherein the input device protrudes in at least in one direction from the left hand portion and the right hand portion.

14. The gaming device of claim 1, wherein the support is configured to surround at least a portion of a back surface of the electronic device and at least portions of two opposite side surfaces of the electronic device.

15. The gaming device of claim 1 wherein the gaming device is configured to control an electronic game.

16. The gaming device of claim 1 wherein the gaming device is configured control a view point of a virtual camera in a game.

17. The gaming device of claim 1 wherein the first input device comprises a cross switch and a first thumbstick, and the second input device comprises an array of push buttons and a second thumb stick, the first and second input devices being configured and spaced so that when a left hand of the user grasps the left hand portion and a right hand of the user grasps the right hand portion, a thumb of the left hand is capable of alternately operating the cross switch and the first thumbstick and a thumb of the right hand is capable of alternately operating the array of push buttons and the second thumbstick.

18. The gaming device of claim 1 wherein the support defines a slot dimensioned and configured to slidably accept and retain a distal portion of the electronic device.

19. The gaming device of claim 1 wherein the left hand portion is configured so that the electronic device control surface is flush with a first surface of the left hand portion on which the first input device is disposed and/or with a second surface of the right hand portion on which the second input device is disposed.

20. The gaming device of claim 1 wherein the support is configured to support a center of gravity of the electronic device.

\* \* \* \* \*